(12) United States Patent
Wu et al.

(10) Patent No.: US 11,547,039 B2
(45) Date of Patent: Jan. 10, 2023

(54) FULLY-AUTOMATIC TRANSPLANTING COMBINED MACHINE

(71) Applicant: Nanjing Institute of Agricultural Mechanization, Ministry of Agriculture and Rural Affairs, Nanjing (CN)

(72) Inventors: Chongyou Wu, Nanjing (CN); Qing Tang, Nanjing (CN); Jun Wu, Nanjing (CN); Min Zhang, Nanjing (CN); Gang Wang, Nanjing (CN); Lan Jiang, Nanjing (CN)

(73) Assignee: Nanjing Institute of Agricultural Mechanization, Ministry of Agriculture and Rural Affairs, Nanjing (CN)

( * ) Notice: Subject to any disclaimer, the term of this patent is extended or adjusted under 35 U.S.C. 154(b) by 393 days.

(21) Appl. No.: 16/838,043

(22) Filed: Apr. 2, 2020

(65) Prior Publication Data

US 2020/0390019 A1 Dec. 17, 2020

(30) Foreign Application Priority Data

Jun. 13, 2019 (CN) .......................... 201910510074.2

(51) Int. Cl.
*A01C 11/02* (2006.01)
*A01C 5/06* (2006.01)
(Continued)

(52) U.S. Cl.
CPC ............ *A01C 11/02* (2013.01); *A01B 29/045* (2013.01); *A01B 33/024* (2013.01);
(Continued)

(58) Field of Classification Search
CPC ..... A01C 11/006; A01C 11/02; A01C 11/025; A01C 49/06; A01C 49/065
See application file for complete search history.

(56) References Cited

U.S. PATENT DOCUMENTS 4,289,080 A * 9/1981 Penley ................. A01C 11/025
198/470.1

FOREIGN PATENT DOCUMENTS

CN 201199791 Y 3/2009
CN 103141195 A 6/2013
(Continued)

*Primary Examiner* — Thomas B Will
*Assistant Examiner* — Ian A Normile
(74) *Attorney, Agent, or Firm* — Bayramoglu Law Offices LLC

(57) ABSTRACT

A fully-automatic transplanting combined machine includes a traction apparatus, operation apparatus and a control system. The operation apparatus is mounted on the traction apparatus with a main body frame and is towed behind the traction apparatus. The operation apparatus includes a rotary tillage furrowing system, a system for slightly preparing soil and opening narrow furrows, a planting system, and a soil covering compacting system which are arranged successively from front to back. The planting system includes more than one planting unit. The fully-automatic transplanting combined machine is capable of orderly performing rotary tillage, cleaning stubble, leveling a border check, opening a furrow, cutting narrow slits, transplanting, covering soil, compacting soil in untilled soil at one process, so as to create the soil requirements for high-speed transplanting of blanket seedlings such as rape and other crops.

20 Claims, 30 Drawing Sheets

(51) Int. Cl.
*A01B 29/04* (2006.01)
*A01B 49/06* (2006.01)
*A01B 33/02* (2006.01)
*A01C 19/00* (2006.01)

(52) U.S. Cl.
CPC ............ *A01B 49/065* (2013.01); *A01C 5/064* (2013.01); *A01C 5/068* (2013.01); *A01C 19/00* (2013.01)

(56) References Cited

FOREIGN PATENT DOCUMENTS

| | | | | |
|---|---|---|---|---|
| CN | 106538114 A | | 3/2017 | |
| CN | 207766815 U | | 8/2018 | |
| CN | 109168494 A | | 1/2019 | |
| JP | H08103124 A | | 4/1996 | |
| JP | 2009082006 A | | 4/2009 | |
| KR | 20150029145 | * | 3/2015 | ............. A01C 11/02 |

* cited by examiner

FULLY-AUTOMATIC TRANSPLANTING COMBINED MACHINE

CROSS REFERENCE TO THE RELATED APPLICATIONS

This application is based upon and claims priority to Chinese Patent Application No. 201910510074.2, filed on Jun. 13, 2019, the entire contents of which are incorporated herein by reference.

TECHNICAL FIELD

The present disclosure pertains to the technical field of agricultural machinery, and specifically relates to a fully-automatic transplanting combined machine.

BACKGROUND

The transplanting technique is widely used in China and other countries as the development of the seedling cultivation technique. Generally, transplanters are divided into manual transplanters, semi-automatic transplanters, and fully-automatic transplanters depending upon the degree of automation. Furthermore, based upon their structural features, transplanters are divided into pincette type transplanters, chain type transplanters, seedling guiding tube type transplanters, flexible disc type transplanters, and hanging cup type transplanters. Different types of transplanters are suitable for planting different crops.

Rape is particularly susceptible to moisture and thus sometimes produces rotten roots and dead seedlings in rainy weather and it is prone to withering in dry weather conditions. In this regard, it is necessary in some case to open a furrow and bed soil before a transplanting operation. The Chinese patent, No. CN106538114A, discloses a multi-shaft shallow tillage and furrowing method for transplanting rape. The patented invention provides a furrowing device in combination with stubble cleaning, shallow tillage, and rotary tillage, which realizes furrow opening, soil throwing, shallow tillage, soil breaking, and soil leveling and cleaning in one operation in order to produce finer granular soil and make preparations for transplanting. Such a device design, however, is not suitable for large-batch and multi-row transplanting operations. There remains a deficiency in soil preparation and shaping. In addition, the Chinese patent, No. CN109168494A, discloses that the planting density of rice is similar to the planting density of rape, and the rotary transplanter employed by the rice transplanter can realize high-speed and high-quality transplanting. On comparison with transplanting rice, however, the rice seedlings are inserted into soft mud, while the rapes are inserted into a solid soil block. Soil type affects the type of transplanter used. If the rice transplanting method is applied to transplant rape, for example, the stalk is easily broken, and the seedling is likely to be damaged. Moreover, seedlings are likely to be affected by interaction in the high-speed transplanting, leading to a reduction in the erectness of the seedlings, which affects the transplanting quality. Hence, the recirculating transplanting device for rape pot seedlings, for example, is designed to be suitable for transplanting rape in dry land, but the transplanting efficiency thereof is much lower than the transplanting speed of rice transplanters.

Furthermore, planting mechanisms of existing dry land transplanters in China and other countries mostly involve complex operations during the process of picking and placing seedlings. This process is accomplished by multiple mechanisms, and thus the seedlings cannot be fully controlled. The seedlings fall due to their own weights, resulting in a low planting efficiency.

SUMMARY

The objective of the present disclosure is to improve the transplanter in the prior art, and to provide a novel fully-automatic transplanting combined machine, which can comprehensively treat soil and thus is suitable for transplanting rape and other similar crops in dry land at a high rate of speed.

The technical solution of the present disclosure is as follows:

A fully-automatic transplanting combined machine includes a traction apparatus, an operation apparatus and a control system. The operation apparatus is mounted on the traction apparatus with a main body frame and towed behind the traction apparatus.

The operation apparatus includes a rotary tillage furrowing system, a system for slightly preparing soil and opening narrow furrows, a planting system, and a soil covering compacting system arranged successively from front to back. The planting system includes more than one planting unit.

The rotary tillage furrowing system is provided with a rotary tillage cutter shaft. The middle of the rotary tillage cutter shaft is provided with a middle furrowing cutter disc configured to open a furrow, and two sides of the rotary tillage cutter shaft are provided with a rotary tillage blade set.

The system for slightly preparing soil and opening narrow furrows includes a soil breaking roller, a soil scraping device for the soil breaking roller, and a soil leveling and slitting roller.

The soil breaking roller includes a soil breaking roller shaft, and a left roller body and a right roller body which are mounted on the soil breaking roller shaft.

Both ends of the soil breaking roller shaft are connected to a drive device by a transmission mechanism, and the drive device drives the soil breaking roller shaft to rotate.

The right roller body is provided with a plurality of unit segments in the axial direction, and the surface of each of the plurality of unit segments is provided with a spiral blade. The adjacent unit segments are spaced apart from one another by an annular groove. Also, the outermost unit segment and the end portion of the right roller body are spaced apart by an annular groove. The annular groove has a trapezoidal cross section in the radial direction of the right roller body, and has a wide outer portion and a narrow inner portion.

The left roller body and the right roller body are symmetrical.

The soil scraping device for the soil breaking roller includes a scraper, wherein the scraper is parallel to the soil breaking roller shaft, arranged close to the spiral blade, and configured to remove soil adhered to the spiral blade.

The soil leveling and slitting roller includes a soil leveling and slitting roller shaft, a plurality of circular cutter discs, and a plurality of soil compacting roller bodies, wherein the plurality of circular cutter discs and the plurality of soil compacting roller bodies are mounted on the soil leveling and slitting roller shaft.

The plurality of circular cutter discs and the plurality of soil compacting roller bodies are alternately arranged on the soil leveling and slitting roller shaft. A circular cutter disc is arranged between adjacent soil compacting roller bodies.

The plurality of circular cutter discs are in a one-to-one correspondence with the annular grooves on the soil breaking roller in the front and aligned with the annular grooves front and rear. The seedling transplanting positions of the planting unit are in a one-to-one correspondence with the plurality of circular cutter discs and aligned with the plurality of circular cutter discs front and rear.

Based on the above-mentioned solution, the improved or preferred solution is as follows.

Further, the fully-automatic transplanting combined machine is provided with a hydraulic drive system, a ground wheel speed measurement system and a ground contour-following system. Each planting unit is provided with a lift cylinder configured to independently control the planting unit to ascend and descend. The planting unit is driven by a hydraulic motor and is provided with a first rotation speed sensor configured to detect the rotation speed of the hydraulic motor. A signal output terminal of the first rotation speed sensor is connected to the control system. The hydraulic motor is connected to the hydraulic drive system. The hydraulic drive system regulates the speed of the hydraulic motor and controls the hydraulic motor to start or stop according to an instruction sent by the control system. The ground wheel speed measurement system is provided with a contour following ground wheel mechanism. The contour following ground wheel mechanism is provided with a ground wheel in contact with the ground and a second rotation speed sensor configured to detect the speed of the ground wheel. A signal output terminal of the second rotation speed sensor is connected to the control system. The control system controls the speed of the hydraulic motor according to signals collected by the first rotation speed sensor and the second rotation speed sensor, so that the traveling speed of the combined machine is matched with the planting speed of the planting unit. The ground contour-following system is connected to the planting unit, collects changes of different terrains during the travel of the combined machine, generates a coupling control action that acts on the lift cylinder, and the height of the planting unit is regulated by the lift cylinder.

Further, a valve group is arranged on a connecting pipeline between the lift cylinder and the hydraulic drive system, and the valve group is fixed on a third mounting support.

The ground contour-following system includes a contour following mechanism and a transmission mechanism.

The contour following mechanism includes an inductive wheel, a movable support and a second fixed support.

The inductive wheel is roller-shaped, arranged horizontally, and contacts the ground when operating. Two ends of the inductive wheel are mounted at the bottom of the movable support through a first rotating shaft.

The movable support is arranged obliquely, wherein the upper portion of the movable support faces forwards and the lower portion of the movable support faces backwards. The middle of the movable support is hinged to the bottom of the second fixed support through a second rotating shaft.

The second fixed support is located behind the upper portion of the movable support, and an included angle is formed between the second fixed support and the upper portion of the movable support. The top end of the second fixed support is fixed on a main beam of the planting unit, and a fixed lug is arranged on the second fixed support.

In the above-mentioned contour following mechanism, the first rotating shaft is parallel to the second rotating shaft, and the front indicates the traveling direction of the combined machine.

The transmission mechanism includes a pull wire, a movable lug and a pull lug.

The valve group is provided with a housing, a valve core and a push rod. The valve group controls the lift cylinder to operate under the action of the valve core. One end of the push rod is connected to the valve core in the housing, and the other end of the push rod extends from the housing. The portion of the push rod extending from the housing is provided with a first return spring.

The pull lug is arranged on the extending side of the push rod of the valve group, and is hinged to the mounting support through a third rotating shaft. The third rotating shaft is perpendicular to the push rod. One end of the pull lug is connected to the third mounting support through a second return spring, and the other end of the pull lug is connected to the movable support through the pull wire, so as to form a lever structure with the third rotating shaft as a fulcrum. The second return spring is parallel to the push rod. An arc-shaped protruding contact point is arranged between a connection point of the pull lug and the pull wire and the third rotating shaft. The protruding contact point is arranged at a position aligned with the end portion of the push rod.

The pull wire includes a sleeve and a drawing wire located in the sleeve. The length of the drawing wire is greater than the length of the sleeve. The drawing wire can move inside the sleeve. One end of the sleeve is fixedly connected to the movable lug, and the other end of the sleeve is fixedly connected to the fixed lug. One end of the drawing wire passes through the movable lug and is connected to the pull lug. The other end of the drawing wire passes through the fixed lug and is connected to the upper portion of the movable support. The fixed lug and the movable lug are both provided with a through hole which allows the drawing wire to pass through.

When there is a bump on the ground, the inductive wheel lifts upwards, the movable support rotates, and the pull lug is jointly linked by the drawing wire. The first return spring is compressed, and the second return spring is stretched. The pull lug presses the push rod of the valve group through the protruding contact point, so as to drive the valve core to move and turn on an oil circuit which drives the lift cylinder to lift. After the inductive wheel passes over the bump of the ground, the valve core is reset under the action of the first return spring, the oil circuit which drives the lift cylinder to lift is cut off, and the pull lug is reset under the action of the second return spring.

Further, the movable lug is mounted on the mounting support through a waist-shaped long hole. The tension and relaxation state of the drawing wire is changed by adjusting a fixed position of the movable lug (908) in the waist-shaped long hole, so as to adjust an induction sensitivity of the control mechanism.

Further, the other end of the drawing wire is connected to the movable support through a buffer spring. The upper portion of the movable support is provided with a plurality of positioning holes at different height positions. The plurality of positioning holes cooperates with an adjustable rod for use. One end of the buffer spring is hung on the adjustable rod, and a contour following height of the planting unit is regulated by mounting the adjustable rod in the plurality of positioning holes at different height positions.

Further, the lift cylinder is a single-acting hydraulic cylinder. An oil inlet is arranged on one side of the piston rod chamber of the lift cylinder. When oil enters the piston rod chamber, the piston rod moves and drives the planting unit to lift. The valve group includes a five-position four-way reversing valve, and is provided with four oil ports and five valve positions, wherein the four oil ports include a port A, a port B, a port P, and a port T, and the five valve positions include position 1, position 2, the neutral position, position 3, and position 4, respectively.

When the valve core moves to the position 1, port A and port P are in fluid communication, and port B and port T are in fluid communication. When the valve core moves to position 2, port A and port P are in fluid communication, and port B and port T are in fluid communication.

When the valve core moves to the neutral position, port A and port B are both blocked, and port P and port T are in fluid communication. When the valve core moves to position 3, port A and port B are in fluid communication, and port P and port T are in fluid communication. When the valve core moves to position 4, port A and port B are in fluid communication, and port P and port T are in fluid communication.

The hydraulic drive system includes an oil tank, an overflow valve, and an unloading valve. Port P of the valve group is connected to the oil tank through a first oil pipeline, and an oil pump is mounted in the first oil pipeline. Port A is connected to the oil inlet of the piston rod chamber of the lift cylinder through a second oil pipeline. Port B is connected to the oil tank through a first oil return pipeline. Port T is connected to the first oil return pipeline through a second oil return pipeline, and the connection point thereof is set as S. The overflow valve and the unloading valve are incorporated into a circuit of the hydraulic drive system through a first branch pipeline. The first branch pipeline is arranged between the connection point S and an end of the first oil return pipeline. The connection points of two ends of the first branch pipeline and the first oil return pipeline are M and N, respectively.

In the first oil return pipeline, the connection point M is on an upstream side of the connection point N. The first branch pipeline intersects with the first oil pipeline to form the intersection O. The overflow valve is mounted in a pipeline between the connection point M and the intersection O. The unloading valve is mounted in a pipeline between the intersection O and the connection point N on the other side. The input end of the unloading valve is connected to the second oil pipeline through the second branch pipeline.

Further, the fully-automatic transplanting combined machine is provided with an electric cylinder and a lifting control handle. The electric cylinder is arranged in front of the valve group. An output shaft of the electric cylinder is parallel to the push rod of the valve group. The end portion of the output shaft of the electric cylinder is located beside the pull lug, and also aligned with the front end surface of the push rod. The push rod of the valve group can be pushed under the action of the electric cylinder, so as to drive the valve core to switch the valve position. The signal input terminal of the electric cylinder is connected to the control system. The signal input terminal of the control system is connected to the lifting control handle. The lifting control handle is operated to control a stroke of the output shaft of the electric cylinder, so as to switch the position of the valve core of the valve group.

The contour following ground wheel mechanism includes an adjusting rod, a fixed plate, a suspension arm, and a ground wheel. A front shaft sleeve and a rear shaft sleeve are horizontally arranged at a front end and a rear end of the suspension arm, respectively. The front shaft sleeve is configured to mount a fixed shaft, and the rear shaft sleeve is configured to mount a ground wheel shaft. One end on an inner side of the fixed shaft protrudes from the shaft sleeve and is fixed on the main body frame. The suspension arm is hinged to the main body frame through the fixed shaft, so that the suspension arm can swing around the fixed shaft upwards and downwards. The ground wheel is located outside the suspension arm, and the ground wheel shaft is arranged at the center of the ground wheel. The end on the inner side of the ground wheel shaft is inserted into the rear shaft sleeve, and the end at the outer side of the ground wheel shaft is fixedly connected to the ground wheel. The ground wheel drives the ground wheel shaft to rotate synchronously when rolling on the ground. The outer surface of the ground wheel is provided with an anti-slip mechanism. The second rotation speed sensor configured to detect the speed of the ground wheel shaft is mounted at one end on the inner side of the rear shaft sleeve. The fixed plate is arranged horizontally, and one end on the inner side of the fixed plate is fixedly mounted on the main body frame of the combined machine. The suspension arm is arranged below the fixed plate and is connected to the fixed plate by the adjusting rod. The middle of the suspension arm is provided with a horizontal shaft hole. The upper surface of the suspension arm is provided with an opening connected to the horizontal shaft hole. The adjusting rod is inverted T-shaped, and includes a vertical shaft and a bottom horizontal shaft, wherein the bottom horizontal shaft is mounted in the horizontal shaft hole.

The fixed plate is provided with a limit mounting hole. The upper portion of the vertical shaft passes through the limit mounting hole, and the bottom end of the vertical shaft passes through the opening and is connected to the bottom horizontal shaft. The opening is a long hole extended in front and rear directions, so that the bottom horizontal shaft can rotate in the suspension arm when the suspension arm swings up and down. A spring is sleeved at a position of the vertical shaft of the adjusting rod located between the fixed plate and the suspension arm. The upper end and the lower end of the spring abut against the fixed plate and the suspension arm, and the ground wheel is pressed against the ground by the suspension arm.

Further, an electro-hydraulic proportional valve and a reversing valve are arranged at a liquid inlet pipeline of the hydraulic motor, and control signal input terminals of the electro-hydraulic proportional valve and the reversing valve are connected to the control system. The control system regulates the opening of the electro-hydraulic proportional valve to limit the hydraulic fluid flow entering the hydraulic motor, so as to adjust an output speed of the hydraulic motor. The control system realizes an on-off control of the liquid inlet pipeline of the hydraulic motor through the reversing valve. When the second rotation speed sensor detects that the ground wheel is stationary or rotates reversely, the liquid inlet pipeline is cut off by the reversing valve. When the ground wheel rotates forwards, the reversing valve opens the liquid inlet pipeline.

Further, the rotary tillage furrowing system is provided with a ditch cleaning shovel, a soil retaining cover and a soil throwing cover. The ditch cleaning shovel is arranged behind the middle furrowing cutter disc. The bottom of the ditch cleaning shovel is inclined towards the heading direction of the combined machine.

The soil throwing cover is arranged above the ditch cleaning shovel and is coupled with the top of the ditch cleaning shovel. The soil throwing cover is provided with an upwardly extending arc-shaped baffle. The arc-shaped baffle extends in the direction heading of the combined machine to guide the soil shoveled by the ditch cleaning shovel.

The soil retaining cover is arranged between the rotary tillage blade set and the soil breaking roller, and includes two covers. The two covers are located one each on the left side and the right side of the soil throwing cover, and used for blocking and leveling the soil turned over by the rotary tillage. The bottom of the cover is saw-toothed.

Further, the planting unit includes a seedling box, a seedling feeding mechanism and a planting arm. The seedling box is arranged obliquely, and is provided with a plurality of parallel seedling channels. A hollow portion is arranged at the lower portion of the seedling channel.

The seedling feeding mechanism includes an endless conveyor belt. A section of the endless conveyor belt is embedded in the hollow portion and contacts the seedlings in the seedling channel, so as to control the seedlings to descend. The surface of the endless conveyor belt is provided with an anti-slip mechanism. The planting arm picks seedlings from a seedling gate located below the seedling box, and plants the seedlings into a narrow furrow formed by the circular cutter disc.

Further, the seedling feeding mechanism further includes a ratchet transmission mechanism configured to drive the endless conveyor belt. The ratchet transmission mechanism includes a shift tooth rotating shaft, a ratchet shaft, and a pawl. The ratchet shaft and the pawl are mounted on a frame structure of the seedling box. The ratchet shaft is a gear shaft and arranged horizontally. The surface of the ratchet shaft is provided with a plurality of racks and a plurality of tooth spaces extended horizontally. The pawl is mounted beside the ratchet shaft at a shaft pin, and is configured to push the ratchet shaft to rotate.

The endless conveyor belt is winded around the ratchet shaft. A protrusion array is arranged on a contact surface between the endless conveyor belt and the ratchet shaft. The protrusions forming the protrusion array are engaged with the tooth spaces of the ratchet shaft, so that the rotation of the ratchet shaft can drive the endless conveyor belt to move. The protrusion array is formed by a plurality of rivets that are regularly mounted on the endless conveyor belt. The head of each of the rivets forms a corresponding protrusion, and the tip of the rivet passes through the conveyor belt and contacts the seedlings to form the anti-slip mechanism, which increases the contact friction between the endless conveyor belt and the seedling.

The shift tooth rotating shaft is driven by the drive device to rotate, and a first shift tooth is mounted one each on the left side and the right side of the shift tooth rotating shaft. When the seedling box laterally moves to the left limit position or the right limit position of the seedling box, the first shift tooth on the left side or the right side shifts to the pawl to allow the pawl to push the ratchet shaft to rotate by a certain angle, so as to drive the endless conveyor belt to rotate, control the seedling to move downwards, and prevent the seedling from falling freely.

Preferably, the surface of the soil compacting roller body is covered with a rubber layer having a hardness ranging from 60 HA to 70 HA, which can effectively improve the soil adhering condition of the soil compacting roller body.

Further, the left roller body and the right roller body are both provided with a central shaft hole penetrating from left to right. The left roller body and the right roller body are sleeved on the soil breaking roller shaft through the central shaft hole and fixed to the soil breaking roller shaft by a locking device. The locking device includes two sets of auxiliary plates configured, respectively, to fix the left roller body and the right roller body. One set of the two sets of auxiliary plates includes a regular polygonal outer auxiliary plate and a circular inner auxiliary plate. The regular polygonal outer auxiliary plate is fixed at the end portion of the soil breaking roller shaft. The circular inner auxiliary plates of the two sets of auxiliary plates are fixed in the middle of the soil breaking roller shaft. Each of the central shaft holes of the left roller body and the right roller body is formed by an inner shaft hole and an outer shaft hole which are coupled with one another. The inner shaft hole is a circular hole, and the size of the inner shaft hole is greater than the size of the outer shaft hole. The outer shaft hole is in the shape of a regular polygon that is consistent with the shape of the regular polygonal outer auxiliary plate, so that the regular polygonal outer auxiliary plate can pass through the entire central shaft hole. The diameter of the circular inner auxiliary plate is greater than the diameter of the inner shaft hole, so that the edge of the circular inner auxiliary plate can be fixed to the inner end surface of the left roller body or the right roller body by bolts. A sharp corner of the regular polygonal outer auxiliary plate is provided with a screw hole. After the regular polygonal outer auxiliary plate and the outer shaft hole are arranged alternately, the sharp corner of the regular polygonal outer auxiliary plate is fixed to the outer end surface of the left roller body or the right roller body by bolts.

Advantages:

1) In the present disclosure, the operation apparatus of the fully-automatic transplanting combined machine is capable of orderly performing rotary tillage, cleaning stubble, leveling a border check, opening a furrow, cutting narrow slits, transplanting, covering soil, compacting soil, and the like in untilled soil at one process, to create the soil requirements for high-speed transplanting of blanket seedlings such as rape and other crops, so as to produce a favorable shaping effect on the soil. The working components for ploughing and preparing soil is less likely to adhere to soil, which can ensure the transplanting quality during the high-speed transplanting. Furthermore, the fully-automatic transplanting combined machine of the present disclosure has a reasonable configuration with the ease of production, manufacturing, management and maintenance, and thus is suitable to be used and popularized.

2) The planting unit of the fully-automatic transplanting combined machine of the invention regulates seedlings to descend by the endless conveyor belt, which effectively solves the low planting efficiency since the seedlings only rely on their own weights to drop down. The process of picking, conveying, and planting blanket seedlings such as rape can be accomplished by the rotary planting mechanism, thereby significantly improving the working efficiency.

3) The fully-automatic transplanting combined machine is capable of performing a precise closed-loop control on the planting speed of the combined machine by the ground wheel speed measurement system and the sensors, which improves the working efficiency and performance.

4) Compared with existing active control contour following systems, the ground contour-following system of the fully-automatic transplanting combined machine of the present disclosure performs an active control based on passive induction, has a low manufacturing cost and thus is inexpensive for use, is easy to maintain, and has a stable operating state. Compared with existing passive contour following systems, the ground contour-following system of the present disclosure is structurally optimized, which can effectively reduce the vibration transmitted to the planting unit due to a sudden change of terrain, avoid mechanical damages, and has a favorable contour following performance.

Figure 1:
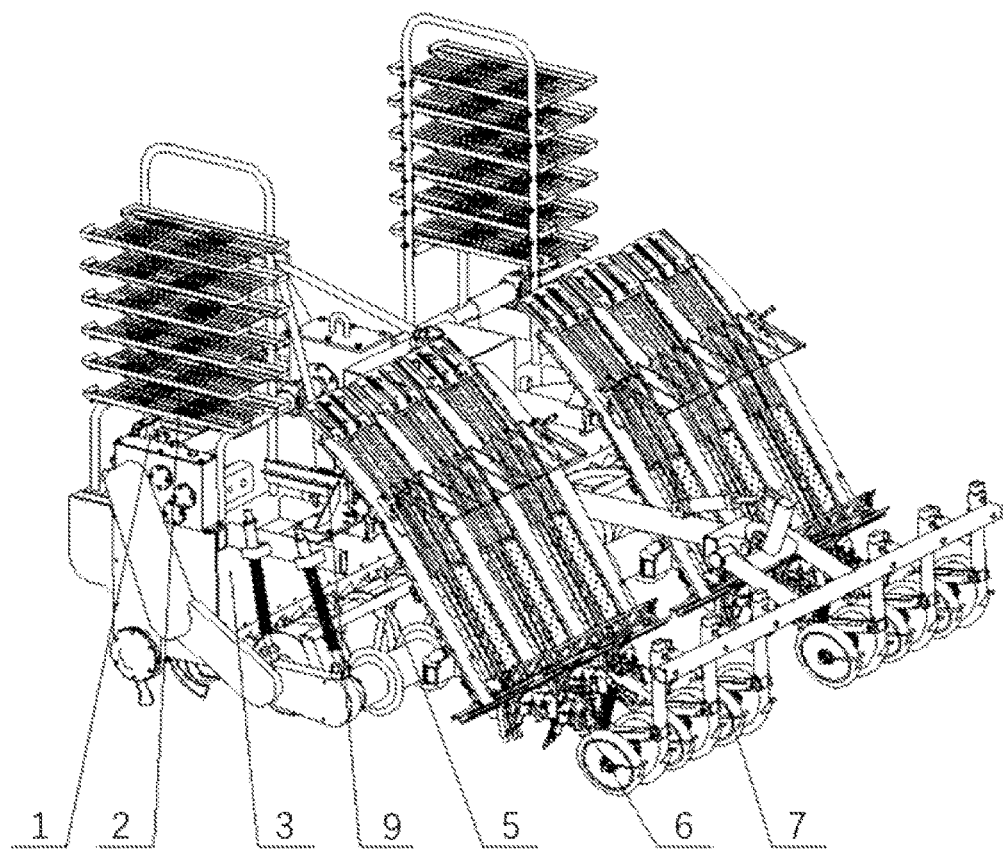
FIG. 1 is a schematic diagram showing a partial structure of the fully-automatic transplanting combined machine with two planting units.

1-hydraulic drive system 101-oil tank, 102-filter, 103-hydraulic pump, 104-overflow valve, 105-unloading valve, 106-throttle valve, 107-stop valve;

2-seedling rack;

3-rotary tillage middle furrowing system 301-rotary tillage device, 302-three-point suspension mechanism, 303-soil retaining cover, 304-first mounting support, 307-first-stage chain transmission mechanism, 308-second-stage chain transmission mechanism, 309-transmission box of the soil slight preparation device, 310-intermediate gear box, 311-rotary tillage cutter shaft, 312-rotary tillage transmission box, 313-third-stage chain transmission mechanism, 314-rotary tillage blade set, 315-middle furrowing cutter disc, 316-ditch cleaning shovel, 317-soil throwing cover;

4-ground wheel speed measurement device 401-adjusting rod, 402-fixed plate, 403-spring, 404-fixed shaft, 405-suspension arm, 406-bottom horizontal shaft, 407-ground wheel shaft, 408-second rotation speed sensor, 409-ground wheel, 411-screw, 412-sensor fixing plate, 413-welding position, 414-set screw, 415-bearing;

5-system for slightly preparing soil and opening narrow furrows 501-soil breaking roller, 502-soil scraping device for the soil breaking roller, 503-soil leveling and slitting roller, 504-circular inner auxiliary plate, 505-regular polygonal outer auxiliary plate, 506-sprocket box, 507-hanging rod, 508-pressure spring, 509-transition cover;

the soil breaking roller 501 includes: 501.1-soil breaking roller shaft, 501.2-left roller body, 501.3-right roller body, 501.4-annular groove;

the soil leveling and slitting roller 503 includes: 503.1-soil leveling and slitting roller shaft, 503.2-circular cutter disc, 503.3-soil compacting roller body;

6-planting system 601-endless conveyor belt, 602-gear plate, 603-gear lever, 605-hydraulic motor, 606-second mounting support, 608-reciprocating lead screw, 609-auxiliary hanging rack, 610-first rotation speed sensor, 611-planting arm, 613-second transmission box, 614-right bearing support, 615-linear guide rail, 616-pulling sliding block, 617-pawl, 618-first transmission box, 619-intermediate rotating shaft, 620-driven sprocket, 621-connection angle iron, 622-drive sprocket 623-left bearing support, 624-guide block, 625-first shift tooth, 626-ratchet shaft, 627-second shift tooth, 628-sliding rod, 629-seedling box;

the second mounting support 606 includes: 606.1-main beam the auxiliary hanging rack 609 includes: 609.1-hanging rod;

7-soil covering compacting system

701-hydraulic quick connector, 702-oil pipe; 703-fixed support, 704-oil cylinder, 705 hinge shaft, 706-hanging connection rack, 707-soil covering and compacting wheel assembly;

the soil covering and compacting wheel assembly 707 includes: 707.1-spring base plate, 707.2-wheel assembly, 707.3-spring, 707.4-ball hinge block, 707.5-soil covering movable support, 707.6-third shaft pin, 707.7-intermediate shaft, 707.8-fixed rod;

the wheel assembly 707.2 includes: 702.2.1-soil scraper, 702.2.2-soil scraper support, 702.2.3-sliding sleeve, 702.2.4-ball shaft, 702.2.5-bearing, 702.2.6-wheel body, 702.2. 7-rubber layer

8-traction apparatus;

9-ground contour-following system

901-inductive wheel, 902-movable support, 903-fixed lug, 904-second fixed support, 905-buffer spring, 906-adjustable rod, 907-pull wire, 908-movable lug, 909-third mounting support, 910-valve group, 911-pull lug, 912-second return spring;

the inductive wheel 901 includes: 901.1-outer rubber wheel, 901.2-intermediate shaft sleeve;

the movable support 902 includes: 902.1-grooved shaft hole;

10-control panel;

11-electric cylinder;

12-lift cylinder;

13-lifting control handle; and

14-triple pump.

DETAILED DESCRIPTION OF THE EMBODIMENTS

Figure 2:
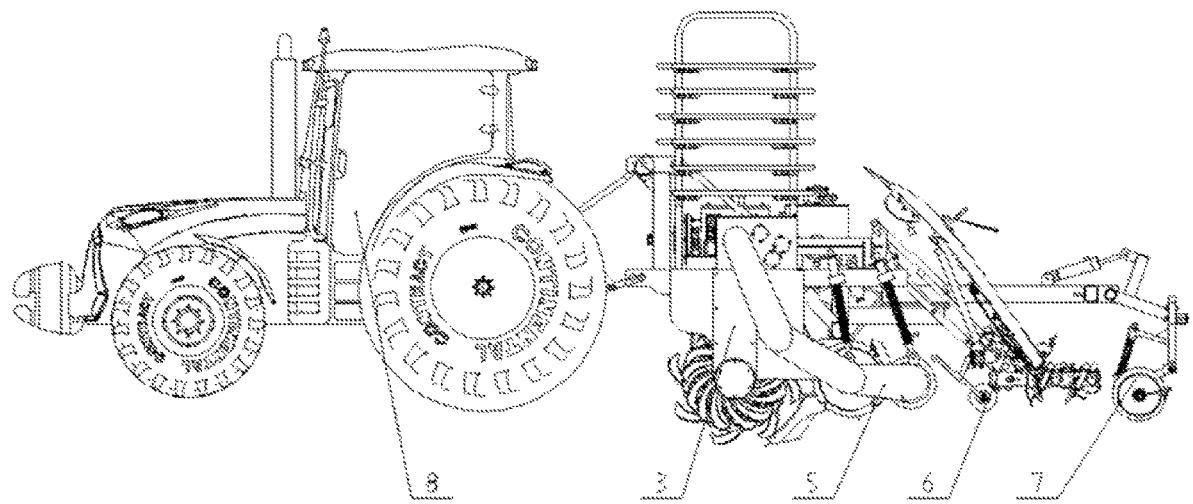
FIG. 2 is a schematic diagram showing an overall structure of the fully-automatic transplanting combined machine.
Figure 3:
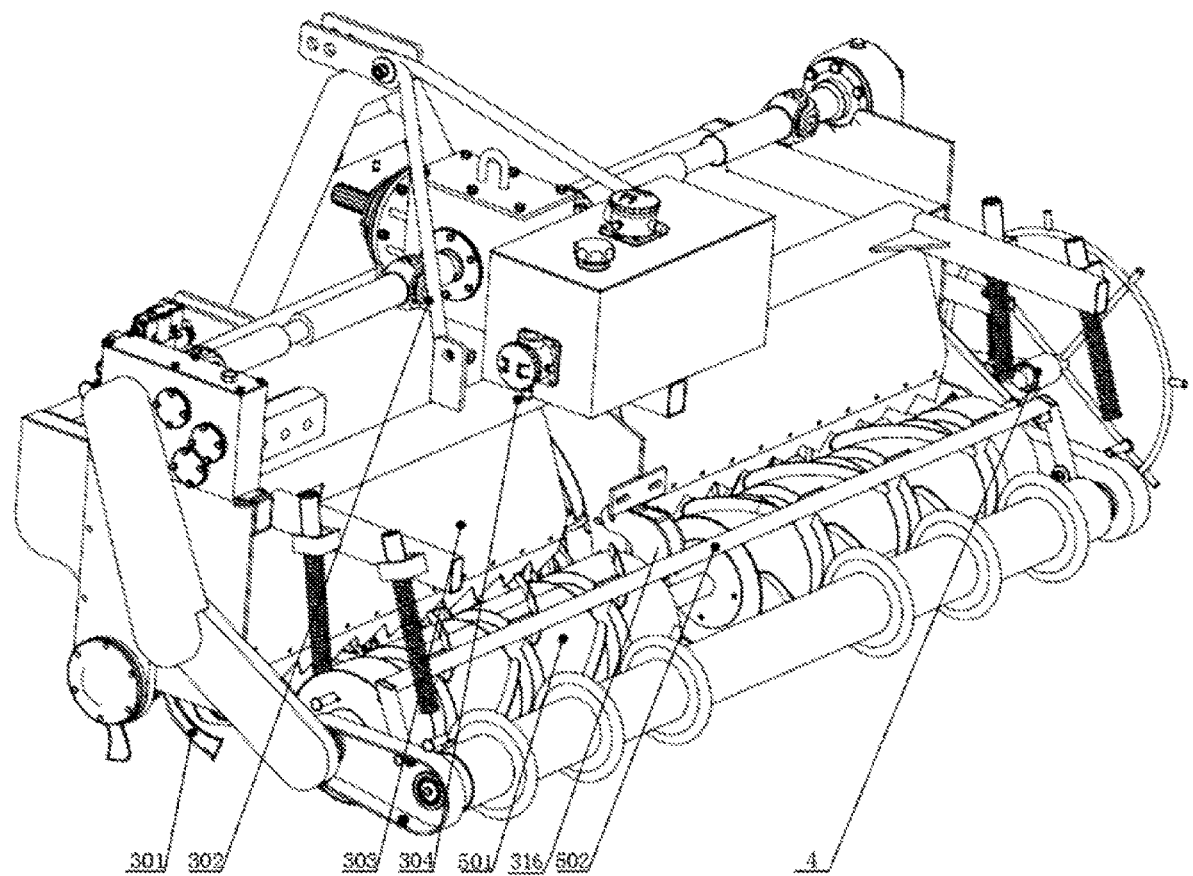
FIG. 3 is a structural schematic diagram showing the rotary tillage furrowing system and the system for slightly preparing soil and opening narrow furrows.

As shown in FIGS. 1 and 2, the transplanting combined machine includes the operating console, the control system, the main body frame, the hydraulic drive system 1, the seedling rack 2, the rotary tillage furrowing system 3, the ground wheel speed measurement system 4, the system 5 for slightly preparing soil and opening narrow furrows, the planting system 6, the soil covering compacting system 7, the traction apparatus 8, and the ground contour-following system 9.

The hydraulic drive system 1, the seedling rack 2, the rotary tillage furrowing system 3, the ground wheel speed measurement system 4, the system 5 for slightly preparing soil and opening narrow furrows, the planting system 6, the soil covering compacting system 7, the traction apparatus 8, and the ground contour-following system 9 are separately mounted on the main body frame.

In the present embodiment, the traction apparatus 8 employs a tractor. The front end of the main body frame is connected to the tractor through the three-point suspension mechanism 302, and is driven by the tractor. The three-point suspension mechanism 302 is well known art and thus will not be described in detail. The operating console is arranged in a cab of the tractor and is connected to the control system. The rotary tillage furrowing system 3, the system 5 for slightly preparing soil and opening narrow furrows, the planting system 6, and the soil covering compacting system 7, and the like, are successively arranged behind the traction apparatus 8 from front to back. In the present embodiment, the front indicates the moving direction of the combined machine.

In order to further illustrate the technical solution and working principle of the present disclosure, each component will be expressly described hereinafter with reference to the drawings and embodiments.

(1) Seedling Rack

As shown in FIG. 1 and FIG. 2, the seedling rack 2 is mounted at the front of the main body frame. A plurality of seedling trays can be stacked in the seedling rack 2. The plurality of seedling trays are configured to store blanket seedlings added to the planting system, so that the combined machine can carry a large number of seedlings at one time, which facilitates the continuous operation.

(2) Rotary Tillage Furrowing System and System for Slightly Preparing Soil and Opening Narrow Furrows As shown in FIGS. 3 to 8, the rotary tillage furrowing system 3 is provided with the rotary tillage cutter shaft 311, the ditch cleaning shovel 316, the soil retaining cover 303, the soil throwing cover 317, and others.

The rotary tillage cutter shaft 311 is horizontally mounted on the first mounting support 304. The first mounting support 304 is fixedly connected to the main body frame, and includes a beam, a left side arm, and a right side arm, wherein the left side arm and the right side arm are located at the both ends of the beam. The two ends of the rotary tillage cutter shaft 311 are connected to the left side arm and the right side arm of the first mounting support 304 through bearings.

The middle of the rotary tillage cutter shaft 311 is provided with the middle furrowing cutter disc 315 configured to open a furrow ditch (i.e., a drainage ditch). The plurality of rotary tillage blade sets 314 are arranged on both sides of the rotary tillage cutter shaft 311. Each of the plurality of rotary tillage blade sets 314 includes a plurality of blades arranged around the rotary tillage cutter shaft 311, and the plurality of blades are directly fixed on the rotary tillage cutter shaft 311. The middle furrowing cutter disc 315 includes a disc body and a plurality of blades arranged around the disc body. The blade is fixed at the edge of the disc body, and the disc body is fixedly mounted in the middle of the rotary tillage cutter shaft 311 in a coaxial manner. The outer diameter of the middle furrowing cutter disc 315 is greater than the outer diameter of the rotary tillage blade set 314, and the soil turned over by the middle furrowing cutter disc 315 is deeper than the soil turned over by the rotary tillage blade set 314.

Figure 5:
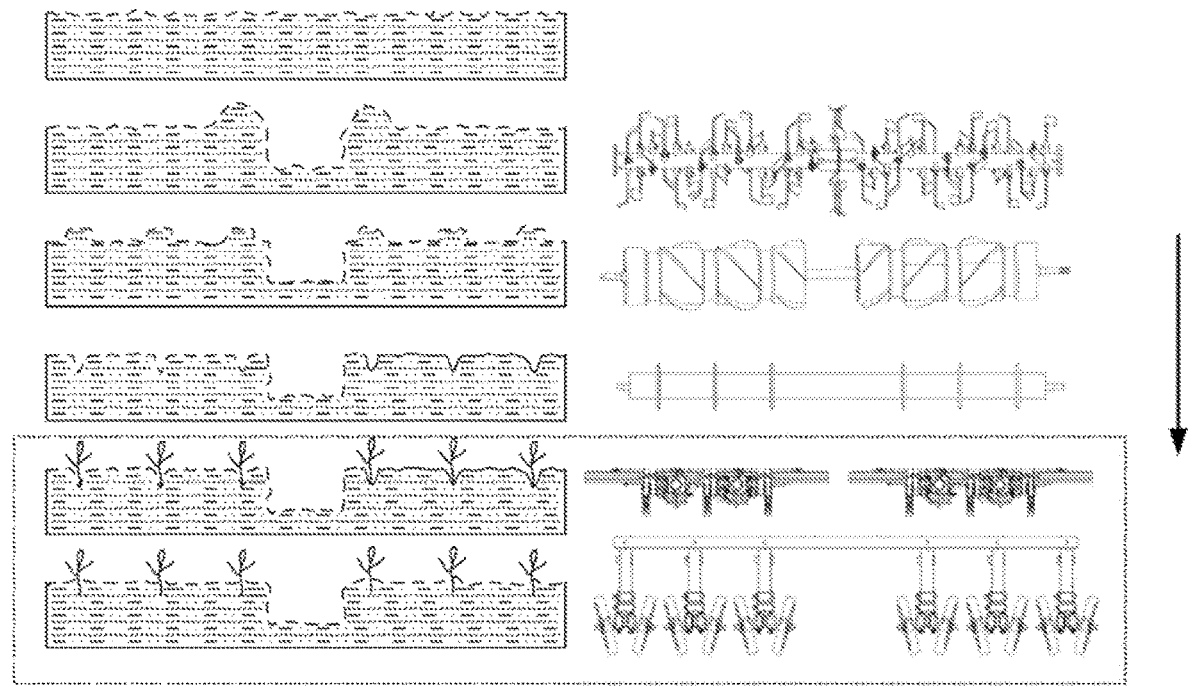
FIG. 5 is a schematic diagram showing the structure and work flow of the rotary tillage furrowing system and the system for slightly preparing soil and opening narrow furrows.
Figure 6:
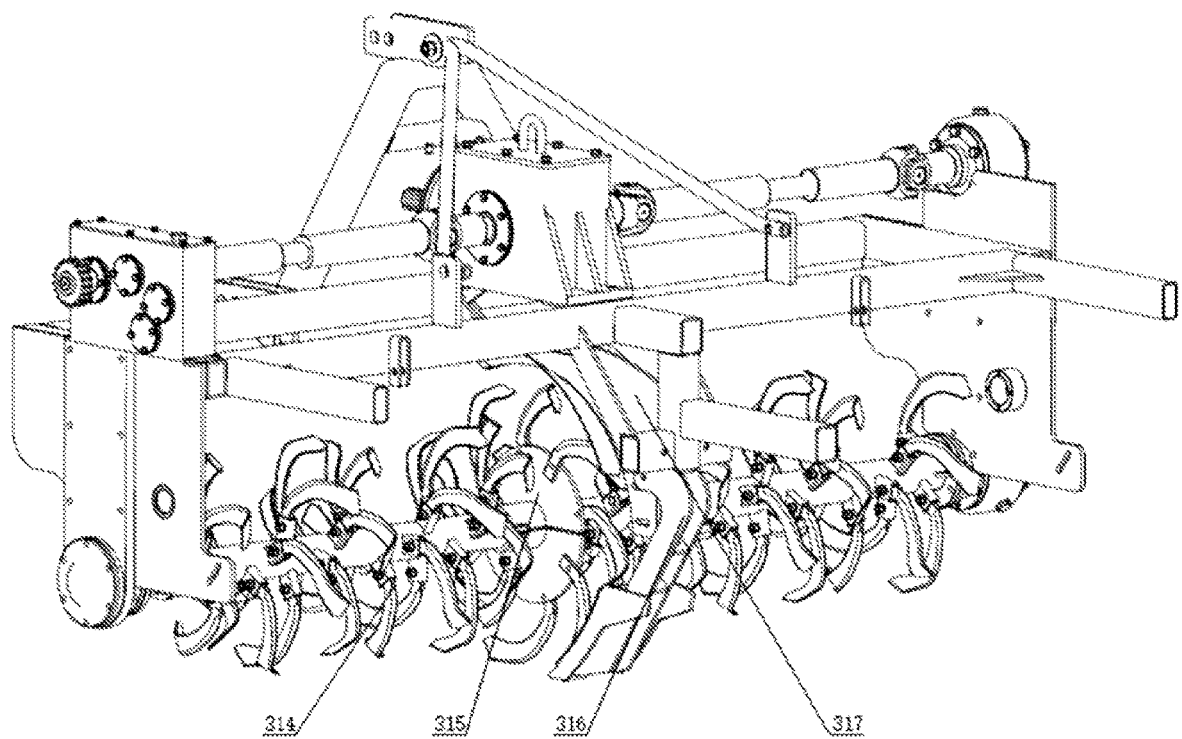
FIG. 6 is a structural schematic diagram showing the rotary tillage furrowing system.
Figure 7:
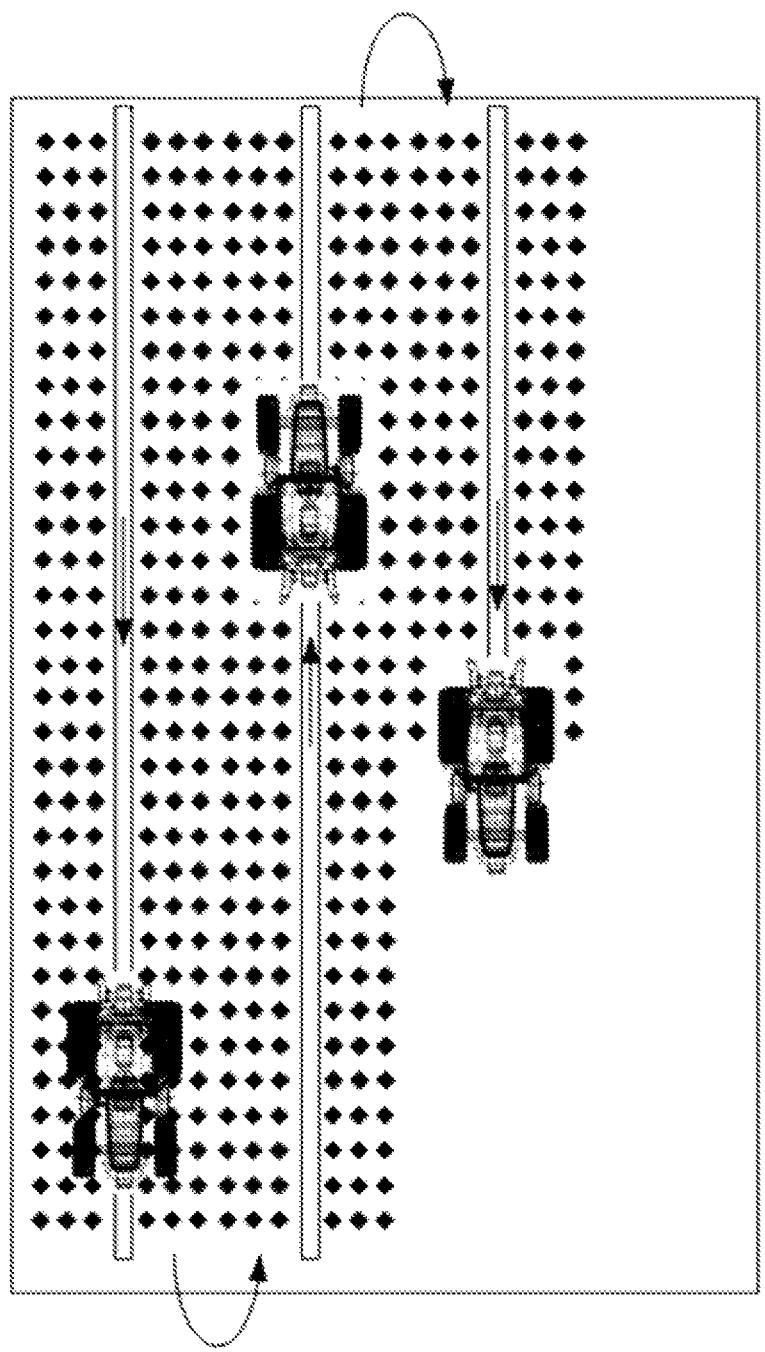
FIG. 7 is a schematic diagram showing the running route of the fully-automatic transplanting combined machine in a field.

The ditch cleaning shovel 316 is arranged behind the middle furrowing cutter disc 315. The bottom of the ditch cleaning shovel 316 is inclined towards the heading direction of the combined machine. The soil throwing cover 317 is arranged above the ditch cleaning shovel 316, and is connected to the top of the ditch cleaning shovel 316. The soil throwing cover 317 is provided with an arc-shaped baffle. The arc-shaped baffle arches upwards, extends in the heading direction of the combined machine, and guides the soil shoveled by the ditch cleaning shovel 316 to move forward, so that the shoveled soil is pushed toward two sides of the ditch body, as shown in FIG. 5.

The soil retaining cover 303 is arranged behind the rotary tillage blade set 314, and is located between the rotary tillage blade set 314 and the soil breaking roller 501. Two covers are arranged one each on the left side and the right side of the soil retaining cover 303, and the soil throwing cover 317 is sandwiched between the two covers. The soil throwing cover 317 and the soil retaining cover 303 are configured to block and level the soil which is turned up by the rotary tillage. The bottom of the soil retaining cover 303 preferably includes a saw-toothed structure.

The ditch cleaning shovel 316, the soil throwing cover 317, and the soil retaining cover 303 are all fixedly connected to the beam of the first mounting support 304.

Figure 9:
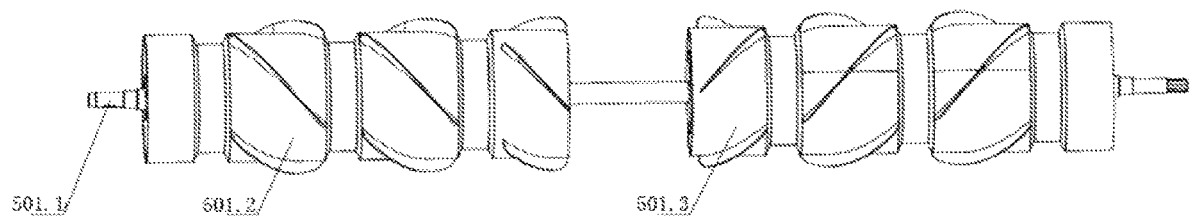
FIG. 9 is a structural schematic diagram showing the soil breaking roller.

The system 5 for slightly preparing soil and opening narrow furrows is arranged behind the rotary tillage furrowing system 3, and is provided with the soil breaking roller 501, the soil scraping device 502 for the soil breaking roller, the soil leveling and slitting roller 503, and other components. As shown in FIG. 9, the soil breaking roller 501 includes the left roller body 501.2 and the right roller body 501.3 mounted on the soil breaking roller shaft 501.1. There is a space between the left roller body 501.2 and the right roller body 501.3, and the space is aligned with the middle furrowing cutter disc 315 on the rotary tillage cutter shaft 311 in the front.

The soil breaking roller 501 and the soil leveling and slitting roller 503 are both parallel to the rotary tillage cutter shaft 311. The left side and the right side of the soil breaking roller 501 and the soil leveling and slitting roller 503 are both provided with the transition cover 509 and the sprocket box cover 506, respectively. The two ends of the roller shaft of the soil breaking roller 501 and the soil leveling and slitting roller 503 are connected to the transition cover 509 and the sprocket box cover 506 through bearings, respectively.

The structure of the transition cover 509 is identical to the structure of the sprocket box cover 506. The sprocket box cover 506 is further configured to mount the drive sprocket, while the transition cover 509 is only configured to mount the soil breaking roller 501 and the soil leveling and slitting roller 503.

Figure 8:
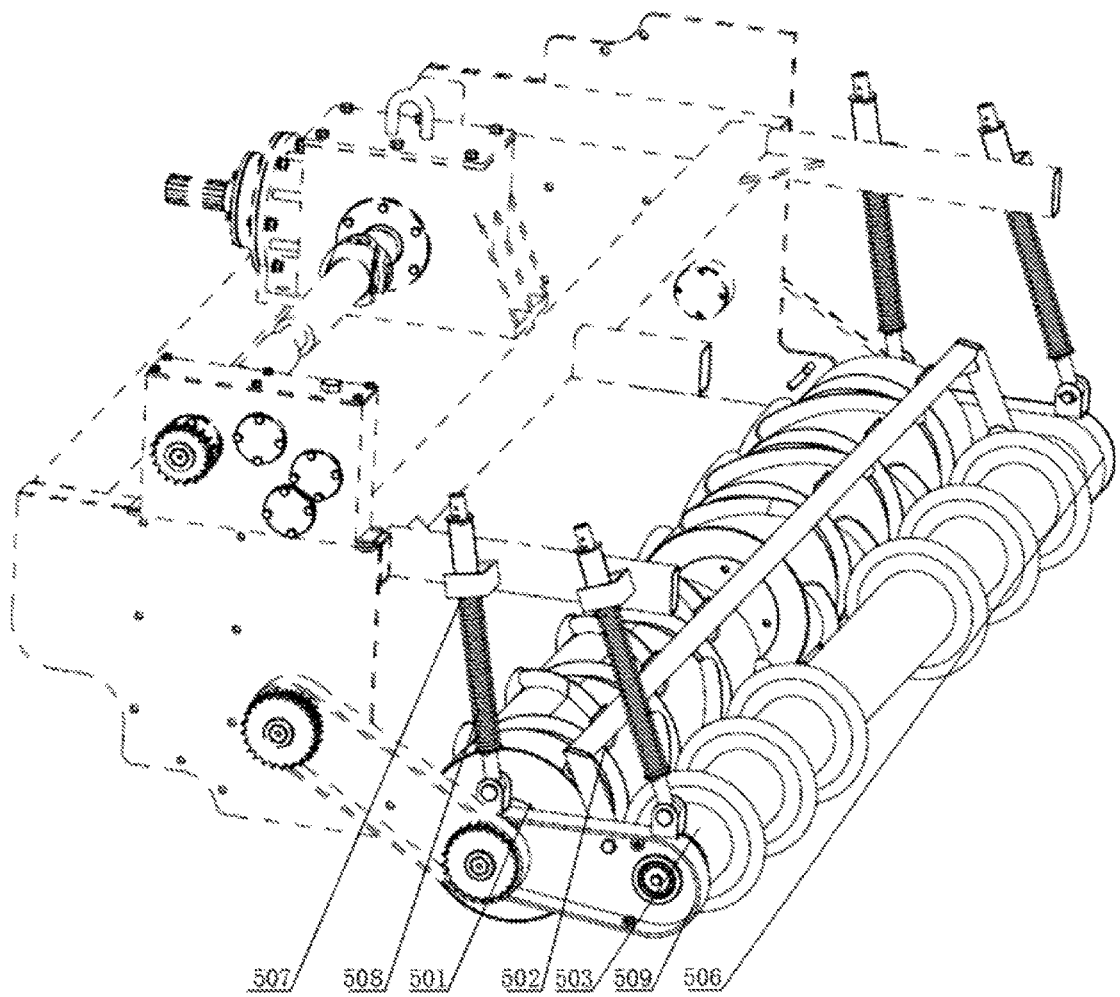
FIG. 8 is a schematic diagram showing a partial structure of the rotary tillage furrowing system and the system for slightly preparing soil and opening narrow furrows.

As shown in FIG. 8, the transition cover 509 and the sprocket box cover 506 are separately connected to the above cantilever through two hanging rods 507, and the cantilever is fixed on the main body frame. The upper end and the lower end of the hanging rod 507 are hinged to the cantilever, the transition cover 509 or the sprocket box cover 506 through a hinged support. The hinged supports of the two hanging rods 507 located at the same side are located uprightly above the roller shafts of the soil breaking roller 501 and the soil leveling and slitting roller 503, respectively.

The pressure spring 508 is mounted on the hanging rod 507. A certain pressure is applied to the soil breaking roller 501 and the soil leveling and slitting roller 503 by the pressure spring 508 to ensure the contact pressure between the soil breaking roller and the soil, or between the soil leveling and slitting roller and the soil.

Figure 12:
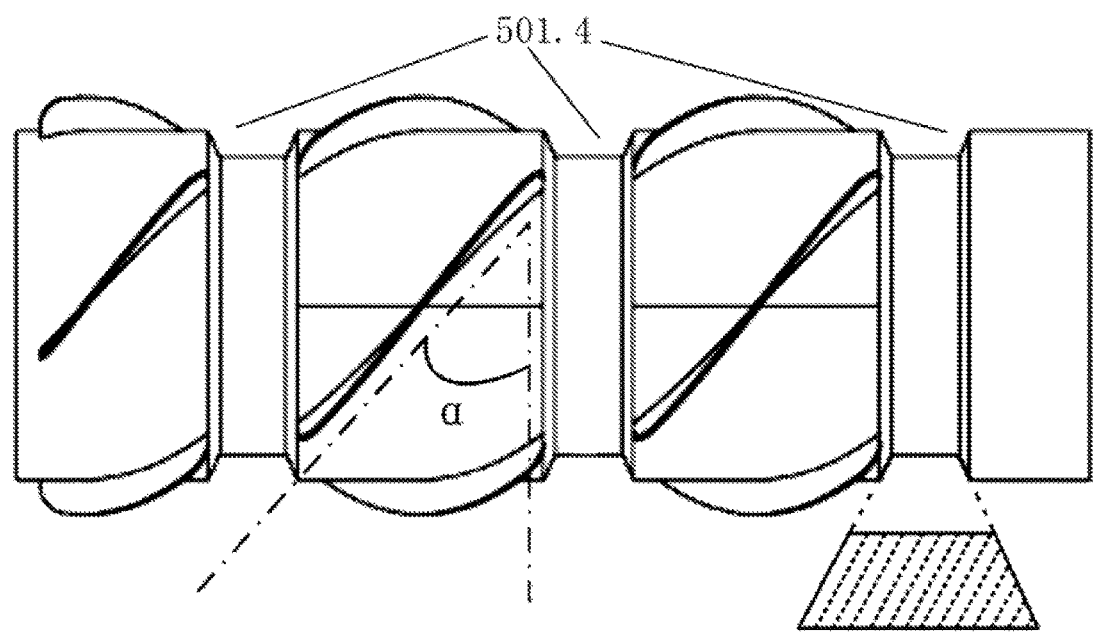
FIG. 12 is a front view of the right roller body of the soil breaking roller.

Taking the right roller body 501.3 as an example, as shown in FIG. 9 and FIG. 12, the right roller body 501.3 is provided with three unit segments along the axial direction of the right roller body 501.3, and the surface of each unit segment is provided with spiral blades. The unit segments are spaced apart by the annular groove 501.4. Also, the outermost unit segment and the end of the right roller body 501.3 are spaced apart by the annular groove 501.4. The cross section of the annular groove 501.4 in the radial direction of the right roller body 501.3 is a trapezoid, and the outer base edge of the trapezoid is wider than the inner base edge. Namely, the annular groove 501.4 is wide outside and is narrow inside. The left roller body 501.2 and the right roller body 501.3 are symmetrical with respect to the center line between the left roller body 501.2 and the right roller body 501.3. The spiral blade on the right roller body 501.3 is a left-handed thread, and the spiral blade on the left roller body 501.2 is a right-handed thread. The helix angle α of the spiral blade is 24°. The spiral blades on the adjacent unit segments of the left roller body or the right roller body are cut off by the annular groove 501.4, while the spiral of the spiral blades is still successive.

The two ends of the soil scraping device 502 for the soil breaking roller are fixedly mounted on the transition cover 509 and the sprocket box cover 506 through the support rod. The middle of the soil scraping device 502 for the soil breaking roller is a horizontal scraper. The horizontal scraper is parallel to the soil breaking roller 501, arranged adjacent to the spiral blade, and configured to scrape the soil adhered to the spiral blade.

The left roller body and the right roller body are sleeved on the soil breaking roller shaft 501.1 through the central shaft hole, and are detachable and fixed on the soil breaking roller shaft 501.1 by the locking device.

Figure 13:
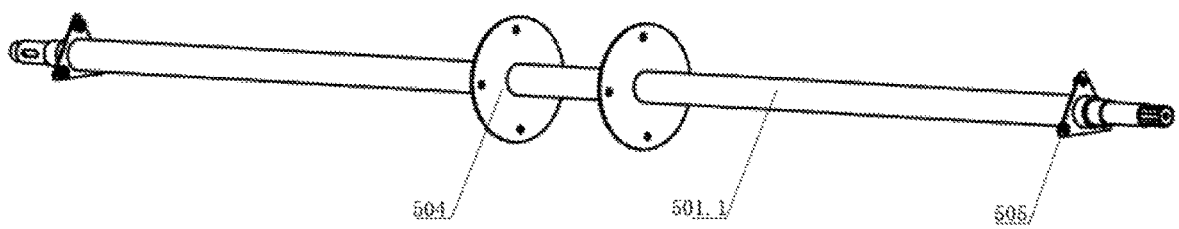
FIG. 13 is a structural schematic diagram showing the soil breaking roller shaft.

As shown in FIG. 13, the locking device includes two sets of auxiliary plates configured to fix the left roller body and the right roller body, respectively. Each of the two sets of auxiliary plates includes the regular polygonal outer auxiliary plate 505 and the circular inner auxiliary plate 504. The regular polygonal outer auxiliary plate 505 is fixed at the end portion of the soil breaking roller shaft 501.1, is perpendicular to the soil breaking roller shaft 501.1, and is concentric with the soil breaking roller shaft 501.1. The circular inner auxiliary plates 504 are fixed at a position close to the middle of the soil breaking roller shaft 501.1, are perpendicular to the soil breaking roller shaft 501.1, and are concentric with the soil breaking roller shaft 501.1. A space corresponding to the middle furrowing cutter disc 315 is formed in front of the two circular inner auxiliary plates 504. Each of the central shaft holes of the left roller body and the right roller body is formed by an inner shaft hole and an outer shaft hole which are coupled with one another. The inner shaft hole is a circular hole, and the size of the inner shaft hole is greater than the size of the outer shaft hole. The outer shaft hole is in the shape of a regular polygon that is consistent with the shape of the regular polygonal outer auxiliary plate. The inner shaft hole and the outer shaft hole are coaxial, so that the regular polygonal outer auxiliary plate 505 can pass through the entire central shaft hole.

The diameter of the circular inner auxiliary plate 504 is greater than the diameter of the inner shaft hole, so that the edge of the circular inner auxiliary plate can be fixed to the inner end surface of the left roller body or the right roller body by bolts. The sharp corner of the regular polygonal outer auxiliary plate 505 is provided with a screw hole. After the regular polygonal outer auxiliary plate and the outer shaft hole are arranged alternately, the sharp corner of the regular polygonal outer auxiliary plate can be fixed to the outer end surface of the left roller body or the right roller body by bolts. The outer end surface of the left roller body or the right roller body is provided with bolt mounting holes corresponding the bolts.

Figure 10:
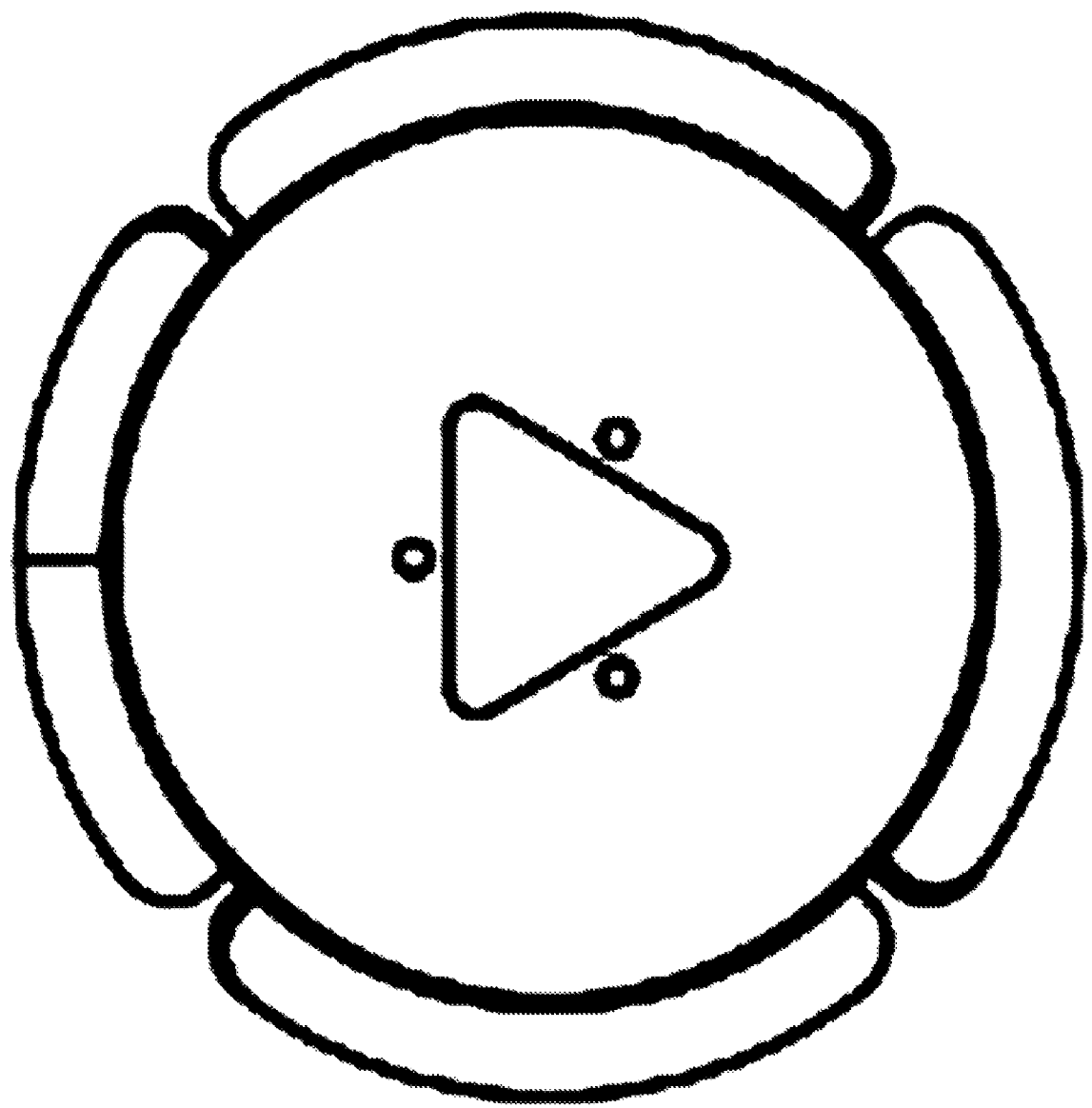
FIG. 10 is a right view of the right roller body of the soil breaking roller.
Figure 11:
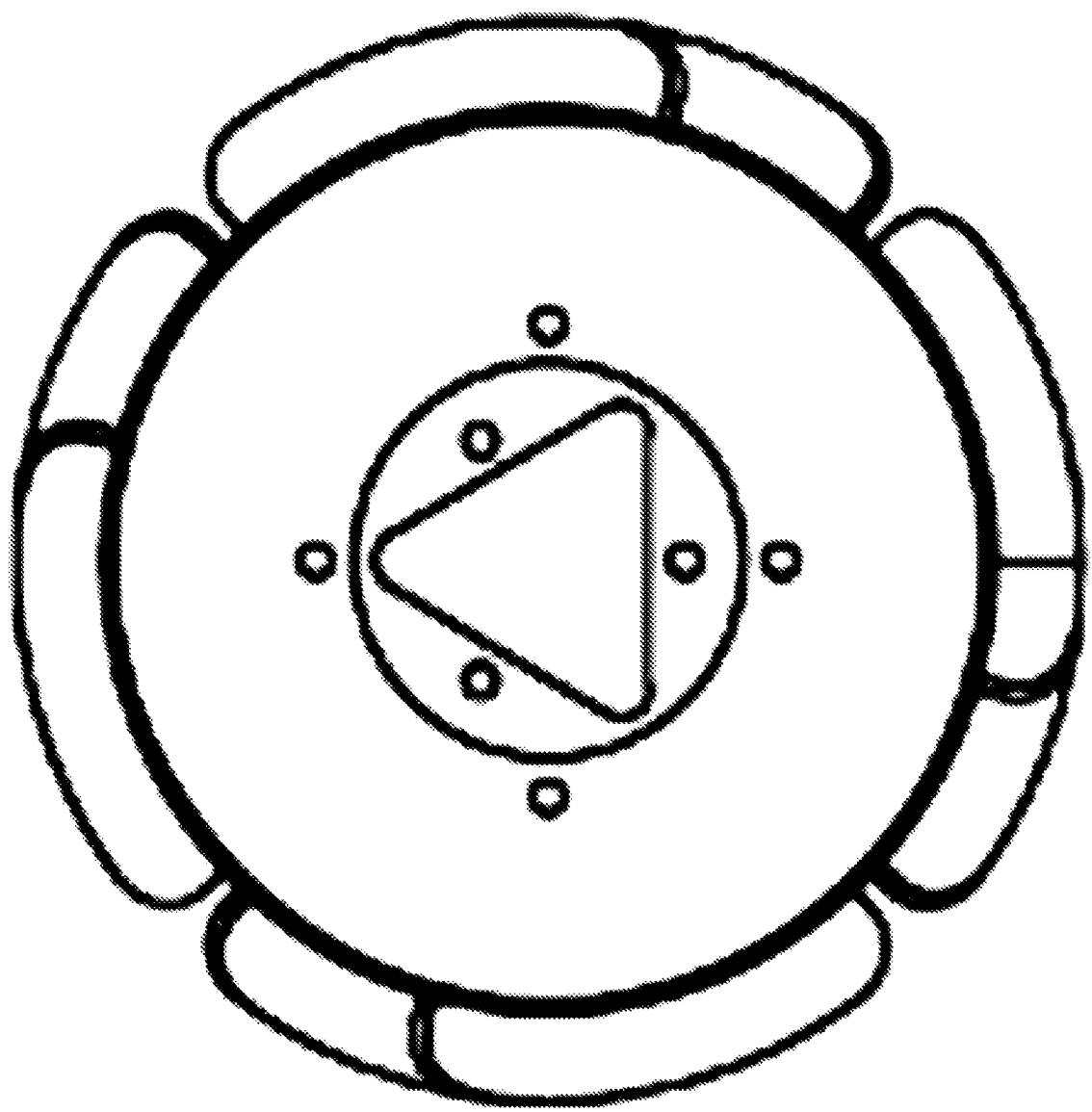
FIG. 11 is a left view of the right roller body of the soil breaking roller.

The regular polygonal outer auxiliary plate 505 and the outer shaft hole are preferably in the shape of a triangle, as shown in FIG. 10 and FIG. 11. Taking the right roller body as an example, when the right roller body is installed, the right roller body is inserted into the right end of the soil breaking roller shaft 501.1, and the inner auxiliary plate and the outer auxiliary plate pass through the shaft holes in sequence. When the inner end surface of the right roller body contacts the circular inner auxiliary plate 504, the right roller body is rotated so that the regular polygonal outer auxiliary plate 505 and the outer shaft hole are arranged alternately. The circular inner auxiliary plate 504 is fixed on the inner end surface of the right roller body by four bolts and preset bolt holes, and the triangular outer auxiliary plate is fixedly connected to the outer end surface of the right roller body by three bolts.

Figure 14:
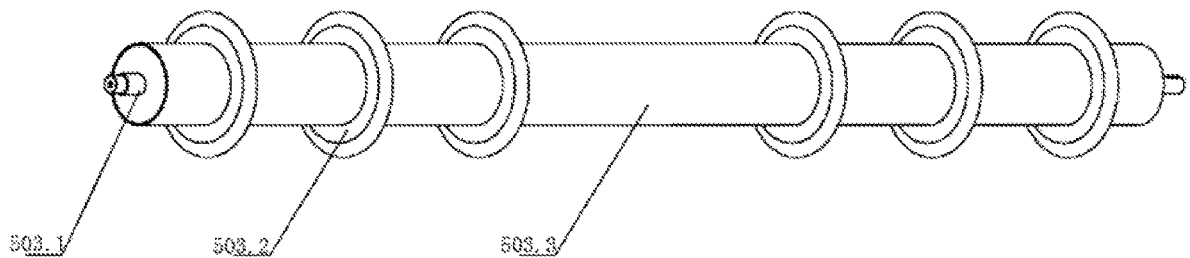
FIG. 14 is a structural schematic diagram showing the soil leveling and slitting roller.

As shown in FIG. 14, the soil leveling and slitting roller 503 includes the soil leveling and slitting roller shaft 503.1, a plurality of circular cutter discs 503.2, and a plurality of soil compacting roller bodies 503.3, wherein the plurality of circular cutter discs 503.2 and the plurality of soil compacting roller bodies 503.3 are coaxially mounted on the soil leveling and slitting roller shaft 503.1, and are arranged alternately.

The soil leveling and slitting roller 503 is provided with two sets of circular cutter discs 503.2 on the left and right, and each of the two sets of circular cutter discs 503.2 includes three circular cutter discs 503.2. The soil compacting roller body 503.3 is arranged between adjacent circular cutter discs 503.2 and between the outermost circular cutter disc 503.2 and the end of the soil leveling and slitting roller shaft 503.1. Namely, the circular cutter disc 503.2 is arranged between two adjacent soil compacting roller bodies 503.3.

The circular cutter disc 503.2 is provided with a wedge-shaped cutting edge. The surface of the soil compacting roller body 503.3 is covered with a rubber layer having a thickness of 5 mm. The hardness of the material of the rubber layer can be selected between HA 60-HA 70. According to the test, the combined machine works optimally when the rubber hardness is HA 65. The plurality of circular cutter discs 503.2 on the soil leveling and slitting roller shaft 503.1 are in a one-to-one correspondence with the annular grooves 501.4 on the soil breaking roller 501, and are aligned with the annular grooves 501.4 front and rear. During the working process, the wedge-shaped cutting edge of the circular cutter disc 503.2 can effectively break the stubble to form a narrow furrow required for the subsequent transplanting operation. Meanwhile, the rubber layer of the soil compacting roller body 503.3, which has a hardness of HA 65, can be effectively prevented from adhering to soil.

Figure 4:
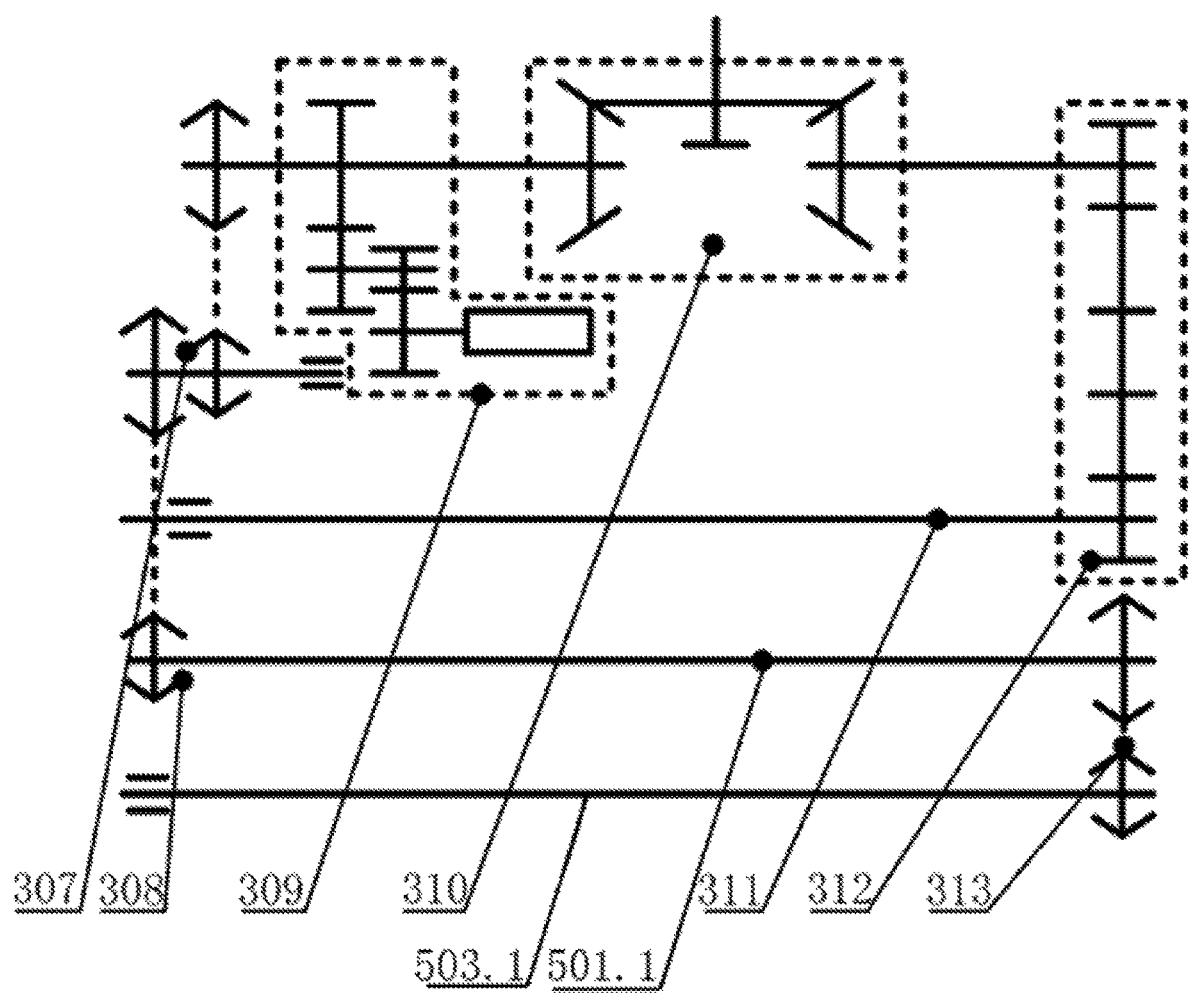
FIG. 4 is a schematic diagram showing the transmission of the rotary tillage furrowing system and the system for slightly preparing soil and opening narrow furrows.

As shown in FIG. 4, the intermediate gear box 310 is installed in the middle of the front portion of the main body frame, and the power input end of the intermediate gear box 310 is connected to the engine by a transmission to provide a power source for the rotary tillage furrowing system 3. The left output end of the intermediate gear box 310 is connected to the first transmission box 309. The first transmission box 309 drives the soil breaking roller shaft 501.1 to rotate by the first-stage chain transmission mechanism 307 and the second-stage chain transmission mechanism 308. The right output end of the intermediate gear box 310 drives the rotary tillage cutter shaft 311 to rotate by the second transmission box 312. The right end of the soil breaking roller shaft 501.1 drives the soil leveling and slitting roller shaft 503.1 to rotate by the third-stage chain transmission mechanism 313. The rolling direction of the soil breaking roller 501 and the soil leveling and slitting roller 503 is the same as the heading direction of the combined machine. The rotation speed of the soil breaking roller 501 is 180 to 250 rpm, and the rotation speed of the soil leveling and slitting roller 503 is slightly lower than the rotation speed of the soil breaking roller.

As shown in FIG. 5, the rotary tillage and ditching system 3 is driven by the tractor to turn over the soil and open a drainage ditch. Then, the soil is further finely broken and spread by the soil breaking roller 501, and is pushed to the annular groove to form a plurality of raised ridges. After that, the soil leveling and slitting roller 503 opens a narrow seeding furrow on the ridge, and levels the soil outside the narrow seeding furrow at the same time, so as to form a soil condition required for subsequent planting operations.

(3) Planting System

Figure 29:
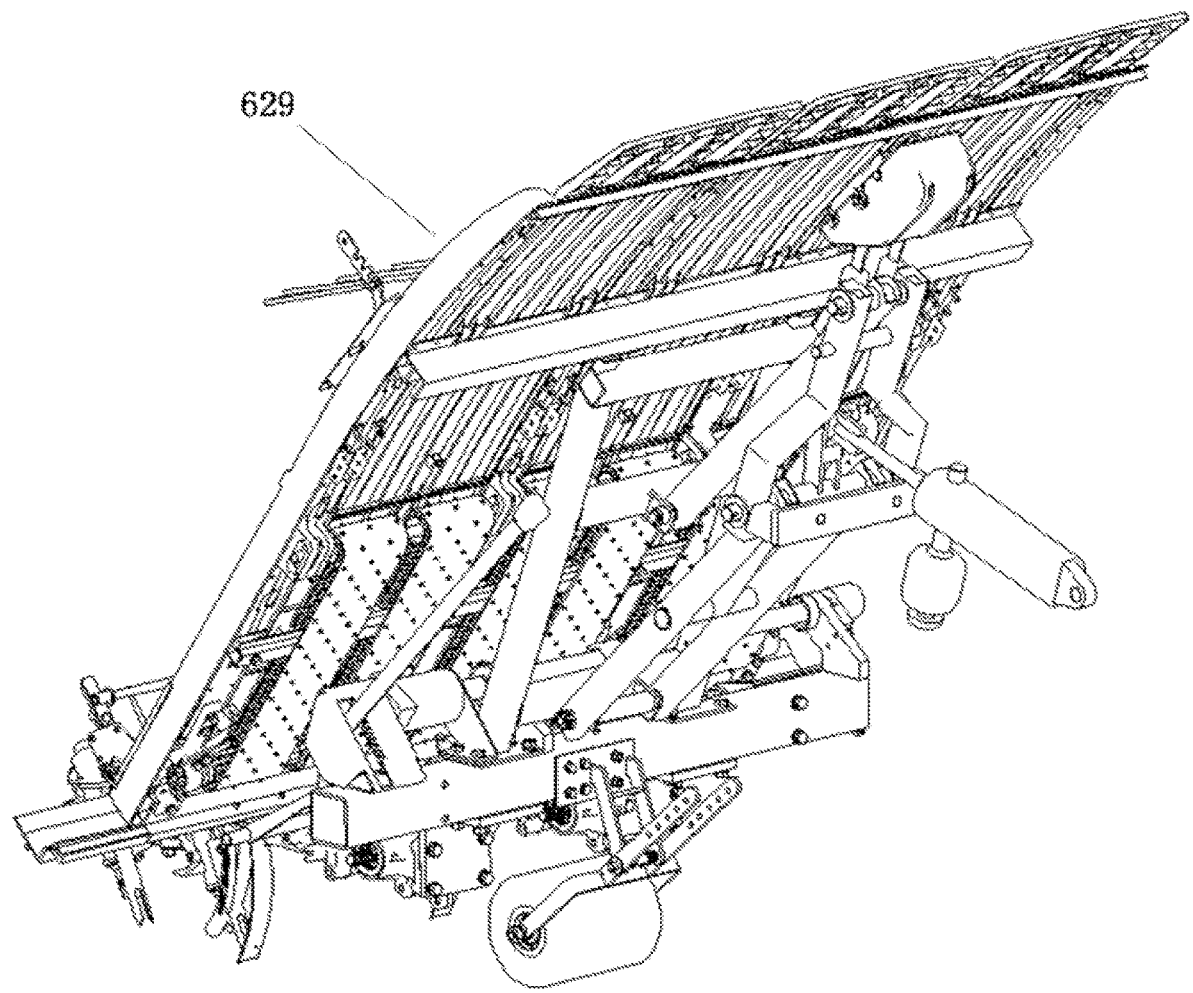
FIG. 29 is a schematic diagram showing the connection structure between the planting unit and the ground contour-following system.
Figure 32:
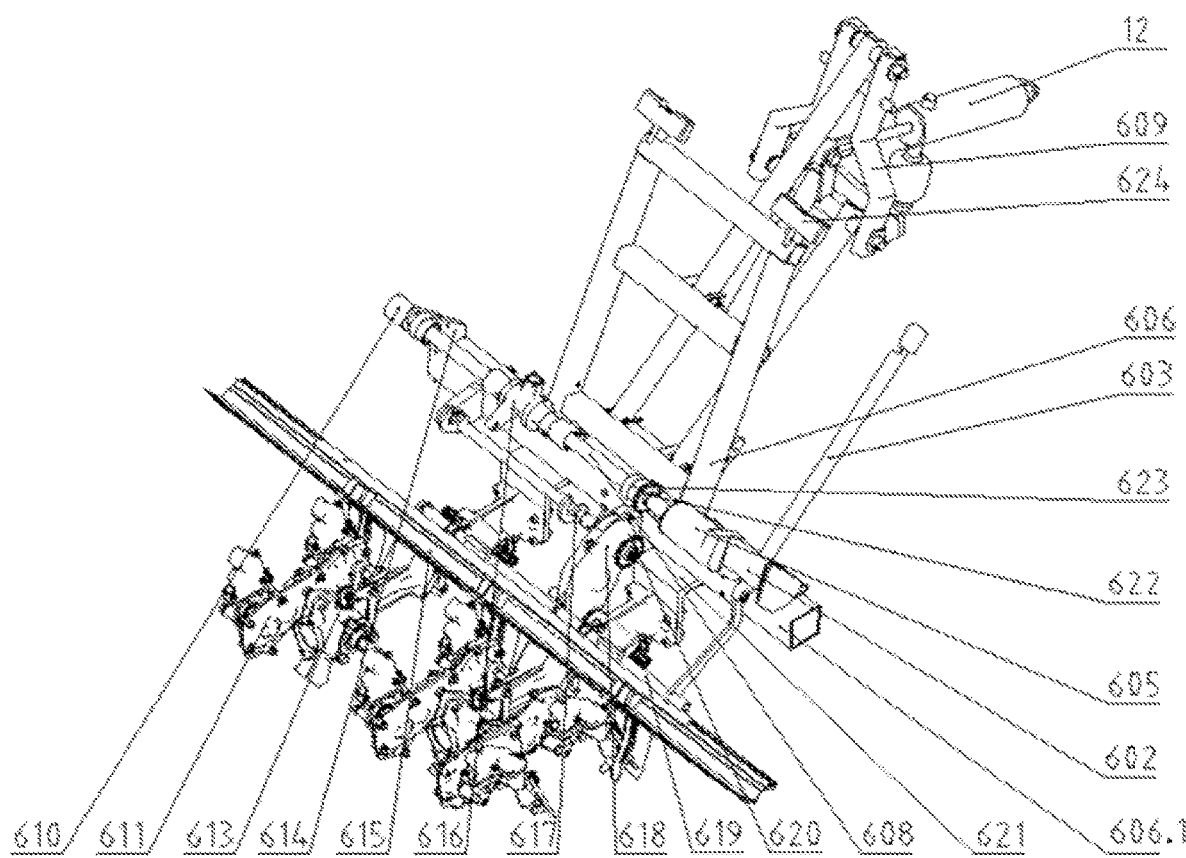
FIG. 32 is a structural schematic diagram showing the mounting support of the planting unit.
Figure 33:
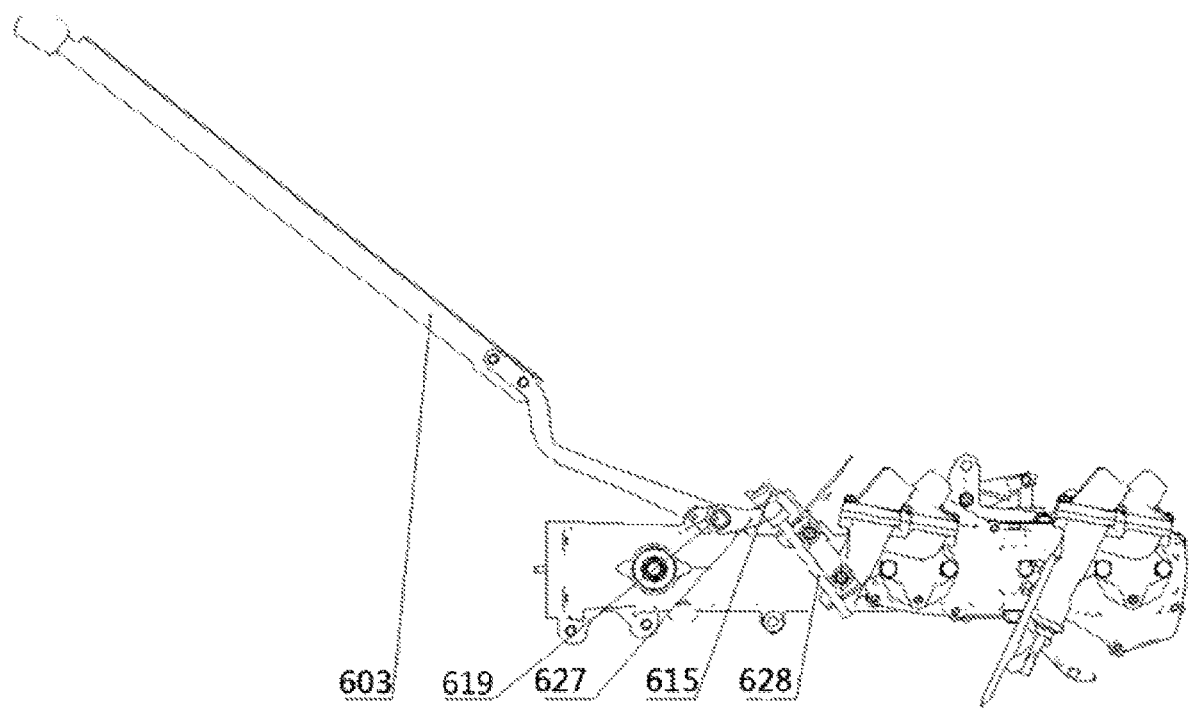
FIG. 33 is a structural schematic diagram showing the seedling box height regulating mechanism.

The planting system 6 is arranged behind the system 5 for slightly preparing soil and opening the narrow furrow and includes more than one planting unit. As shown in FIG. 1, FIG. 29, and FIG. 32, the planting unit includes the hanging rack, the second mounting support 606, the seedling box 629, the seedling feeding mechanism, the planting arm 611, the seedling box height regulating mechanism, a mechanism for laterally moving the seedling box, a transmission mechanism, and others.

Figure 34:
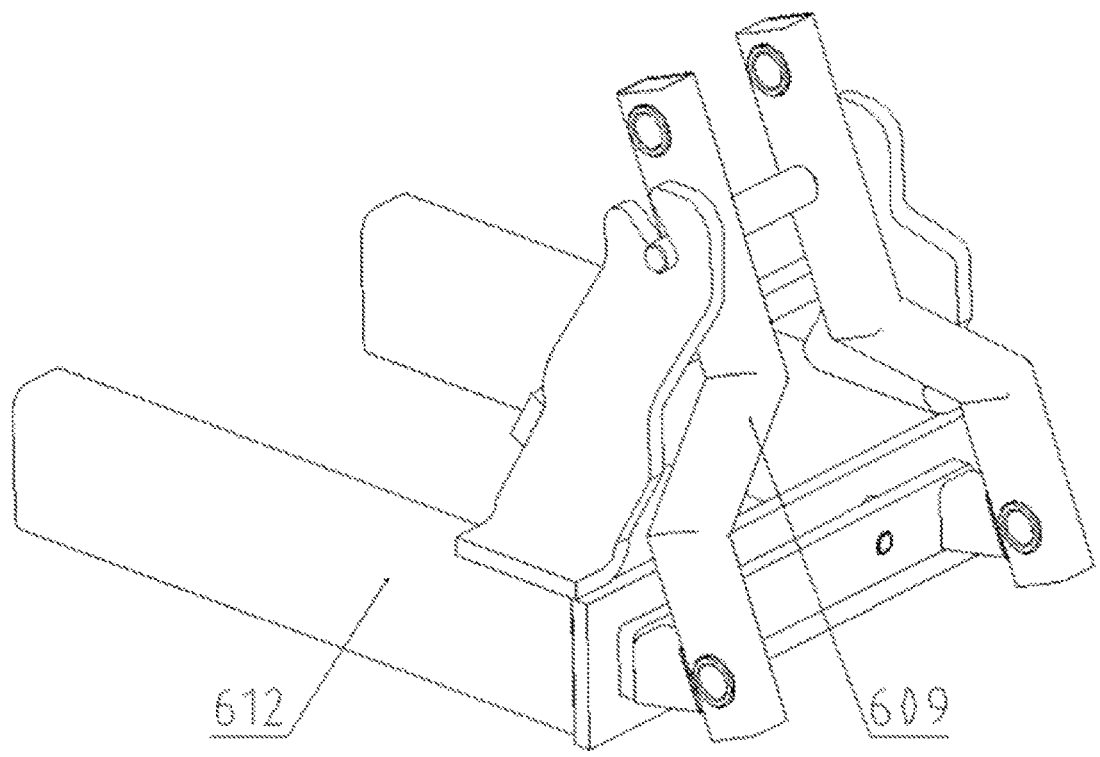
FIG. 34 is a structural schematic diagram showing the hanging rack.
Figure 35:
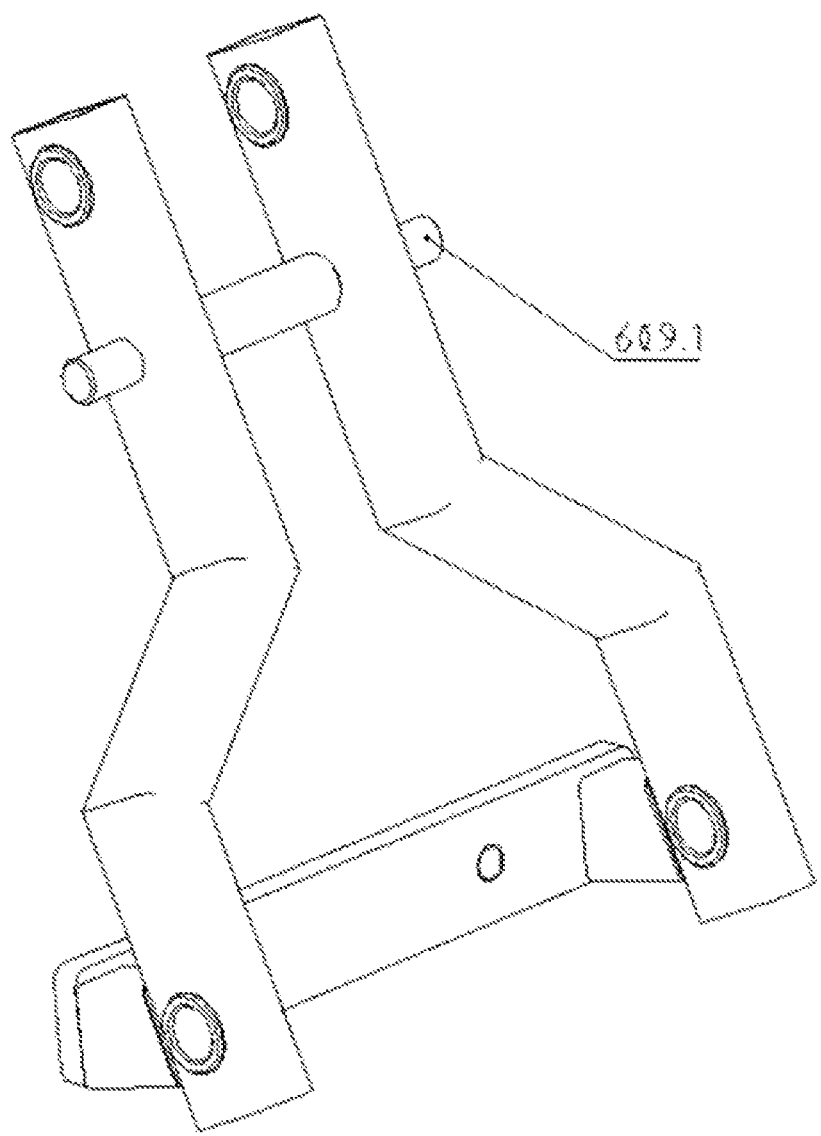
FIG. 35 is a structural schematic diagram showing the auxiliary hanging rack.

As shown in FIG. 34, the hanging rack includes the main rack 612 and the auxiliary hanging rack 609, and the main rack 612 is welded to the main body frame. The upper portion of the main rack 612 is provided with two hanging lugs on the left side and the right side, respectively, and the open grooves heading forward are symmetrically formed on the top of the two hanging lugs. As shown in FIG. 35, the upper portion of the auxiliary hanging rack 609 is provided with the hanging rod 609.1, and the lower portion of the auxiliary hanging rack 609 is provided with a fixed connection plate. When the planting unit is installed, the hanging rod 609.1 of the auxiliary hanging rack 609 is placed into the open groove of the main rack 612, and the fixed connection plate at the lower portion of the auxiliary hanging rack 609 is fixed to the main rack 612 by way of known fasteners, preferably by bolts. The bolt holes corresponding to the bolts are formed at the lower portion of the main rack 612 and the fixed connection plate. This hooking method is conducive to a quick installation and removal of the planting unit.

The second mounting support 606 is a main supporting structure of the seedling box 629 and includes the main beam 606.1 at the bottom of the planting unit. The second mounting support 606 is connected to the auxiliary hanging rack 609 by a movable frame (e.g. a parallel four-rod contour following structure) formed by parallel rods, so that the planting unit can follow the rise and fall ground to realize the contour following of the ground. The movable framework is made from known structures using methods known by skilled artisans and thus is not described in detail herein.

The seedling box 629 is obliquely arranged on the second mounting support 606, and is provided with a plurality of parallel seedling channels. The blanket seedlings are stored in the seedling channels, and are driven by a conveyor belt to move downward. The seedling channels are spaced apart by baffles, and a hollow portion is arranged at the lower portion of the seedling channel. The endless conveyor belt 601 is embedded in the hollow portion to drive the seedlings in the seedling channel to descend.

The seedling feeding mechanism includes the endless conveyor belt 601 and the ratchet transmission mechanism which drives the endless conveyor belt 601. The ratchet transmission mechanism includes the shift tooth rotating shaft, the ratchet shaft 626, and the pawl 617. The shift tooth rotating shaft is installed on the main beam 606.1 through a shaft seat, and the two first shift teeth 625 are installed on the shift tooth rotating shaft on the left and right, respectively. The ratchet shaft 626 and the pawl 617 are mounted on the box frame structure of the seedling box 629. The ratchet shaft 626 is a gear shaft and is arranged laterally. The surface of the ratchet shaft 626 is provided with a plurality of racks and a plurality of tooth spaces which are extended horizontally. The pawl 617 is mounted beside the ratchet shaft 626 through a shaft pin at a pivot, and is configured to drive the ratchet shaft 626 to rotate. The endless conveyor belt 601 is winded around the ratchet shaft 626. A protrusion array is arranged on a contact surface between the endless conveyor belt 601 and the ratchet shaft 626. The protrusions forming the protrusion array are engaged with the tooth spaces of the ratchet shaft 626. The protrusion array is formed by a plurality of rivets that are regularly mounted on the endless conveyor belt. The head of each of the rivets forms the corresponding protrusions, and the tip of each of the rivets penetrates the conveyor belt and contacts the seedlings to fix and limit the seedlings, so as to prevent the seedlings from sliding down freely due to gravity.

Figure 39:
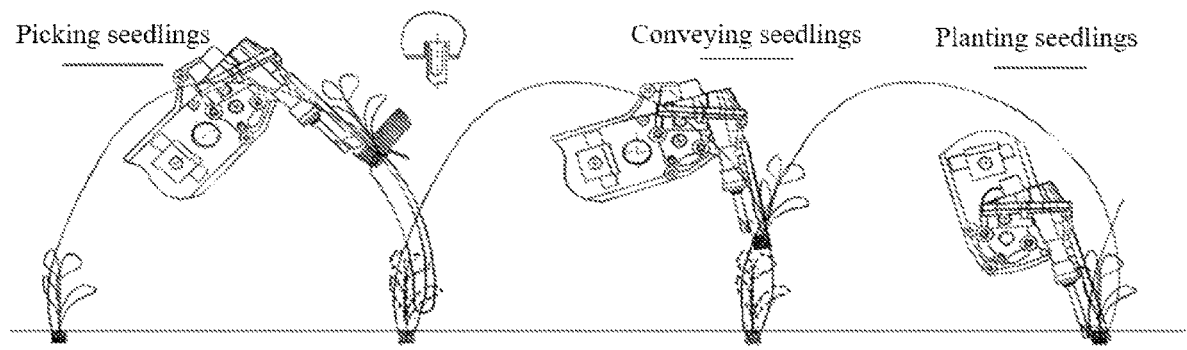
FIG. 39 is a schematic diagram showing a working process of the planting arm.

The planting arm 611 is arranged below the seedling box 629, and the support structure of the planting arm 611 is fixedly connected to the main beam 606.1 by the connection angle iron 621. The planting arm 611 is configured to pick and plant the seedlings from the seedling gate located below the seedling box 629. As shown in FIG. 39, each of the two seedling needles of the planting arm is driven by the drive device to rotate continuously, successively pick and transport the seedlings from the seedling gate, and plant the seedlings into the narrow furrow opened by the circular cutter disc 503.2. The planting arm 611 described in the present embodiment adopts the prior art and thus is not introduced herein. When in use, the inclined angle and the size parameters of the planting arm 611 need to be adaptively modified according to the type of the specific crop, e.g. rape.

The seedling box 629 is connected to the second mounting support 606 through a guide mechanism, and the guide mechanism includes a lateral guide mechanism and a height adjustment guide mechanism.

The lateral guide mechanism includes the linear guide rail 615 and a plurality of guide blocks 624. The linear guide rail 615 is extended in the lateral direction and is arranged at a lower portion of the second mounting support 606. The guide block 624 is parallel to the linear guide rail 615 and is fixed on the upper portion of the second mounting support 606. The back of the seedling box 629 is laterally provided with an upper linear chute and a lower linear chute, wherein the lower linear chute is clamped on the linear guide rail 615, and the upper linear chute is clamped on the guide block 624, so that the seedling box 629 can be driven to move laterally along the linear guide rail 615 by an external force.

The height adjustment guide mechanism includes a limit frame and the sliding rod 628. The limit frame is fixedly connected to the main beam 606.1. The limit frame is provided with a limit guide hole for the sliding rod 628. The sliding rod 628 is obliquely inserted into the limit guide hole, and can be driven by an external force to move up and down along the inclined direction of the sliding rod 628. The inclined direction of the sliding rod 628 is the same as that of the seedling box 629, and the sliding rod 628 is fixedly connected to the linear guide rail 615. The upper portion of the sliding rod 628 is provided with a slot at a position where the limit guide hole is formed.

The seedling box height regulating mechanism is provided with the gear plate 602, the gear lever 603, the intermediate rotating shaft 619, and the second shift tooth 627.

The upper portion of the gear lever 603 passes through the gear plate 602, and the bottom of the gear lever 603 is fixedly connected to the intermediate rotating shaft 619. The intermediate rotating shaft 619 is installed in the shaft seat and can rotate in the shaft seat. The shaft seat is fixedly connected to the main beam 606.1. The intermediate rotating shaft 619 is located in front of the sliding rod 628 and is parallel to the linear guide rail 615. The second shift tooth 627 is mounted on the intermediate rotating shaft 619. One end of the second shift tooth 627 is fixed on the intermediate rotating shaft 619, and the other end of the second shift tooth 627 is inserted into the slot of the sliding rod 628. The gear lever 603, the intermediate rotating shaft 619, and the second shift tooth 627 form a lever structure with the intermediate rotating shaft 619 as a fulcrum. The gear lever 603 is pushed down, and the second shift tooth 627 is driven by the intermediate rotating shaft 619 to rotate, so that the sliding rod 628, the linear guide rail 615, and the seedling box 629 mounted on the linear guide rail 615 are lifted upward to change the height of the seedling box 629. In this way, the amount of seedlings taken by the planting arm 611 at one time is adjustable.

The gear plate 602 is provided with gear grooves having different heights. After the amount of seedlings of the planting arm 611 is adjusted, the gear lever 603 is limited to the corresponding gear position by the locking structure to maintain the height of the seedling box 629. The upper linear chute above the seedling box, which has a downward opening, is clamped on the guide block 624. When the seedling box 629 is lifted within the limit of the gear plate 602, the linear chute does not detach from the guide block 629.

The lateral box moving mechanism includes the reciprocating lead screw 608 and the pulling sliding block 616, and the pulling sliding block 616 is mounted on a sliding sleeve of the reciprocating lead screw 608. The two ends of the reciprocating lead screw 608 are horizontally installed on the main beam 606.1 by the left bearing support 623 and the right bearing support 614, respectively. The pulling sliding block 616 is connected to the box frame structure of the seedling box 629. The reciprocating lead screw 608 is driven to rotate by the hydraulic motor 605, and the sliding sleeve moves linearly along the reciprocating lead screw, and then the seedling box 629 is driven to move laterally by the pulling sliding block 616. The first rotation speed sensor 610 is connected to one end of the reciprocating lead screw 608. The first rotation speed sensor 610 preferably employs a rotary encoder to measure a rotation speed of the hydraulic motor 605 and feed back to the control system, which facilitates the monitoring of the control system. The hydraulic motor 605 is connected to the hydraulic drive system 1, and the hydraulic drive system 1 provides the power source for the hydraulic motor 605.

The transmission mechanism of the planting unit includes the first transmission box 618, the second transmission box 613, the driven sprocket 620, and the drive sprocket 622. The drive sprocket 622 is installed on the transmission connecting shaft of the hydraulic motor 605 and the reciprocating lead screw 608, and the driven sprocket 620 is installed on the power input shaft of the first transmission box 618. The drive sprocket 622 drives the driven sprocket 620 to rotate through a chain, and provides power for the first transmission box 618. The first transmission box 618 is provided with two output shafts. One of the two output shafts is connected to the shift tooth rotating shaft of the ratchet transmission mechanism, drives the shift rotating shaft to rotate, and drives the seedlings in the seedling box 629 to move downward. The other output shaft of the two output shafts is connected to the power input shaft of the second transmission box 613, and the power output shaft of the second transmission box 613 is connected to the rotating shaft of the planting arm 611 to drive the planting arm 611 to operate. The first transmission box 618 is provided with a gear mechanism, and the rotation speed of the output shaft can be adjusted by the gear ratio.

The seedling box 629 is driven by the hydraulic motor 605 to move laterally, and the seedling needles of the planting arm 611 successively pick a row of seedlings at the bottom of the seedling box 629 and plant the seedlings in the soil. When the seedling box 629 moves to the left limit position thereof, the left first shift tooth 625 shifts to the pawl 617 on the ratchet mechanism, the end of the pawl 617 close to the ratchet shaft 626 is inserted into the tooth space of the ratchet shaft 626 and drives the ratchet shaft 626 to rotate by a certain angle, so as to drive the endless conveyor belt 601 to rotate. The seedlings placed on the endless conveyor belt 601 move downward a certain distance to fill the space of the bottom row of the seedling box 629. After that, the pawl 617 is reset, the control system controls the hydraulic motor 605 to rotate reversely, the seedling box 629 moves reversely, and the planting arm 611 continues to operate. When the seedling box 629 moves to the right limit position thereof, the right first shift tooth 625 shifts to the pawl 617, the seedlings descend again, and the operations are cycled. According to practical tests, the planting system in the present embodiment can reach a planting speed of approximately 300 times/minute.

(4) Ground Wheel Speed Measurement System

Figure 36:
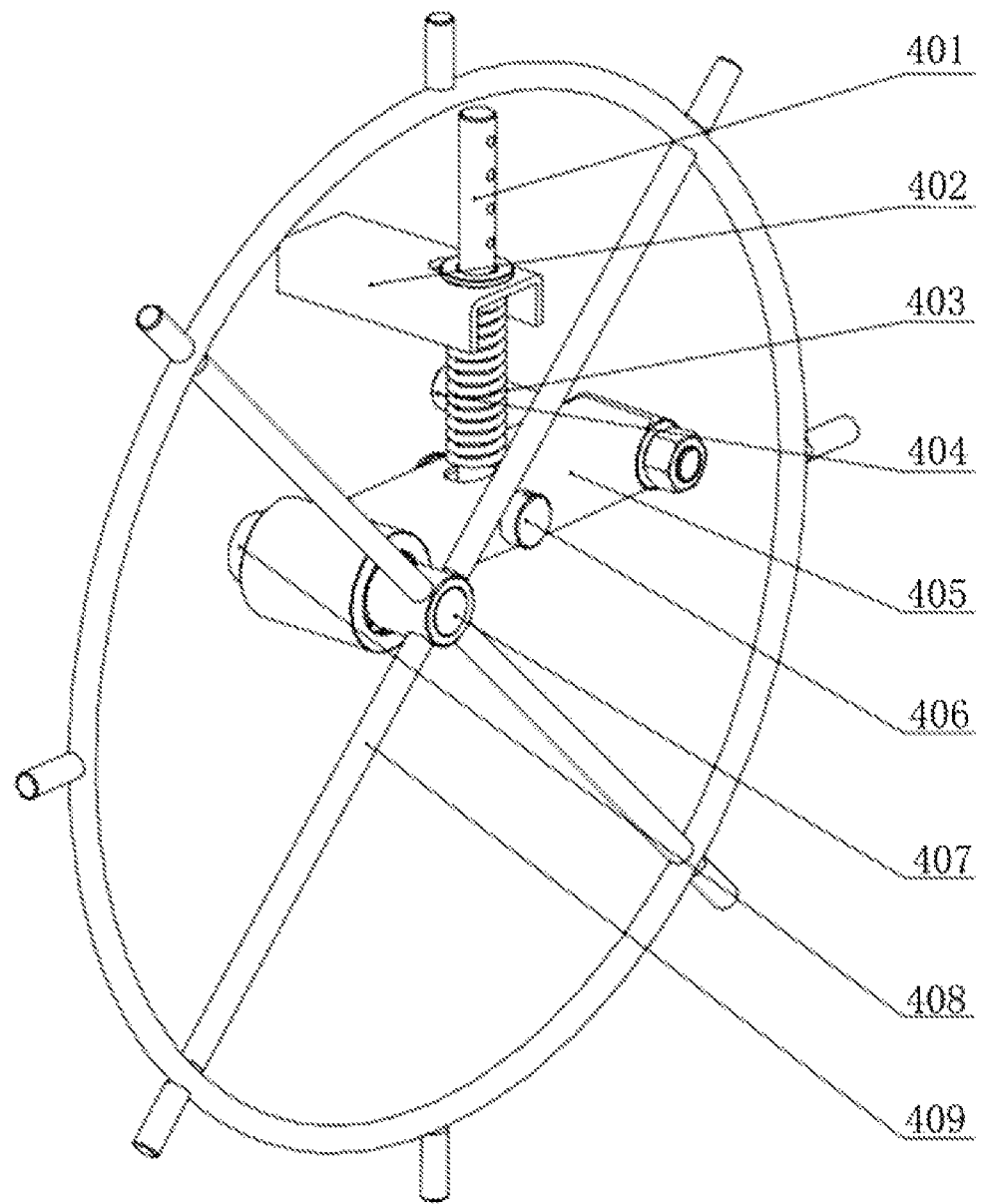
FIG. 36 is a structural schematic diagram showing the ground wheel speed measurement system.
Figure 37:
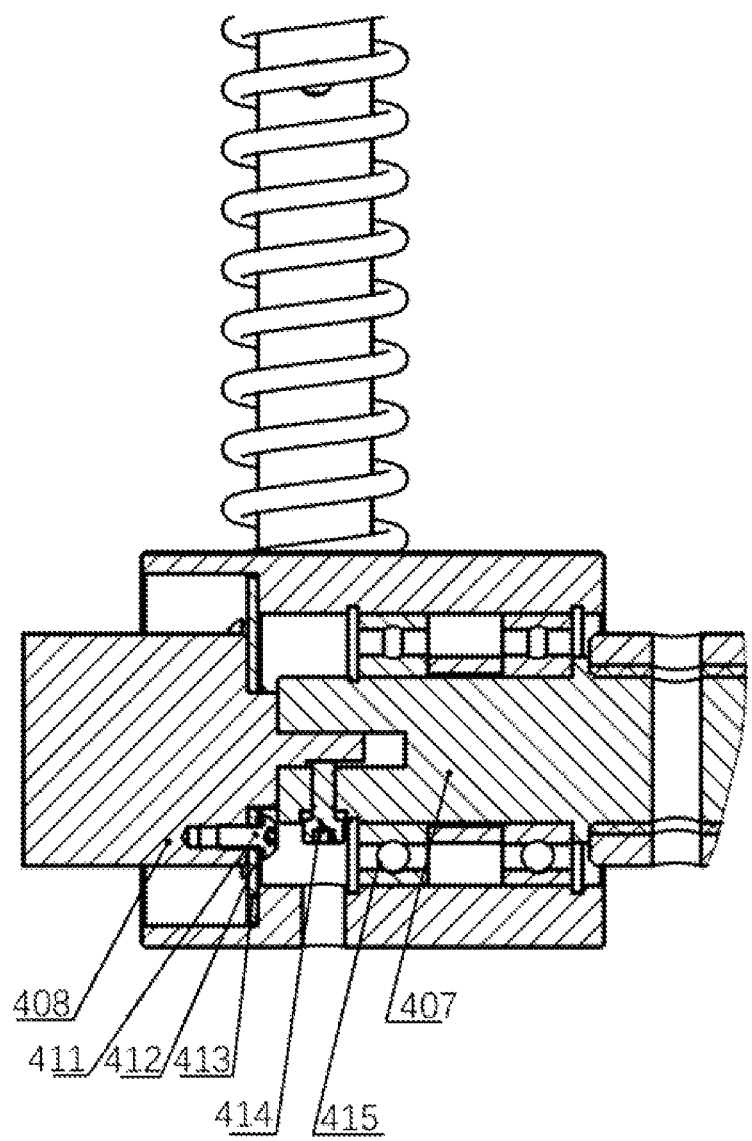
FIG. 37 is a cross-sectional view of the ground wheel speed measurement system.
Figure 38:
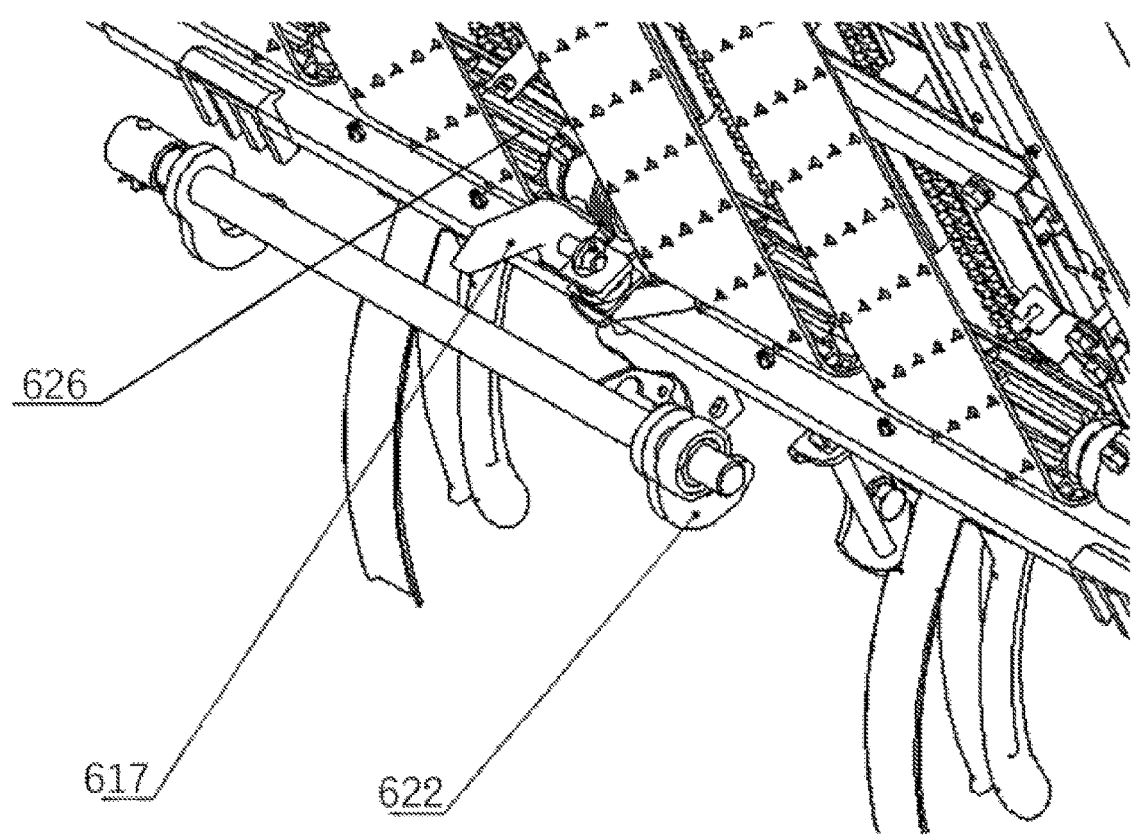
FIG. 38 is a structural schematic diagram showing the ratchet transmission mechanism.

As shown in FIG. 36 and FIG. 37, the ground wheel speed measurement system 4 includes the contour following ground wheel mechanism and the second rotation speed sensor 408. The contour following ground wheel mechanism includes the adjusting rod 401, the fixed plate 402, the suspension arm 405, and the ground wheel 409.

A front shaft sleeve and a rear shaft sleeve are horizontally arranged at the front end and the rear end of the suspension arm 405, respectively. The fixed shaft 404 is mounted in the front shaft sleeve, and one end of the fixed shaft 404 is connected to the main body frame of the combined machine. The suspension arm 405 is hinged to the main body frame through the fixed shaft 404, so that the suspension arm 405 can swing around the fixed shaft 404 upwards and downwards. The ground wheel shaft 407 is installed in the rear shaft sleeve. The ground wheel 409 protrudes from the suspension arm 405 through the ground wheel shaft 407, and is installed outside the suspension arm 405. The ground wheel 409 rotates and drives the ground wheel shaft 407 to rotate synchronously. The second rotation speed sensor 408 is mounted on the inner side of the rear shaft sleeve. The power input end of the second rotation speed sensor 408 is connected to the ground wheel shaft 407 by transmission, and the signal output terminal of the second rotation speed sensor 408 is connected to the control system of the combined machine. The horizontal shaft hole penetrating from left to right is formed in the middle of the suspension arm 405, and the suspension arm 405 is provided with an opening which is connected to the horizontal shaft hole and located above the horizontal shaft hole.

The suspension arm 405 is arranged below the fixed plate 402, and one end of the fixed plate 402 is fixedly mounted on the main body frame. The adjusting rod 401 is inverted T-shaped, and includes the vertical shaft and the bottom horizontal shaft 406, wherein the bottom horizontal shaft 406 is mounted in the horizontal shaft hole. The fixed plate 402 is provided with a limit hole. The upper portion of the vertical shaft passes through the limit hole. The bottom end of the vertical shaft passes through the opening of the suspension arm 405, is inserted into the suspension arm 405, and connected to the bottom horizontal shaft 406. The opening of the suspension arm 405 is a long hole extended along the front and rear directions. When the suspension arm 405 swings around the fixed shaft 404 in the vertical direction as the terrain changes, the bottom horizontal shaft 406 can rotate in the suspension arm 405, which prevents the mechanism from being jammed.

The spring 403 is sleeved on the vertical shaft of the adjusting rod 401 between the fixed plate 402 and the suspension arm 405. The upper end and the lower end of the spring 403 abut against the fixed plate 402 and the suspension arm 405, and the ground wheel 409 is pressed against the ground by the suspension arm 405. The outer surface of the ground wheel 409 is provided with an anti-slip structure. As shown in FIG. 36, the eight cylindrical protrusions are uniformly arranged in the periphery of the ground wheel 409, and the eight cylindrical protrusions can be inserted into the soil surface when contacting the ground, so as to prevent the ground wheel 409 from slipping.

In the present embodiment, the second rotation speed sensor 408 employs a rotary encoder, and the ground wheel shaft 407 is fixed in the inner cavity of the suspension arm by the bearing 415 and the snap spring. The second rotation speed sensor 408 and the sensor fixing plate 412 are fixed by the screw 411. The sensor fixing plate 412 and the convex step in the inner cavity of the suspension arm are connected by the welding position 413. The shaft head of the input end of the rotary encoder and the ground wheel shaft 407 are fixed by the set screw 414 to prevent a relative rotation between the shaft end and the ground wheel shaft 407.

(5) Soil Covering Compacting System

Figure 15:
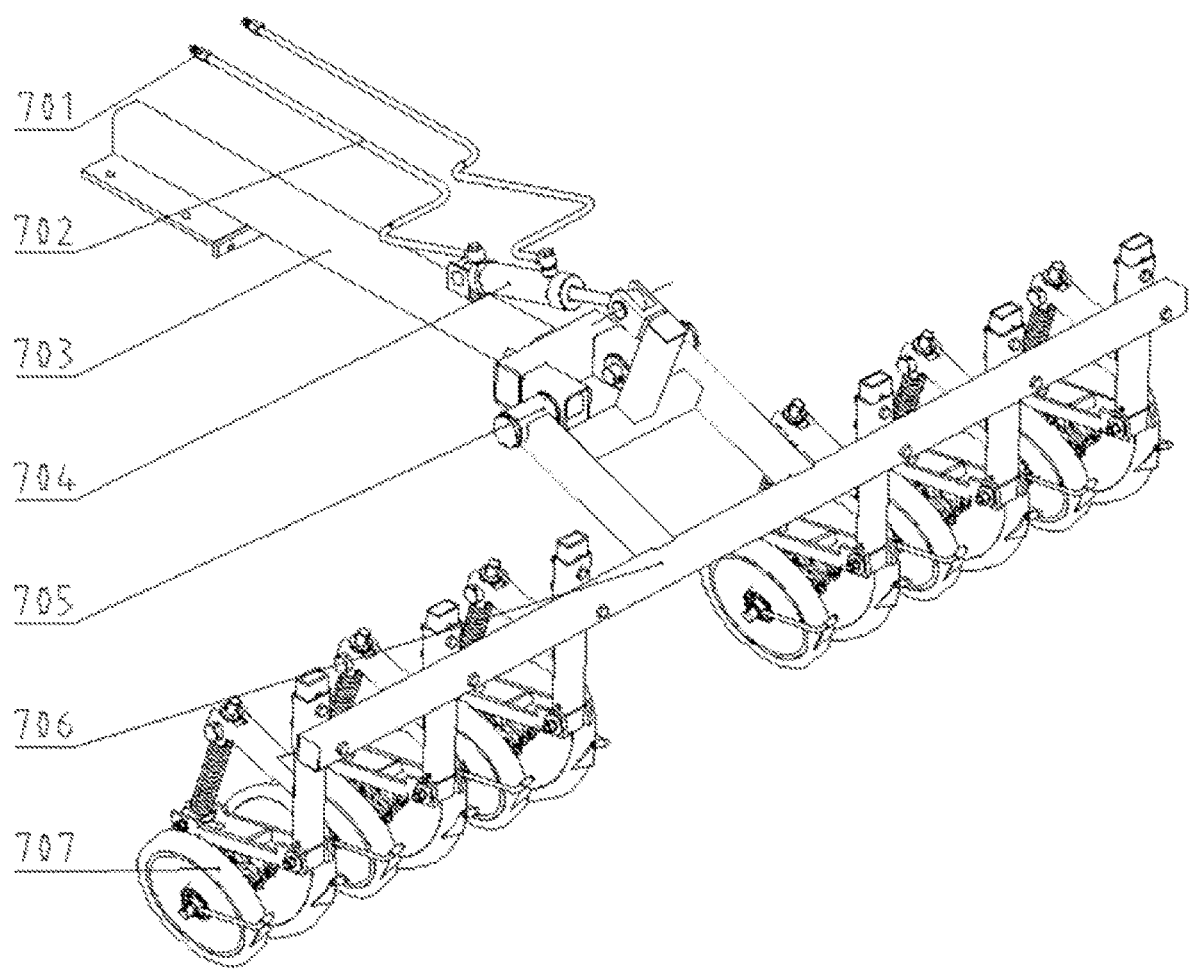
FIG. 15 is a structural schematic diagram showing the soil covering compacting system.
Figure 16:
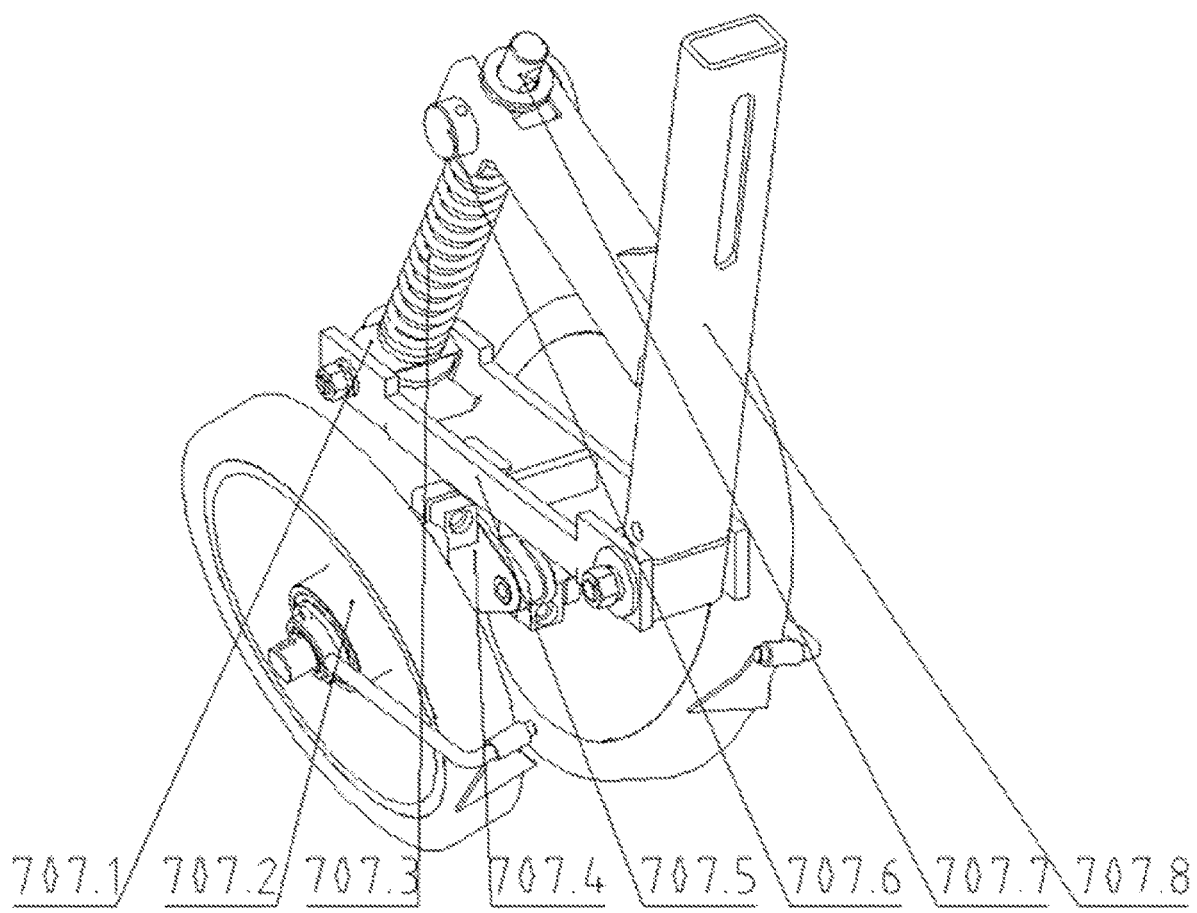
FIG. 16 is a structural schematic diagram showing the soil covering and compacting wheel.
Figure 17:
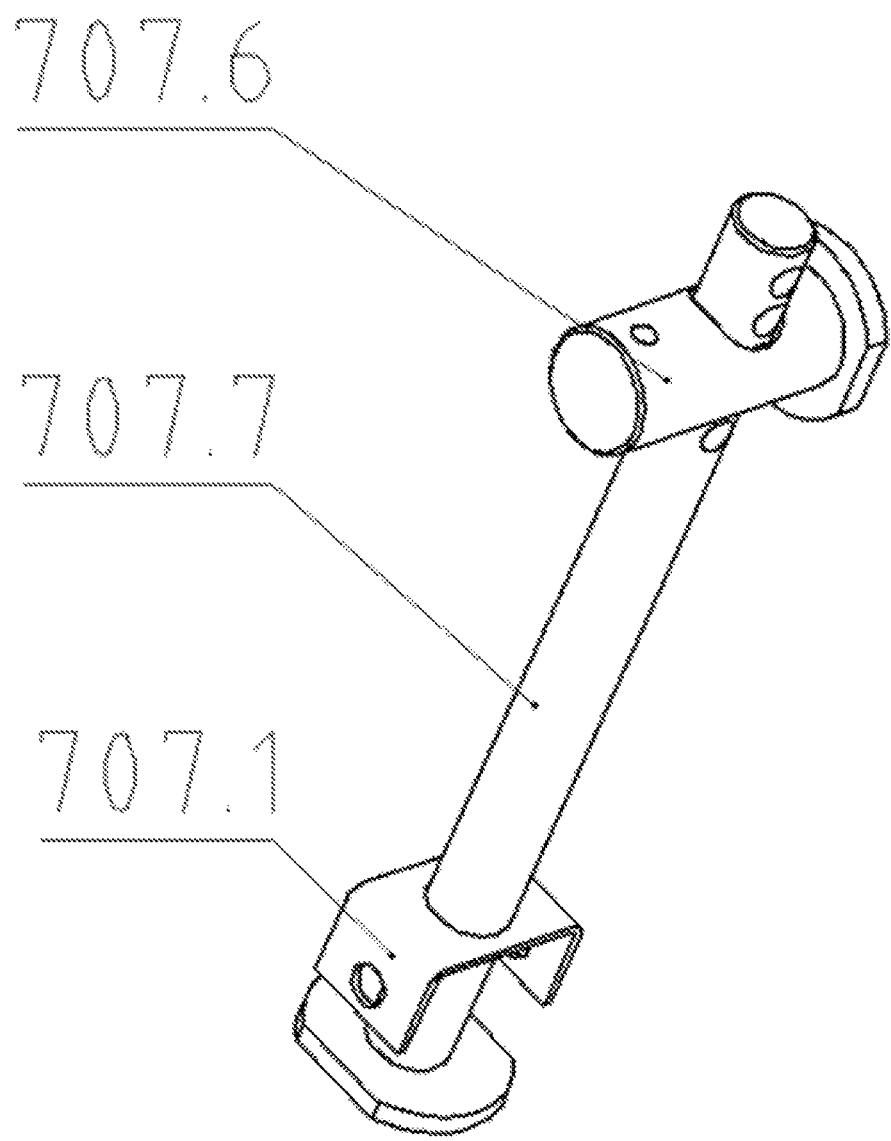
FIG. 17 is a schematic diagram showing a partial structure of the soil covering and compacting wheel.
Figure 18:
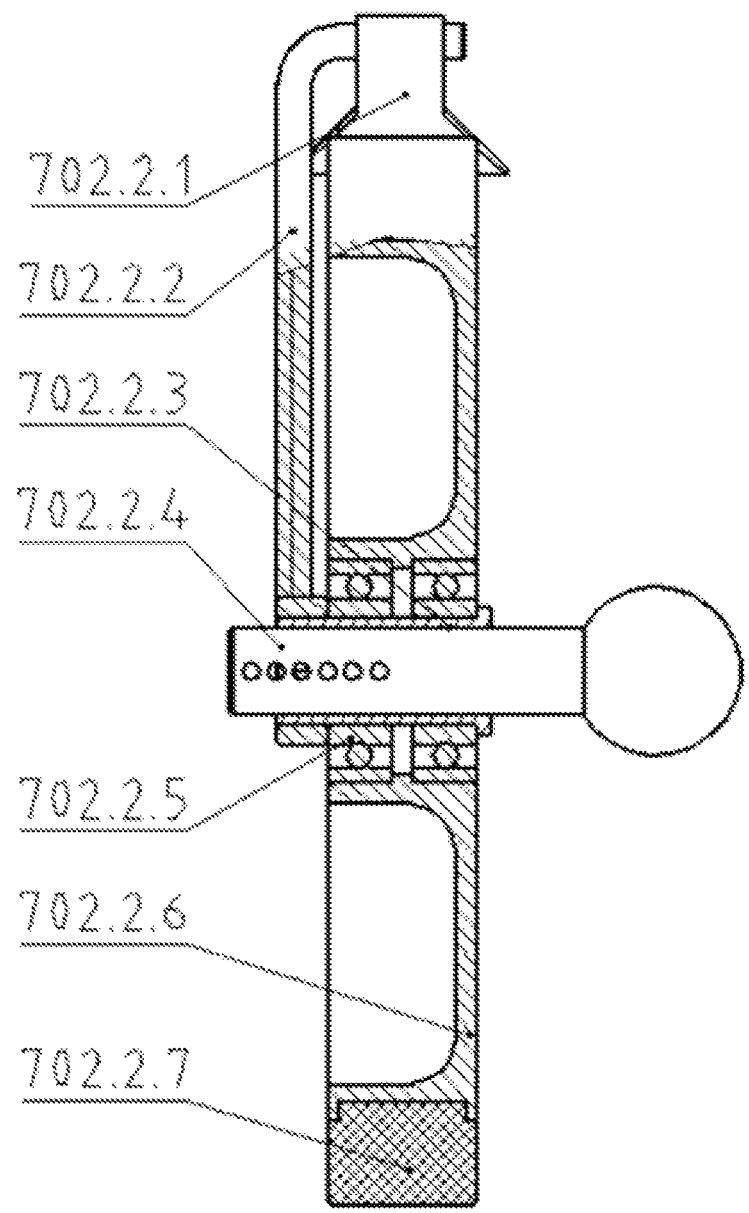
FIG. 18 is a schematic diagram showing a partial structure of the soil covering and compacting wheel.

The soil covering compacting system 7 is arranged behind the planting system 6. As shown in FIG. 15, the soil covering compacting system 7 includes the hydraulic quick connector 701, the oil pipe 702, the first fixed support 703, the oil cylinder 704, the hinge shaft 705, the hanging connection rack 706, and the soil covering and compacting wheel assembly 707.

The first fixed support 703 is fixed to the main body frame of the combined machine by bolts. The hanging connection rack 706 includes a horizonal rod and a connecting portion, and the connecting portion is fixed in the middle of the horizonal rod. Six sets of soil covering and compacting wheel assemblies 707 are horizontally arranged in a row, and are fixed to the horizonal rod of the hanging connection rack 706 by bolts. There is a large space between the two sets of soil covering and compacting wheel assemblies in the middle, to allow the furrow opened by the rotary tillage furrowing system 3 to pass through. The connecting portion of the hanging connection rack 706 is connected to the end of the first fixed support 703 through the hinge shaft 705. The hinge shaft 705 is parallel to the horizonal rod, so that the hanging connection rack 706 can revolve around the hinge shaft 705.

The connecting portion of the hanging connection rack 706 is provided with a vertical rod, and the cylinder sleeve of the oil cylinder 704 is mounted on the first fixed support 703 through a hinge structure. The piston rod of the oil cylinder 704 is hinged to the top end of the vertical rod through a shaft pin. The control system can control the extension and retraction of the piston rod of the oil cylinder 704, and drive the hanging connection rack 706 to rotate around the hinge shaft 705, so as to adjust the initial compacting force of the soil covering and compacting wheel assembly 707, and the adjustment process is generally a small-range micro-control.

The oil inlet of the oil cylinder 704 is connected to the hydraulic drive system 1 through the oil pipe 702 that is provided with the hydraulic quick connector 701. The oil circuit of the oil cylinder 704 (i.e., the telescopic state of the piston rod of the oil cylinder) can be adjusted and controlled to be turned on or off by the oil cylinder control handle arranged in the cab of the tractor.

The soil covering and compacting wheel assembly 707 includes the spring base plate 707.1, the wheel assembly 707.2, the spring 707.3, the ball hinge block 707.4, the soil covering movable support 707.5, the third shaft pin 707.6, the intermediate shaft 707.7, and the fixed rod 707.8.

The fixed rod 707.8 is fixed to the horizonal rod of the hanging connection rack 706 by a bolt. The fixed rod 707.8 is provided with a waist-shaped long hole matched with the bolts. The installation height of the soil covering and compacting wheel assembly 707 on the horizonal rod can be adjusted according to the fixed position of the bolt in the waist-shaped long hole. In order to facilitate the adjustment, a scale can be marked on the fixed rod 707.8 of each soil covering and compacting wheel assembly 707.

The bottom of the fixed rod 707.8 is hinged to the rear end of the soil covering movable support 707.5 through a first shaft pin. The soil covering movable support 707.5 is arranged horizontally, and the ball hinge block 707.4 is installed below the soil covering movable support 707.5 and connected to the soil covering movable support 707.5.

The spring base plate 707.1 is inverted U-shaped, provided with an intermediate hole, sleeved on the intermediate shaft 707.7 through the intermediate hole, and can move up and down relative to the intermediate shaft 707.7. The bottom of the intermediate shaft 707.7 is provided with a flange, and the left side and the right side of the flange are machined to form a flat mouth, so that the intermediate shaft 707.7 cannot be twisted left and right when the bottom of the intermediate shaft is jammed in the spring base plate 707.1. Both sides of the spring base plate 707.1 are provided with shaft holes which are symmetrical with one another. The spring base plate 707.1 is hinged to the front end of the soil covering movable support 707.5 through a second shaft pin, so that the intermediate shaft 707.7 can rotate forward and backward. The top of the intermediate shaft 707.7 is movably connected to the front end of the support arm through the third shaft pin 707.6, and the rear end of the support arm is fixed on the fixed rod 707.8. In the above-mentioned structure, the fixed rod 707.8, the intermediate shaft 707.7, the soil covering movable support 707.5, and the support arm form a quadrangular structure. The first shaft pin, the second shaft pin, and the third shaft pin 707.6 are parallel to one another.

The spring 707.3 is sleeved on the intermediate shaft 707.7, the top of the spring 707.3 is restricted below the third shaft pin 707.6, and the bottom of the spring 707.3 abuts against on the surface of the spring base plate 707.1, to ensure the contact pressure between the wheel assembly 707.2 and the soil.

The wheel assembly 707.2 includes the soil scraper 702.2.1, the soil scraper support 702.2.2, the sliding sleeve 702.2.3, the ball shaft 702.2.4, the bearing 702.2.5, the wheel body 702.2.6, the rubber layer 702.2.7, and others.

The wheel assembly 707.2 includes two wheel bodies 702.2.6, and the center of the wheel body 702.2.6 is provided with the bearing 702.2.5.

The ball head at the end of the ball shaft 702.2.4 is installed in the ball hinge block 707.4, and can perform a multi-degree-of-freedom movement in the ball hinge block 707.4, which is convenient for adjusting the opening angle and the included angle of the two wheel bodies in a pair of wheel assemblies 707.2. The sliding sleeve 702.2.3 is sleeved on the ball shaft 702.2.4 and can move on the ball shaft 702.2.4, which is convenient for adjusting the distance between the two wheel bodies in the pair of wheel assemblies 707.2. The wheel body 702.2.6 is mounted on the sliding sleeve 702.2.3 and contacts the sliding sleeve 702.2.3 through the inner ring of the bearing 702.2.5.

The soil scraper support 702.2.2 is arranged on the outer side of the wheel body 702.2.6, and each wheel body 702.2.6 is provided with the soil scraper support 702.2.2. One end of the soil scraper support 702.2.2 is configured to install the soil scraper 702.2.1, and the other end of the soil scraper support 702.2.2 is mounted on the sliding sleeve 702.2.3 by a shaft sleeve.

The shaft of the ball shaft 702.2.4 is provided with a plurality of positioning holes distributed along the axial direction thereof. The through holes corresponding to the plurality of positioning holes are formed on the sliding sleeve 702.2.3 and the soil scraper support 702.2.2. The shaft sleeve and sliding sleeve 702.2.3 of the soil scraper support 702.2.2 can be locked on the shaft of the ball shaft 702.2.4 by pins, and the wheel body 702.2.6 is restricted between the soil scraper support 702.2.2 and the end cap of the sliding sleeve 702.2.3, so as to prevent the wheel body from detaching from the sliding sleeve 702.2.3.

The soil scraper 702.2.1 is arranged close to the periphery of the wheel, and is configured to remove the soil adhered to the wheel body 702.2.6 during rolling. The periphery of the wheel body 702.2.6 is covered with the rubber layer 702.2.7. The material hardness of the rubber layer is approximately HA 50, which can prevent the rubber layer from adhering to the soil and carrying the soil.

(6) Ground Contour-Following System

In the combined machine of the present disclosure, the lift cylinder 12 is used as a drive device configured to control the planting unit to ascend and descend. The control of the planting unit includes a manual control and an automatic control. The manual control indicates that the operator sends instructions to the control system through the operating console to drive the lift cylinder 12, and to control the planting unit to ascend and descend. The automatic control indicates that the lift cylinder 12 is driven by the ground contour-following system to allow the planting unit to ascend and descend as the terrain changes.

In the present embodiment, the lift cylinder 12 is a single-acting lift cylinder, Oil is fed into the piston rod chamber, namely, the piston rod is provided on one side of the lift cylinder 12, and the planting unit is controlled to ascend and descend by the extension and retraction of the piston rod. The piston rod of the lift cylinder 12 is connected to the movable frame of the planting unit through a lifting mechanism. The lifting mechanism is a lever structure with the shaft seat fixed on the main body frame as the fulcrum. The second mounting support and the planting unit connected to the second mounting support are driven by the piston rod to lift.

The oil inlet of the lift cylinder 12 is connected to the hydraulic drive system 1, and the hydraulic drive system 1 provides the lift cylinder 12 with an oil pressure which drives the lift cylinder 12 to move. The valve group 910 is arranged on the connecting pipeline between the lift cylinder 12 and the hydraulic drive system 1. The valve group 910 is mounted on the third mounting support 909, and the third mounting support 909 is fixedly connected to the main body frame of the combined machine.

The valve group 910 includes a housing, a valve core, and a push rod. The push rod is arranged longitudinally, the rear end of the push rod is connected to the valve core in the housing, and the front end of the push rod protrudes from the valve body. The portion of the push rod protruding from the valve body is provided with a first return spring, and the first return spring is sleeved on the push rod. The rear end of the first return spring abuts against the housing of the valve group 910, and the front end of the first return spring abuts against the flange at the end of the push rod. Alternatively, the first return spring is fixedly connected to the push rod in other ways, so that the compressed first return spring can push the push rod forward when reset.

Figure 30:
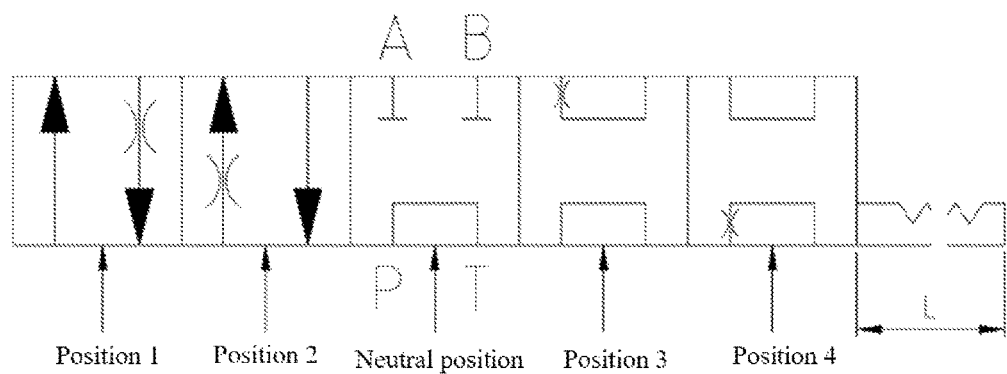
FIG. 30 is a schematic diagram showing the valve core and the valve positions.
Figure 31:
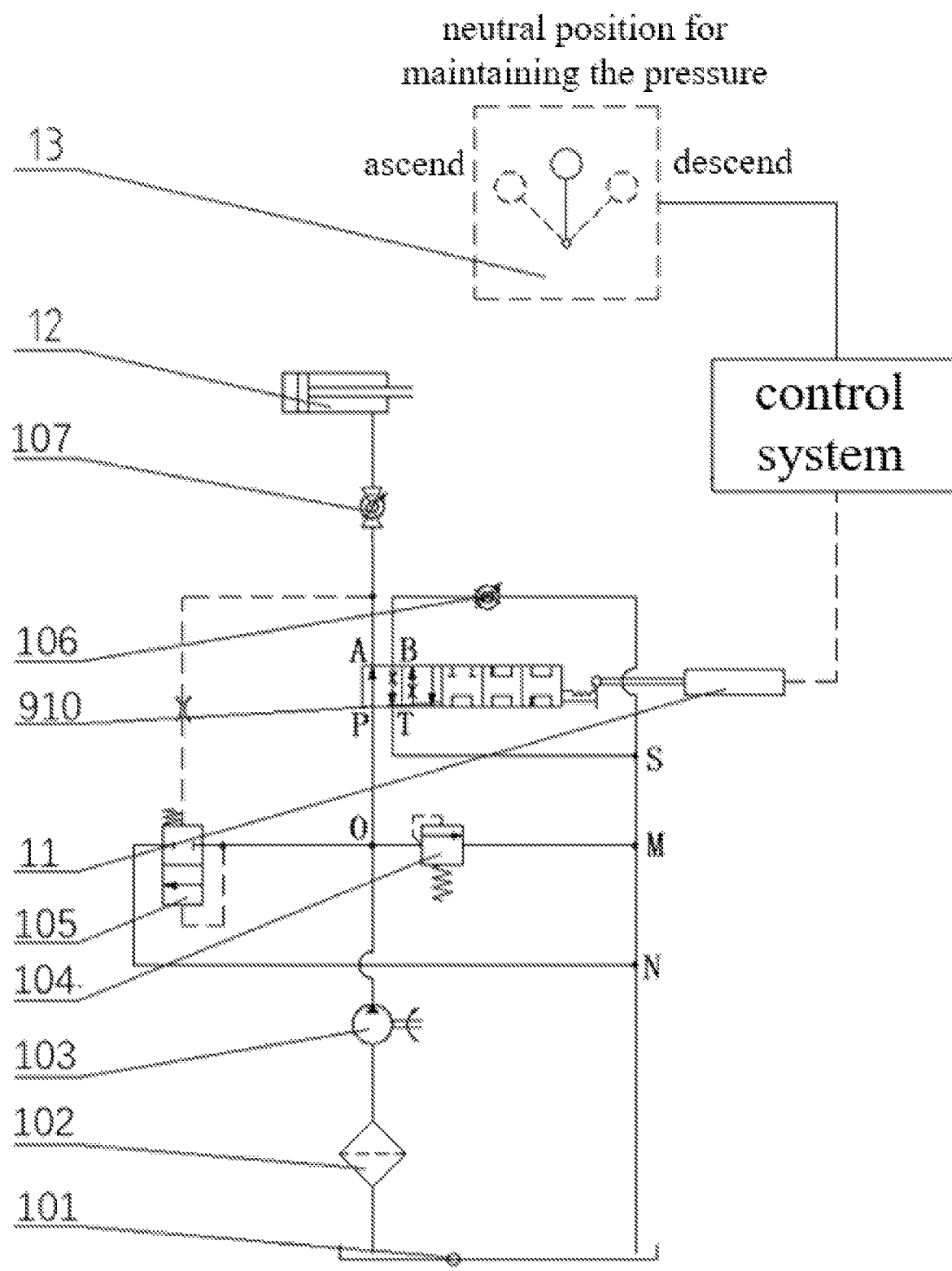
FIG. 31 is a structural schematic diagram showing that the pipeline connects the ground contour-following system with the hydraulic drive system 1.

As shown in FIG. 30 and FIG. 31, the valve group 910 is a five-position four-way reversing valve, and is provided with four oil ports, wherein the four oil ports include a port A, a port B, a port P, and a port T. The valve core can be shifted and switched between the five valve positions to form five channels. The five valve positions include position 1, position 2, the neutral position, position 3, and position 4, respectively. When the valve core moves to the position 1, port A and port P are in fluid communication normally, and port B and port T are in fluid communication through a throttle passage (which is a passage provided with a throttle valve). When the valve core moves to position 2, port A and port P are in fluid communication through a throttle passage, and port B and port T are in fluid communication normally.

When the valve core moves to the neutral position, port A and port B are both blocked, and port P and port T are in fluid communication. When the valve core moves to position 3, port A and port B are in fluid communication through a throttle passage, and port P and port T are in fluid communication normally. When the valve core moves to position 4, port A and port B are in fluid communication normally, and port P and port T are in fluid communication through a throttle passage.

The ground contour-following system includes a contour following mechanism and a transmission mechanism.

The contour following mechanism includes the inductive wheel 901, the movable support 902, the second fixed support 904, and others.

The inductive wheel 901 is a rubber-coated wheel, is in the shape of a roller, and includes the intermediate sleeve 901.2 and the outer rubber wheel 901.1. The outer rubber wheel 901.1 is a hollow rubber wheel. The inductive wheel 901 is arranged horizontally. When operating, the inductive wheel 901 contacts and rolls on the ground to sense the change of terrain. The first rotating shaft passes through the intermediate shaft sleeve 901.2, and both ends of the first rotating shaft are positioned in the intermediate shaft sleeve 901.2 through bearings.

Figure 23:
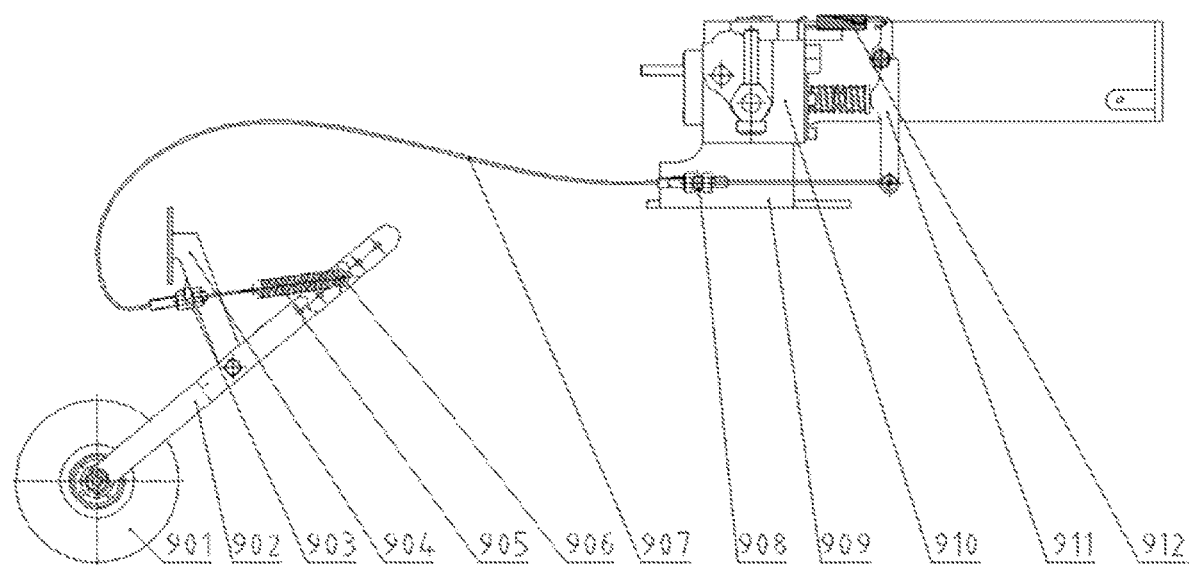
FIG. 23 is a structural schematic diagram showing the ground contour-following system.
Figure 24:
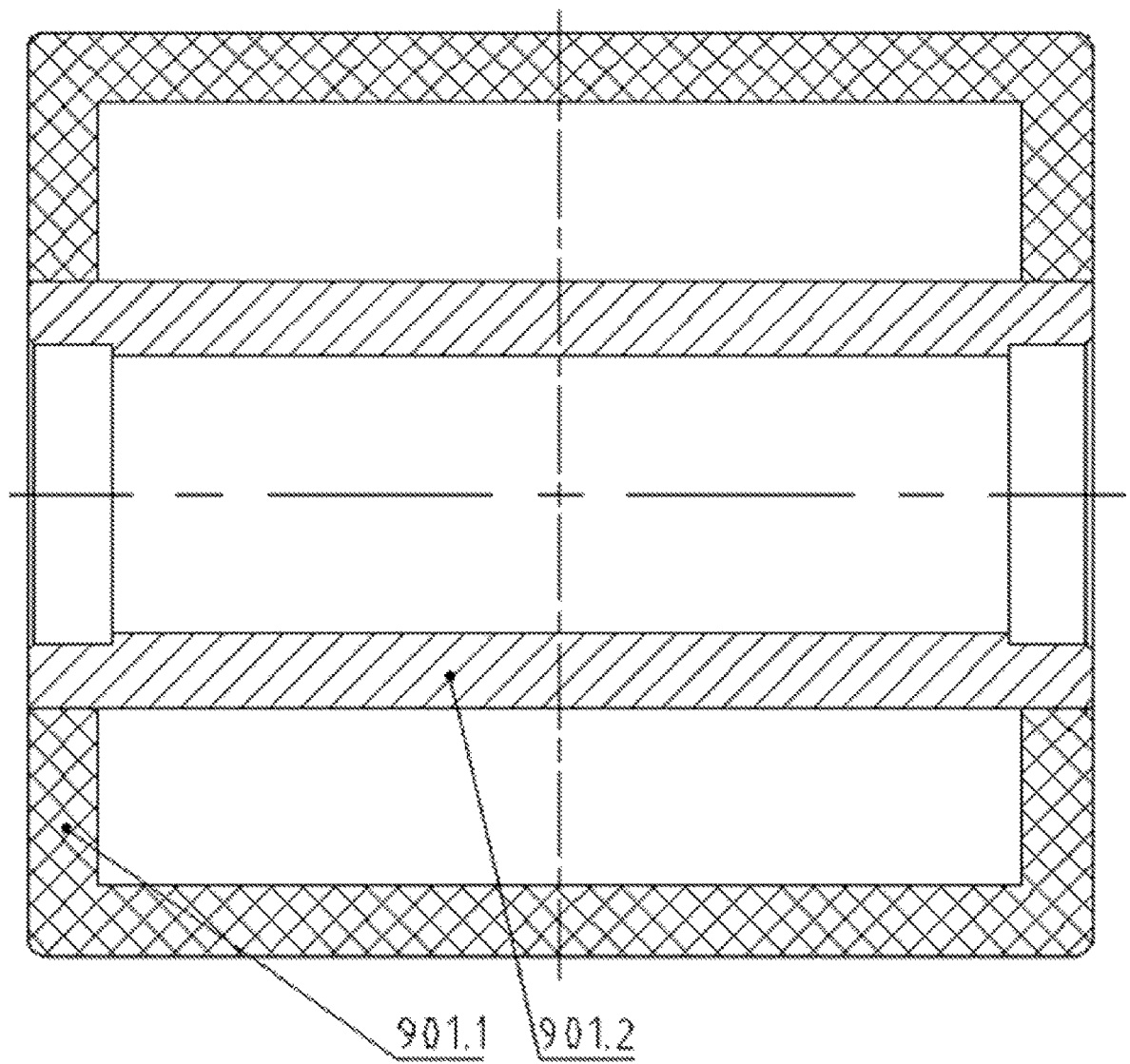
FIG. 24 is a cross-sectional view of the inductive wheel.
Figure 25:
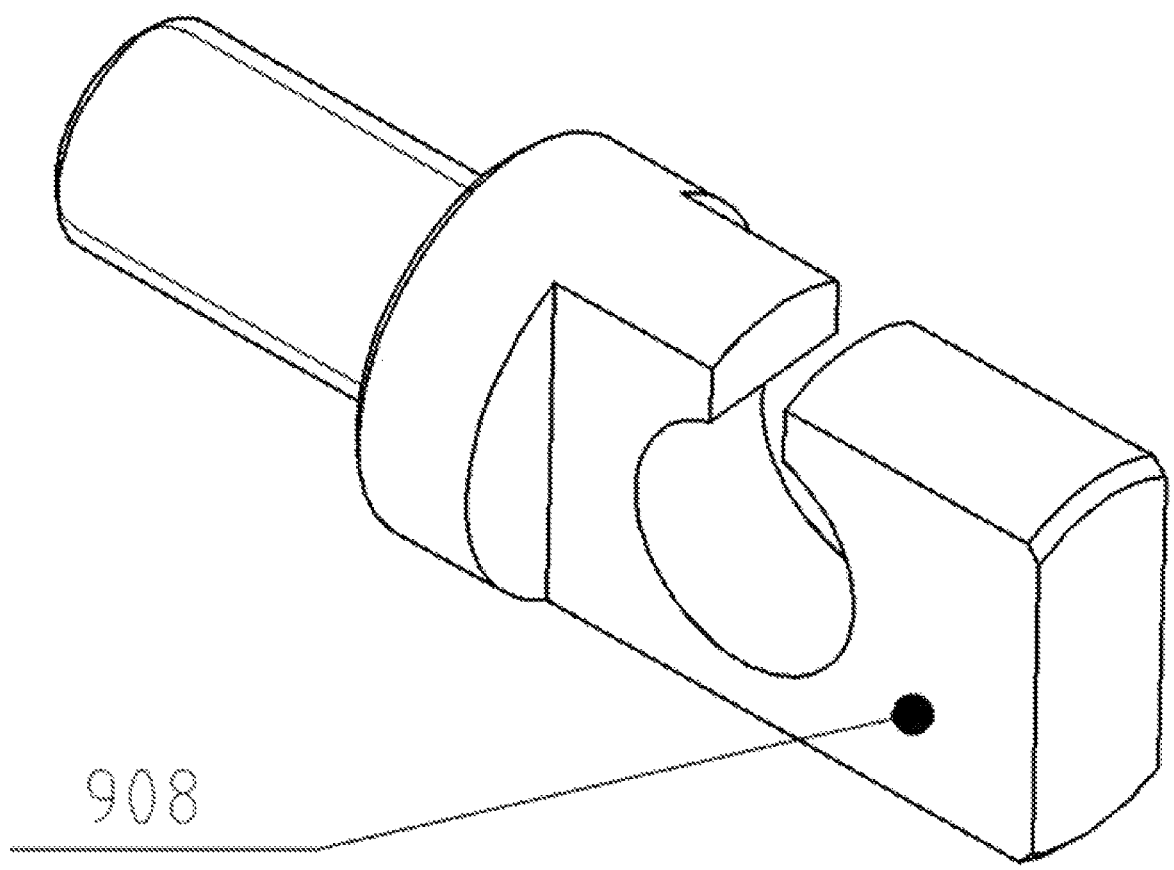
FIG. 25 is a structural schematic diagram showing the movable lug.
Figure 26:
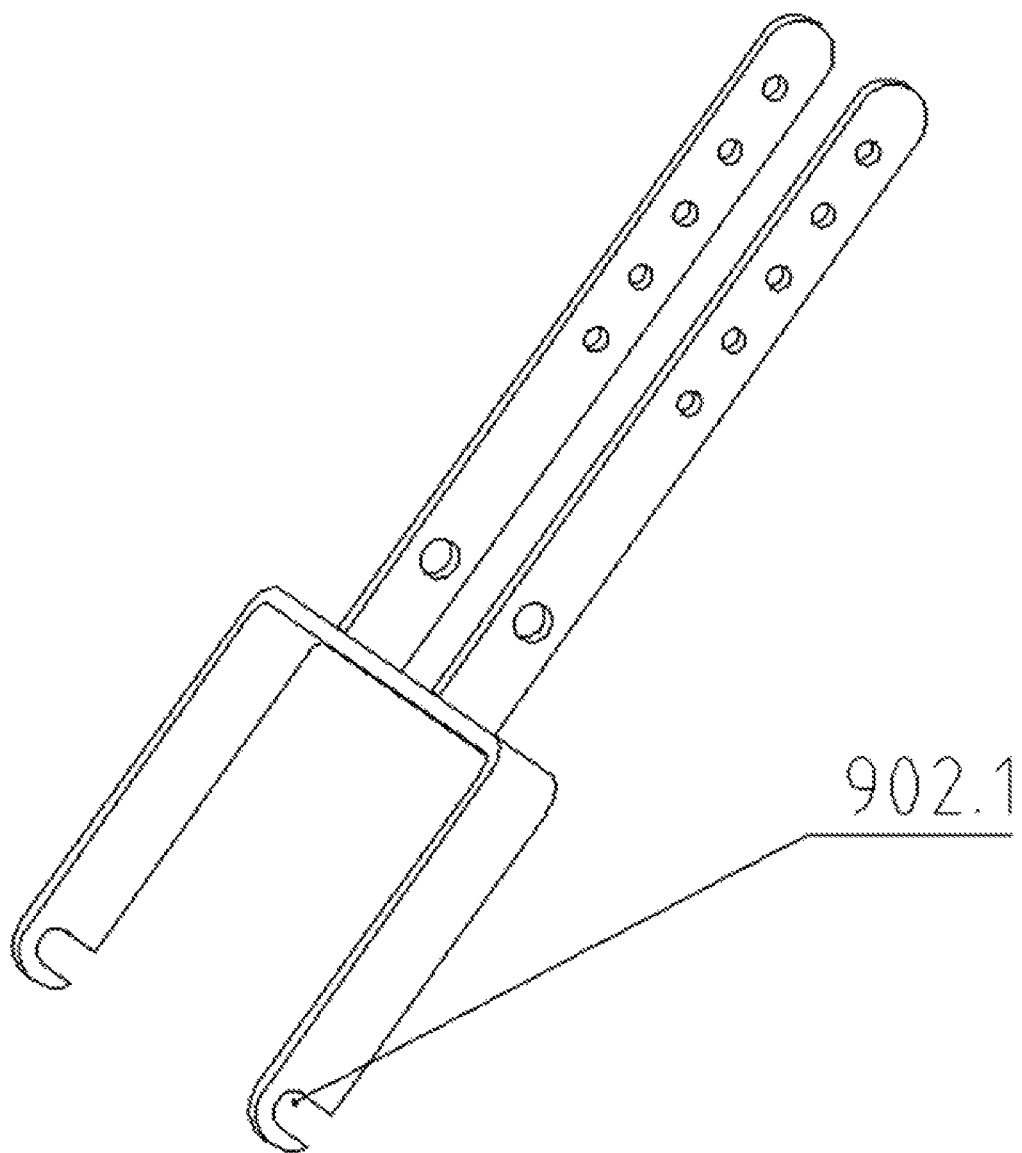
FIG. 26 is a structural schematic diagram showing the movable support.

As shown in FIG. 23, the movable support 902 is arranged obliquely relative to the path direction of the combined. The upper portion of the movable support 902 faces forward and the lower portion of the movable support 902 faces backward (the front refers to the heading direction of the combined machine, and the rear refers to the direction opposite to the heading direction of the combined machine). The lower portion of the movable support 902 is provided with a roller fork, and the bottom ends of two arms of the roller fork are both provided with the grooved shaft hole 902.1. During installation, the two arms of the roller fork are clamped at the two ends of the first shaft protruding from the intermediate shaft sleeve 901.2 through the grooved shaft hole 902.1, and then are locked and fixed by nuts. The upper portion of the movable support 902 is provided with two positioning rods extended toward the direction consistent with the extending direction of the roller fork. The positioning rod is provided with a plurality of positioning holes at different height positions. The lower portion of the positioning rod is provided with shaft holes. The two positioning rods have the same structure. The middle of the movable support 902 is hinged to the bottom of the second fixed support 904 through the second rotating shaft. The second rotating shaft is parallel to the first rotating shaft, and both ends of the second rotating shaft are installed in the shaft holes corresponding to the two positioning rods.

Figure 27:
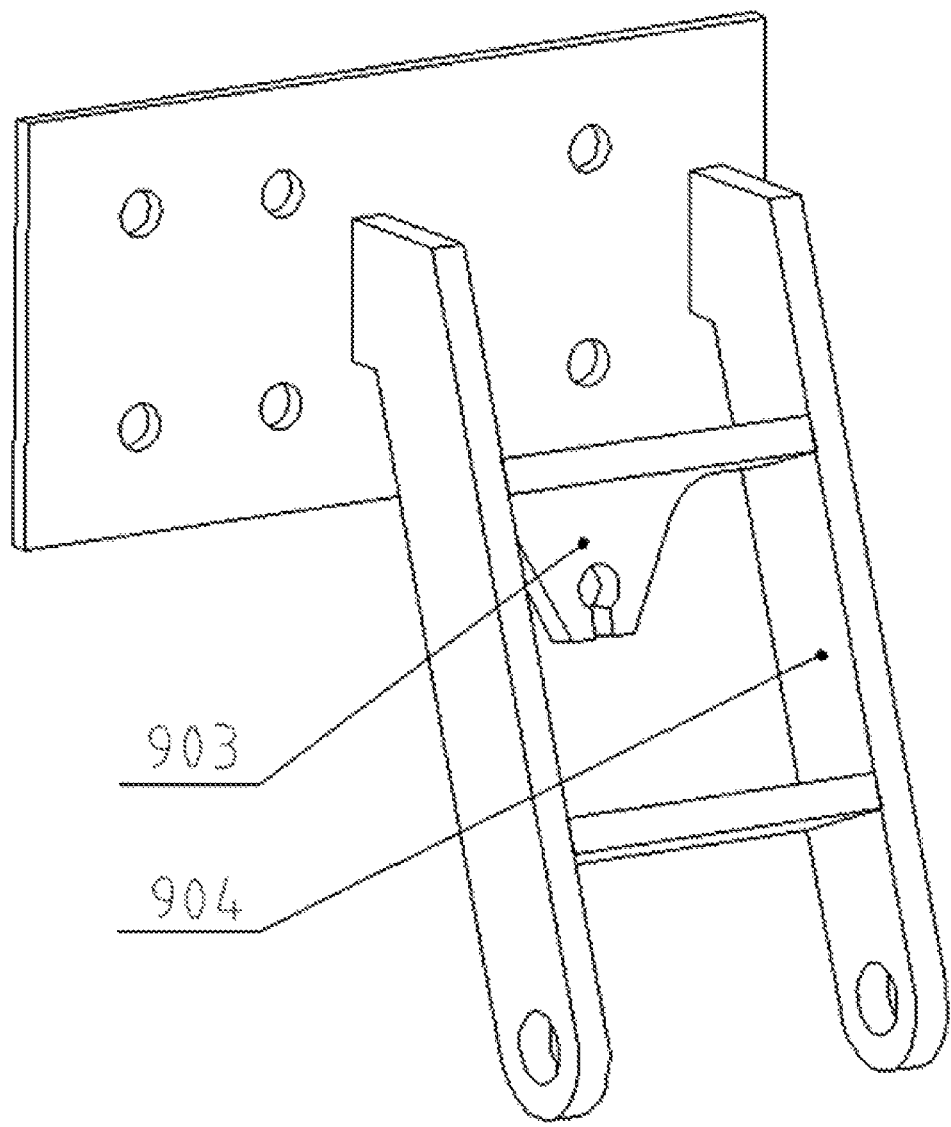
FIG. 27 is a structural schematic diagram showing the fixed support.

The second fixed support 904 is located at the rear of the movable support. As shown in FIG. 27, the second fixed support 904 includes two support rods. The two support rods are connected by a cross beam to strengthen the connection structure. As shown in FIG. 23, the second fixed support 904 is arranged obliquely. The upper portion of the second fixed support 904 faces backward and the lower portion of the second fixed support 904 is inclined forward to form an included angle with the upper portion of the movable support 902. The top of the second fixed support 904 is fixed on the main beam of the support of the planting unit, and the fixed lug 903 is arranged on the cross beam of the second fixed support 904. The fixed lug 903 is provided with a through hole and a notch connected to the through hole, and the drawing wire is inserted into the through hole through the notch.

The transmission mechanism includes the pull wire 907, the movable lug 908, and the pull lug 911. The movable lug 908 and the pull lug 911 are respectively mounted on the third mounting support 909, and the third mounting support 909 is located diagonally above the front side of the contour following mechanism.

The pull lug 911 is arranged in front of the valve group 910, and is hinged to the third mounting support 909 through the third rotating shaft. The third rotating shaft is arranged horizontally and is perpendicular to the push rod of valve group. The top end of the pull lug 911 is connected to the third mounting support 909 through the second return spring 912, and the bottom end of the pull lug 911 is connected to the movable support 902 through the pull wire 907 to form a lever structure with the third rotating shaft as a fulcrum. The second return spring 912 is parallel to the push rod, and a circular arc-shaped protruding contact point is arranged between the connection point of the pull lug 911 and the pull wire 907 and the third rotating shaft. The protruding contact point is arranged at a position aligned with the front end of the push rod.

The pull wire 907 includes a sleeve and a drawing wire inside the sleeve. The length of the drawing wire is greater than the length of the sleeve and can move inside the sleeve. One end of the sleeve is fixedly connected to the movable lug 908, and the other end of the sleeve is fixedly connected to the fixed lug 903. One end of the drawing wire passes through the movable lug 908 and is connected to the pull lug 911, and the other end of the drawing wire is connected to one end of the buffer spring 905 through the fixed lug 903. The other end of the buffer spring 905 is hung on the adjustable rod 906, and the adjustable rod 906 cooperates with the positioning hole on the second fixed support 904 for use. The contour following height of the planting unit, i.e., the distance between the planting unit and the ground, can be changed by installing the adjustable rod 906 in the positioning holes at different height positions and adjusting the inclined angle of the movable support 902.

Figure 28:
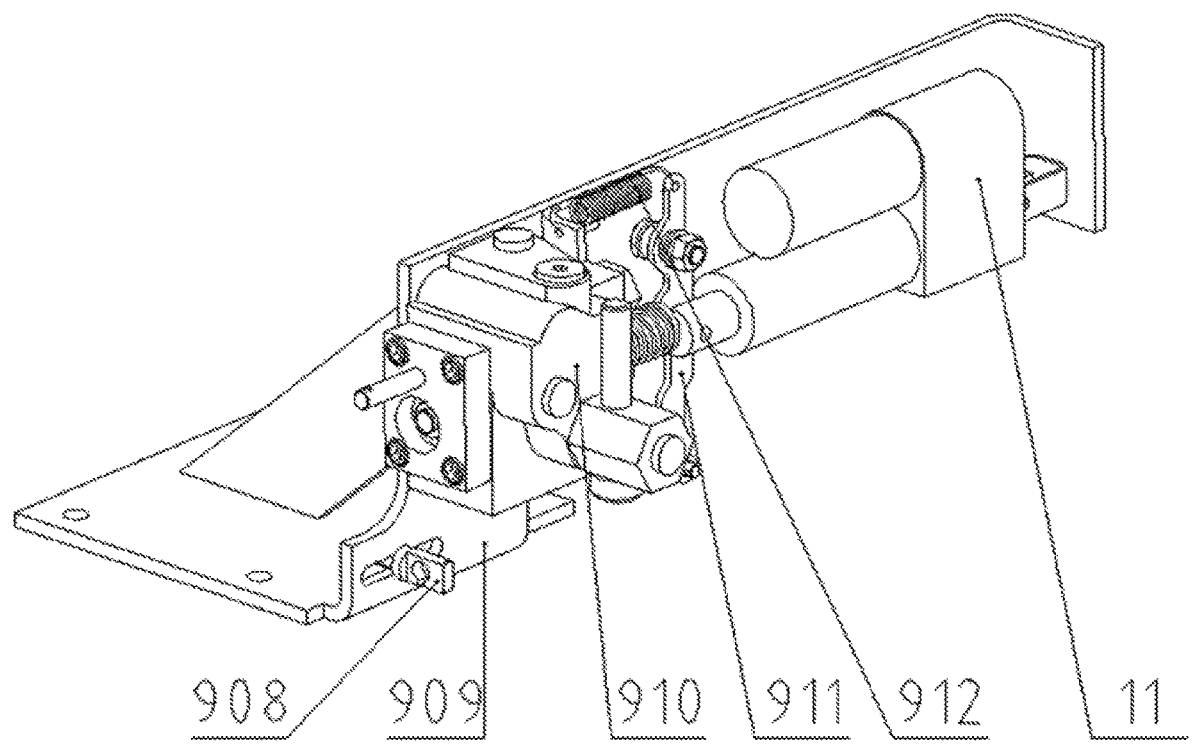
FIG. 28 is a structural schematic diagram showing the control mechanism.

The movable lug 908 is mounted on the third mounting support 909 through a waist-shaped long hole. As shown in FIG. 28, the waist-shaped long hole is located diagonally below the rear side of the valve group 910, and is longitudinally arranged at the same height position as that of the bottom end of the pull lug 911. The path of the drawing wire can be changed by adjusting the fixed position of the movable lug 908 in the waist-shaped long hole, to change the tension and relaxation state of the drawing wire, so as to adjust the sensing sensitivity of the pull lug.

The movable lug 908 includes a positioning portion and a limiting portion. The positioning portion is T-shaped, and includes a flange plate and a screw fixed on one side of the flange plate. The limiting portion is fixed on the other side of the flange plate, and is provided with a through hole and a notch connected to the through hole. The drawing wire is placed into the through hole through the notch. When the movable lug 908 is installed, the screw is inserted into the waist-shaped long hole until the flange plate abuts against the surface of the third mounting support 909. The waist-shaped long hole is a through hole, and a nut is configured to lock the screw from the other side of the waist-shaped long hole. The longitudinal axis of the through hole of the limiting portion is perpendicular to the horizonal axis of the screw.

The hydraulic drive system 1 includes the oil tank 101, the filter 102, the hydraulic pump 103, the overflow valve 104, the unloading valve 105, and the throttle valve 106. The P port of the valve group 910 is connected to the oil tank 101 through the first oil pipeline. The hydraulic pump 103 is installed in the first oil pipeline, and the filter 102 is installed between the inlet of the hydraulic pump 103 and the oil tank 101. The A port is connected to the oil inlet of the piston rod chamber of the lifting oil cylinder 12 through the second oil pipeline, and the stop valve 107 is installed in the second oil inlet pipeline. The B port is connected to the oil tank 101 through the first oil return pipeline, and the adjustable throttle valve 106 is installed in the first oil return pipeline. The port T is connected to the first oil return pipeline through the second oil return pipeline, and the connection point of the port T and the first oil return pipeline is set as S. The adjustable throttle valve 106 is located between connection point S and port B. The overflow valve 104 and the unloading valve 105 are incorporated into the circuit of the hydraulic drive system 1 through the first branch pipeline. The first branch pipeline is arranged between the connection point S and the end of the first oil return pipeline. The connection points of two ends of the first branch pipeline and the first oil return pipeline are M and N, respectively. In the first oil return pipeline, the connection point M is on the upstream side of the connection point N. The first branch pipeline intersects with the first oil pipeline to form the intersection O (at which the four-way structure is formed). The overflow valve 104 is mounted in the pipeline between the connection point M and the intersection O. The unloading valve 105 is mounted in the pipeline between the intersection O and the connection point N. The output ends of the overflow valve 104 and the unloading valve 105 are connected to the oil tank 101. The input end of the unloading valve 105 is connected to the second oil pipeline through the second branch pipeline. The connection point between the unloading valve 105 and the second oil pipeline is located between the stop valve 107 and the A port. The second branch pipeline can selectively be provided with a throttle valve. The overflow valve 104 is configured to control the pressure of the pipeline in which the overflow valve 104 is located. The unloading valve 105 is configured to control the pressure of the pipeline in which the unloading valve 105 is located, which protects the lift cylinder 12 and the hydraulic pump 103, and prevents the lift cylinder 12 and the hydraulic pump 103 from being subjected to an excessive pressure when the planting unit suddenly ascends or descends.

When the combined machine is on a flat ground, or the lifting control handle 13 is in the neutral position, the first return spring of the transmission mechanism of the ground contour-following system is in a semi-compressed state (i.e., the first return spring is compressed without reaching the limit state).

Working Principle:

1) Manual Control:

The electric cylinder 11 is arranged in front of the valve group 910, and the output shaft of the electric cylinder 11 is parallel to the push rod of the valve group 910. The end of the output shaft of the electric cylinder is located on the lateral side of the lug 911, and aligned with the front end surface of the push rod. Also, the electric cylinder 11 can push the push rod of the valve group 910 to drive the valve core to move.

The signal input terminal of the electric cylinder 11 is connected to the control system, and the corresponding signal input terminal of the control system is connected to the lifting control handle 13 on the operating console. The lifting control handle 13 is provided with a plurality of gear positions.

When the transplanting of a row of seedlings is completed or the machine needs to be lifted halfway, the lifting control handle 13 is shifted by the operator so that the gear position of the lifting control handle 13 is in the lifting position on the left side. After the instruction signal sent by the lifting control handle 13 is processed by the control system, the corresponding control signal is output to the electric cylinder 11, the output shaft of the control cylinder 11 is extended, and the valve core of the valve group 910 is pushed by the push rod to move backward by a distance of L. At this time, the first return spring is further compressed, the valve core moves inward to the position 1, the oil pumped by the hydraulic pump 103 from the oil tank 101 is directly supplied to the piston rod chamber of the lift cylinder 12 to drive the piston rod to move forward, and the piston rod drives the planting unit to lift through the lifting mechanism.

When the planting unit is lifted to a predetermined position, the lifting control handle 13 is shifted to the middle pressure holding position. The control system controls the electric cylinder 11 to retract by a distance of L/2. At this time, the valve core moves outward by the distance of L/2 under the elastic force of the first return spring, and reaches the neutral position. The hydraulic oil output from the hydraulic pump 103 directly returns to the oil tank 101 through the passage between P port and T port of the valve core and the corresponding oil return pipeline. The oil entering the piston rod chamber of the lift cylinder 12 is sealed in the piston rod chamber. At this time, the piston rod cannot extend or retract and thus is in a locked state, and the planting unit is in a lifting and fixed state.

When the planting unit needs to be lowered, the lifting control handle 13 is shifted to the lowering position on the right side. After the operational instruction of the lifting control handle 13 is processed by the control system, a control signal is output to the electric cylinder 12, and the electric cylinder 12 is controlled to continue to retract by a distance of L/2. At this time, the valve core continues to move outward by a distance of L/2 under the action of the first return spring, and reaches the position 4. The hydraulic oil pumped by the hydraulic pump 103 directly returns to the oil tank 101, while the oil entering the piston rod chamber of the lift cylinder 12 can directly return to the oil tank 101 through the circuit. The planting unit drives the piston rod to extend outward by gravity, and the planting unit descends.

2) Automatic Control:

When the planting unit descends, the inductive wheel 901 contacts the ground, the movable support 902 rotates, and the pull lug 911 is rotated by the drawing wire in the pull wire 907, so that the protruding contact point of the pull lug 911 presses the push rod, and the valve core is forced to move to the rear of the valve group. When the height of the planting unit is in a normal position, namely, when the height of the inductive wheel 901 is a preset height on the flat ground, the valve core moves to the neutral position at this time, and the lift cylinder 12 is in a stable state for maintaining the pressure.

When there is a bump on the ground, the inductive wheel 901 lifts upward, the movable support 902 rotates, the pull lug 911 is jointly linked by the drawing wire, the pull lug 911 rotates around the third rotating shaft, the first return spring on the push rod is compressed, and the second return spring 912 is stretched. The protruding contact point of the pull lug 911 moves backward, and pushes the push rod of the valve group 910 to drive the valve core to move to the position 2. The oil pumped by the hydraulic pump 103 from the oil tank 101 is directly supplied to the piston rod chamber of the lift cylinder 12 to drive the piston rod to move to the left. At this time, the piston rod is connected to the lifting mechanism to drive the planting unit to lift. During the lifting process, the inductive wheel 901 moves downward, the movable support 902 rotates reversely, and the drawing wire is loosened. At this time, the protruding contact point of the pull lug 911 moves forward under the action of the second return spring 912, and the valve core returns to the neutral position under the pushing action of the first return spring. A contour following and lifting process is completed. If the ground is raised too high, the valve core will reach the position 1. The position 1 is not provided with the throttle valve on the oil inlet pipeline compared with the position 2, and thus the lift cylinder 12 can be quickly driven to lift the planting unit.

The inductive wheel 901 moves downward after passing over the bump on the ground. The valve core moves to the position 3 under the action of the first return spring, and he position 3 is the lowering position. At this time, the valve unit returns to the neutral position after the planting unit moves downward to the normal working position. When there is a depression on the ground, the valve core similarly moves to the position 3 at this time, and the position 3 is the lowering position.

(7) Configuration of the Hydraulic Drive System and the Control System

Figure 19:
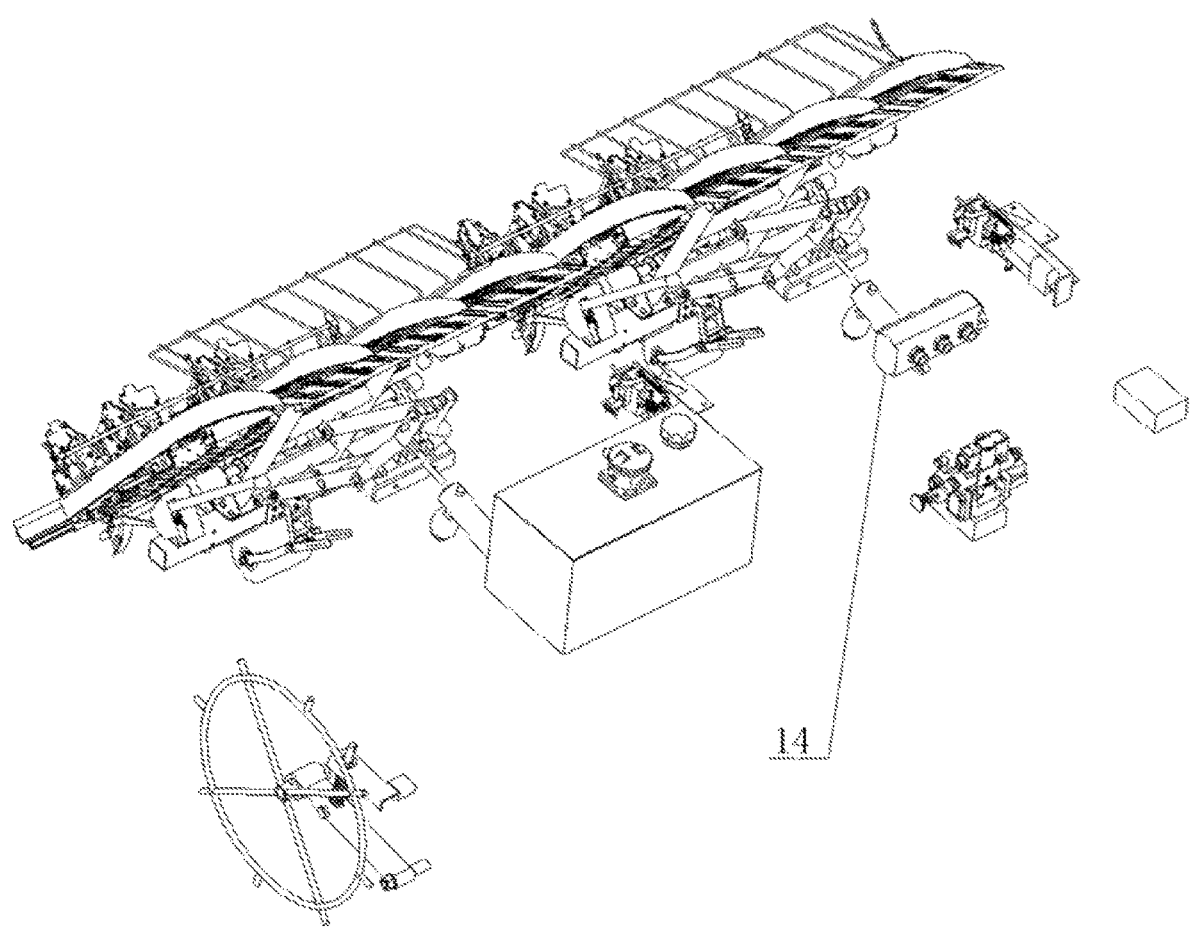
FIG. 19 is a schematic diagram showing a partial structure of the fully-automatic transplanting combined machine with two planting units.
Figure 20:
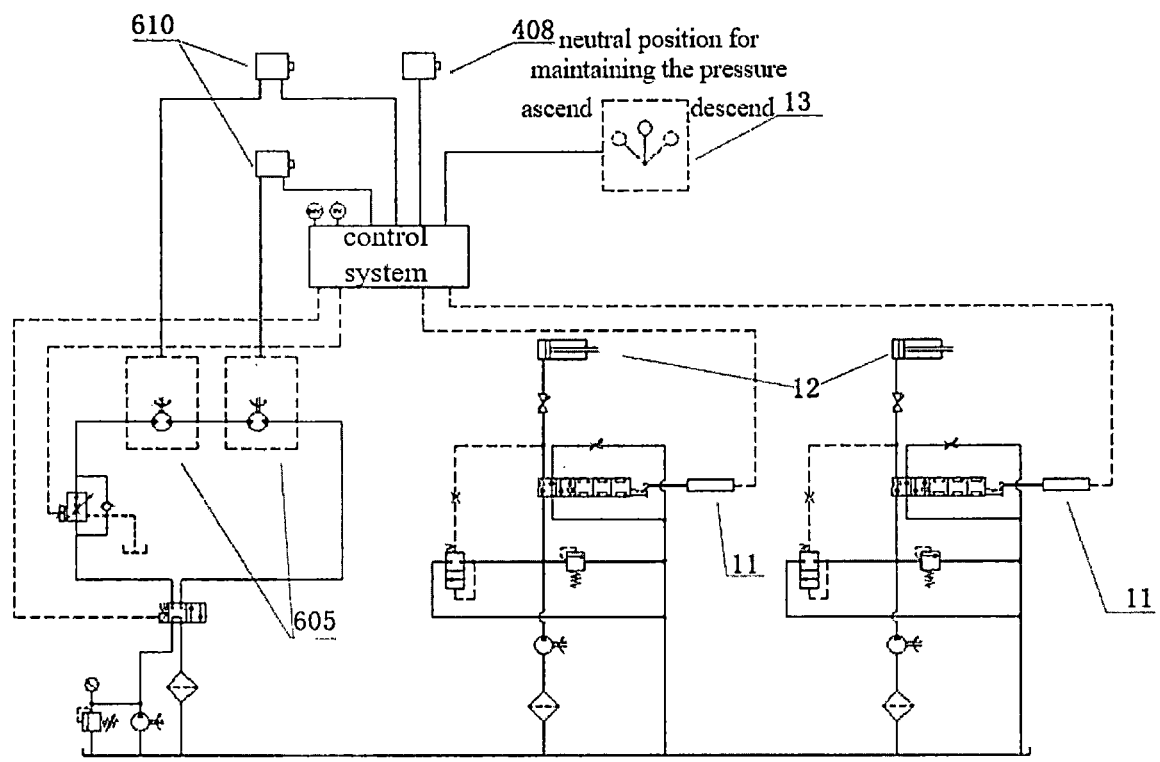
FIG. 20 is a schematic diagram showing a configuration of the hydraulic drive system 1 and the control system.
Figure 21:
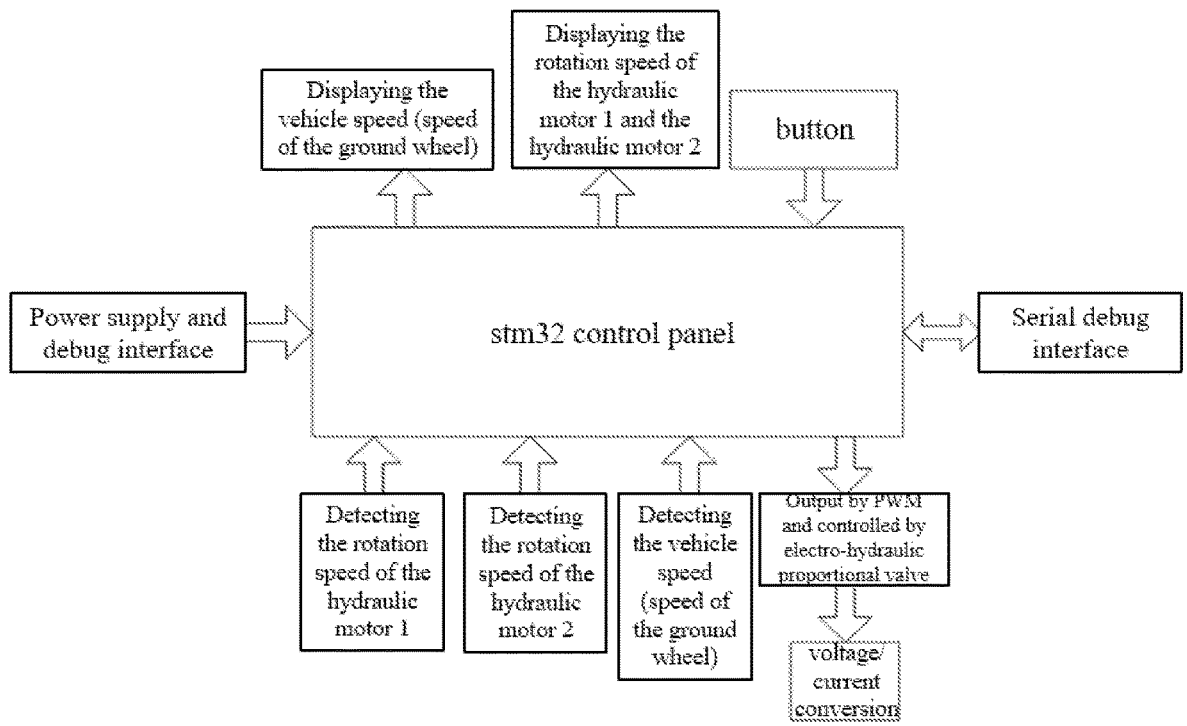
FIG. 21 is a block diagram of the control system.
Figure 22:
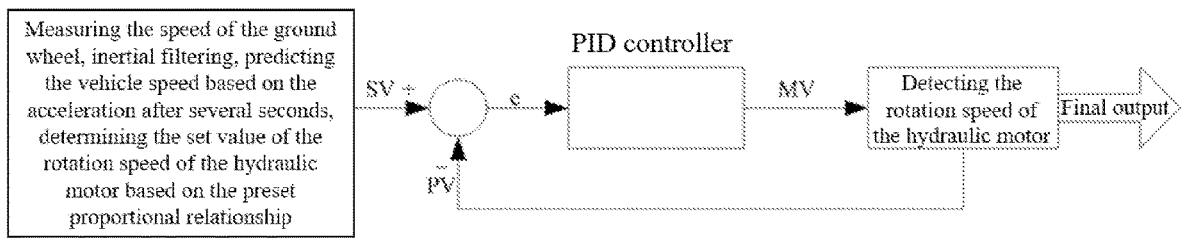
FIG. 22 is a schematic diagram showing a control flow of the control system.

As shown in FIG. 19, in the present embodiment, the planting system 6 of the combined machine is provided with two planting units side-by-side, and the planting operation of the two planting units is performed at the same time. Therefore, a hydraulic pump is configured to simultaneously control the start and stop of the hydraulic motor 605 of the two planting units. The two planting units are separately controlled to ascend and descend, thus, each of the lift cylinders 12 of the two planting units is driven by a hydraulic pump, which requires a total of three hydraulic pumps. In order to save space, three separated hydraulic pumps can be connected in series to form the triple pump 14 and installed on the main body frame. The control signal input terminals of the three hydraulic pumps are respectively connected to the control system.

In the present embodiment, the control system employs the control board 10 which uses a STMicroelectronics (STM) 32-bit microprocessor as a kernel. The two first rotation speed sensors of the planting system 6 and the second rotation speed sensor of the ground wheel speed measurement system 4 are respectively connected to the control board 10. The detection result is fed back to the control board 10 and displayed on the operating console.

The operating console including a display device is connected to the control board 10 and is used as an input device and a data output device of the control signal. The lifting control handle 13 and the oil cylinder control handle configured to control the soil covering and compacting wheel are both arranged on the operating console, which facilitates the driver to operate.

The control board 10 adjusts and controls the rotation speed of the hydraulic motor 605 of the two planting units (i.e., the planting speed of the planting unit) according to the rotation speed signal (i.e., the signal corresponding to the traveling speed of the combined machine) collected by the second rotation speed sensor. The above control process is achieved based on the electro-hydraulic proportional valve. The electro-hydraulic proportional valve is arranged on the liquid inlet pipeline of the two hydraulic motors 605. The control board 10 can limit the hydraulic flow entering the hydraulic motor 605 by adjusting the opening degree of the electro-hydraulic proportional valve, so as to control the rotation speed of the hydraulic motor 605. Thus, the planting speed matches the traveling speed of the combined machine.

During the control process mentioned above, the control board 10 compares the speed signal collected by the first rotation speed sensor with the expected speed of the hydraulic motor at the same time, to achieve an accurate proportion integration differentiation (PID) control.

The liquid inlet pipeline of the hydraulic motor 605 is also provided with a reversing valve. When the feedback result of the second rotation speed sensor indicates that the ground wheel 409 is stationary or rotates reversely, the control system controls the reversing valve to turn off the liquid inlet pipeline of the hydraulic motor 605. The liquid inlet pipeline of the hydraulic motor 605 is turned on only when the ground wheel 409 rotates forward, to ensure a constant planting distance.

The basic principles, main features, and advantages of the present disclosure are shown and described in the above-mentioned preferred embodiments of the present disclosure. Those skilled in the art should understand that the present disclosure is not limited by the above-mentioned embodiments. Some components, such as the ground wheel speed measurement system, the ground contour-following system, and the like, can be arranged selectively. The above-mentioned embodiments and descriptions are only intended to illustrate the principles of the present disclosure. Various changes and improvements can be made to the present disclosure without departing from the spirit and scope of the present disclosure. The claimed scope of the present disclosure is defined by the claims, specification, and equivalents thereof of the present disclosure.

What is claimed is:

1. A fully-automatic transplanting combined machine, comprising:
a traction apparatus,
an operation apparatus, and
a control system;
wherein
the operation apparatus is mounted on the traction apparatus and is towed behind the traction apparatus; the traction apparatus comprises a main body frame;
the operation apparatus comprises a rotary tillage furrowing system, a soil preparing and furrowing system, a planting system, and a soil covering compacting system; wherein the soil preparing and furrowing system is configured to slightly prepare soil and open a-narrow furrows; the rotary tillage furrowing system, the soil preparing and furrowing system, the planting system, and the soil covering compacting system are arranged successively from front to back; the planting system comprises a plurality of planting units;

the rotary tillage furrowing system is provided with a rotary tillage cutter shaft; a middle of the rotary tillage cutter shaft is provided with a middle furrowing cutter disc configured to open a furrow; two sides of the rotary tillage cutter shaft are provided with a rotary tillage blade set;

the soil preparing and furrowing system comprises a soil breaking roller, a soil scraping device for the soil breaking roller, and a soil leveling and slitting roller;

the soil breaking roller comprises a soil breaking roller shaft, a left roller body, and a right roller body, wherein the left roller body and the right roller body are mounted on the soil breaking roller shaft;

both ends of the soil breaking roller shaft are connected to a drive device by a transmission mechanism, and the drive device drives the soil breaking roller shaft to rotate;

the right roller body is provided with a plurality of unit segments in an axial direction of the right roller body, and a surface of each of the plurality of unit segments is provided with a spiral blade; adjacent unit segments of the plurality of unit segments are spaced apart from one another by an annular groove; an outermost unit segment of the plurality of unit segments and an end portion of the right roller body are spaced apart by the annular groove; the annular groove has a trapezoidal cross section in a radial direction of the right roller body; and the annular groove has a wide outer portion and a narrow inner portion;

the left roller body and the right roller body are symmetrical;

the soil scraping device for the soil breaking roller comprises a scraper, wherein the scraper is parallel to the soil breaking roller shaft, the scraper is arranged close to the spiral blade and configured to remove soil adhered to the spiral blade;

the soil leveling and slitting roller comprises a soil leveling and slitting roller shaft, a plurality of circular cutter discs, and a plurality of soil compacting roller bodies; the plurality of circular cutter discs and the plurality of soil compacting roller bodies are mounted on the soil leveling and slitting roller shaft;

the plurality of circular cutter discs and the plurality of soil compacting roller bodies are alternately arranged on the soil leveling and slitting roller shaft; a circular cutter disc of the plurality of circular cutter discs is arranged between adjacent soil compacting roller bodies of the plurality of soil compacting roller bodies; and the plurality of circular cutter discs are in a one-to-one correspondence with a plurality of annular grooves on the soil breaking roller in front of the plurality of circular cutter discs; the plurality of circular cutter discs are aligned with the plurality of annular grooves front and rear; a plurality of seedling transplanting positions of the plurality of planting units are in a one-to-one correspondence with the plurality of circular cutter discs and are aligned with the plurality of circular cutter discs front and rear.

2. The fully-automatic transplanting combined machine according to claim 1, further comprising a hydraulic drive system, a ground wheel speed measurement system, and a ground contour-following system;

wherein each of the plurality of planting units is provided with a lift cylinder configured to independently control each of the plurality of planting units to ascend and descend;

the plurality of planting units are driven by a hydraulic motor and are provided with a first rotation speed sensor configured to detect a rotation speed of the hydraulic motor; a signal output terminal of the first rotation speed sensor is connected to the control system; the hydraulic motor is connected to the hydraulic drive system; the hydraulic drive system regulates the rotation speed of the hydraulic motor and controls the hydraulic motor to start or stop according to an instruction sent by the control system;

the ground wheel speed measurement system is provided with a contour following ground wheel mechanism; the contour following ground wheel mechanism is provided with a ground wheel and a second rotation speed sensor; wherein the ground wheel contacts a ground, and the second rotation speed sensor is configured to detect a rotation speed of the ground wheel; a signal output terminal of the second rotation speed sensor is connected to the control system;

the control system controls the rotation speed of the hydraulic motor according to signals collected by the first rotation speed sensor and the second rotation speed sensor, and a traveling speed of the fully-automatic transplanting combined machine is matched with a planting speed of the plurality of planting units; and the ground contour-following system is connected to the plurality of planting units; the ground contour-following system collects changes of different terrains during a running process of the fully-automatic transplanting combined machine, and generates a coupling control action; wherein the coupling control action acts on the lift cylinder, and a height of the plurality of planting units is regulated by the lift cylinder.

3. The fully-automatic transplanting combined machine according to claim 2, wherein, a valve group is arranged on a connecting pipeline between the lift cylinder and the hydraulic drive system, and the valve group is fixed on a third mounting support;

the ground contour-following system comprises a contour following mechanism and a transmission mechanism;

the contour following mechanism comprises an inductive wheel, a movable support and a second fixed support;

the inductive wheel is roller-shaped; the inductive wheel is arranged on a horizontal axis and contacts the ground when operating; two ends of the inductive wheel are mounted at a bottom of the movable support through a first rotating shaft;

the movable support is arranged obliquely, wherein an upper portion of the movable support faces forwards and a lower portion of the movable support faces backwards; a middle of the movable support is hinged to a bottom of the second fixed support through a second rotating shaft;

the second fixed support is located behind the upper portion of the movable support, and an included angle is formed between the second fixed support and the upper portion of the movable support; a top end of the second fixed support is fixed on a main beam of the plurality of planting units, and a fixed lug is arranged on the second fixed support;

in the contour following mechanism, the first rotating shaft is parallel to the second rotating shaft, and a forward direction refers to a traveling direction of the fully-automatic transplanting combined machine;

the transmission mechanism comprises a pull wire, a movable lug and a pull lug;

the valve group is provided with a housing, a valve core and a push rod; the valve group controls the lift cylinder to operate under an action of the valve core; a first end of the push rod is connected to the valve core in the housing, and a second end of the push rod extends from the housing; and a portion of the push rod is provided with a first return spring, wherein the portion of the push rod extends from the housing;

the pull lug is arranged on an extending side of the push rod of the valve group, and is hinged to the third mounting support through a third rotating shaft; the third rotating shaft is perpendicular to the push rod; a first end of the pull lug is connected to the third mounting support through a second return spring, and a second end of the pull lug is connected to the movable support through the pull wire, so as to form a lever structure with the third rotating shaft as a fulcrum; the second return spring is parallel to the push rod; an arc-shaped protruding contact point is arranged between a connection point of the pull lug and the pull wire and the third rotating shaft; the arc-shaped protruding contact point is arranged at a position aligned with an end portion of the push rod;

the pull wire comprises a sleeve and a drawing wire located in the sleeve; a length of the drawing wire is greater than a length of the sleeve; the drawing wire moves inside the sleeve; a first end of the sleeve is fixedly connected to the movable lug, and a second end of the sleeve is fixedly connected to the fixed lug; a first end of the drawing wire passes through the movable lug and is connected to the pull lug, and a second end of the drawing wire passes through the fixed lug and is connected to the upper portion of the movable support; the fixed lug and the movable lug are both provided with a through hole, and the through hole allows the drawing wire to pass through;

when there is a bump on the ground, the inductive wheel lifts upwards, the movable support rotates, and the pull lug is jointly driven by the drawing wire; the first return spring is compressed, and the second return spring is stretched; the pull lug presses the push rod of the valve group through the arc-shaped protruding contact point, so as to drive the valve core to move and turn on an oil circuit, wherein the oil circuit drives the lift cylinder to lift; after the inductive wheel passes over the bump on the ground, the valve core is reset under an action of the first return spring, the oil circuit is cut off; and the pull lug is reset under an action of the second return spring.

4. The fully-automatic transplanting combined machine according to claim 3, wherein, the movable lug is mounted on the third mounting support through a waist-shaped long hole; a tension and relaxation state of the drawing wire is changed by adjusting a fixed position of the movable lug in the waist-shaped long hole, so as to adjust an induction sensitivity of a control mechanism.

5. The fully-automatic transplanting combined machine according to claim 4, wherein,
a surface of the soil compacting roller body is covered with a rubber layer; and a hardness of the rubber layer ranges from 60 HA to 70 HA.

6. The fully-automatic transplanting combined machine according to claim 3, wherein, the second end of the drawing wire is connected to the movable support through a buffer spring; an upper portion of the movable support is provided with a plurality of positioning holes at a plurality of height positions; the plurality of positioning holes cooperates with an adjustable rod for use; a first end of the buffer spring is hung on the adjustable rod, and a contour following height of the plurality of planting units is regulated by mounting the adjustable rod in the plurality of positioning holes at the plurality of height positions.

7. The fully-automatic transplanting combined machine according to claim 6, wherein,
a surface of the soil compacting roller body is covered with a rubber layer; and a hardness of the rubber layer ranges from 60 HA to 70 HA.

8. The fully-automatic transplanting combined machine according to claim 3, wherein, the lift cylinder is a single-acting hydraulic cylinder; an oil inlet is arranged on one side of a piston rod chamber of the lift cylinder; when oil enters the piston rod chamber, a piston rod moves and drives the plurality of planting units to lift;

the valve group comprises a five-position four-way reversing valve, and is provided with four oil ports and five valve positions; wherein the four oil ports comprise a port A, a port B, a port P, and a port T, and the five valve positions comprise a position 1, a position 2, a neutral position, a position 3, and a position 4, respectively; when the valve core moves to the position 1, the port A and the port P are in fluid communication, and the port B and the port T are in fluid communication; when the valve core moves to the position 2, the port A and the port P are in fluid communication, and the port B and the port T are in fluid communication; when the valve core moves to the neutral position, the port A and the port B are both blocked, and the port P and the port T are in fluid communication; when the valve core moves to the position 3, the port A and the port B are in fluid communication, and the port P and the port T are in fluid communication; when the valve core moves to the position 4, the port A and the port B are in fluid communication, and the port P and the port T are in fluid communication;

the hydraulic drive system comprises an oil tank, an overflow valve, and an unloading valve; the port P of the valve group is connected to the oil tank through a first oil pipeline; an oil pump is mounted in the first oil pipeline; the port A is connected to the oil inlet of the piston rod chamber of the lift cylinder through a second oil pipeline; the port B is connected to the oil tank through a first oil return pipeline; the port T is connected to the first oil return pipeline through a second oil return pipeline, and a connection point of the port T and the first oil return pipeline is set as a connection point S; the overflow valve and the unloading valve are incorporated into a circuit of the hydraulic drive system through a first branch pipeline; the first branch pipeline is arranged between the connection point S and an end of the first oil return pipeline; connection points of two ends of the first branch pipeline and the first oil return pipeline comprise a connection point M and a connection point N, respectively; in the first oil return pipeline, the connection point M is on an upstream side of the connection point N; the first branch pipeline intersects with the first oil pipeline at an intersection O; the overflow valve is mounted in a pipeline between the connection point M and the intersection O; the unloading valve is mounted in a pipeline between the intersection O and the connection point N on a side of the intersection O; an input end of the unloading valve is connected to the second oil pipeline through a second branch pipeline.

9. The fully-automatic transplanting combined machine according to claim 6, wherein,
a surface of the soil compacting roller body is covered with a rubber layer; and a hardness of the rubber layer ranges from 60 HA to 70 HA.

10. The fully-automatic transplanting combined machine according to claim 3, wherein, the fully-automatic transplanting combined machine is provided with an electric cylinder and a lifting control handle;
the electric cylinder is arranged in front of the valve group; an output shaft of the electric cylinder is parallel to the push rod of the valve group; an end portion of the output shaft of the electric cylinder is located beside the pull lug, and is aligned with a front end surface of the push rod; the push rod of the valve group is pushed under an action of the electric cylinder, so as to drive the valve core to switch a valve position of the valve core; and
a signal input terminal of the electric cylinder is connected to the control system; a signal input terminal of the control system is connected to the lifting control handle; the lifting control handle is operated to control a stroke of the output shaft of the electric cylinder, so as to switch the valve position of the valve core of the valve group.

11. The fully-automatic transplanting combined machine according to claim 7, wherein,
a surface of the soil compacting roller body is covered with a rubber layer; and a hardness of the rubber layer ranges from 60 HA to 70 HA.

12. The fully-automatic transplanting combined machine according to claim 3, wherein,
a surface of the soil compacting roller body is covered with a rubber layer; and a hardness of the rubber layer ranges from 60 HA to 70 HA.

13. The fully-automatic transplanting combined machine according to claim 2, wherein, the contour following ground wheel mechanism comprises an adjusting rod, a fixed plate, a suspension arm, and the ground wheel;
a front shaft sleeve and a rear shaft sleeve are horizontally arranged at a front end and a rear end of the suspension arm, respectively; the front shaft sleeve is configured to mount a fixed shaft, and the rear shaft sleeve is configured to mount a ground wheel shaft;
one end on an inner side of the fixed shaft protrudes from a shaft sleeve and is fixed on the main body frame; the suspension arm is hinged to the main body frame through the fixed shaft, and the suspension arm swings around the fixed shaft upwards and downwards;
the ground wheel is located outside the suspension arm, and the ground wheel shaft is arranged at a center of the ground wheel; an end on an inner side of the ground wheel shaft is inserted into the rear shaft sleeve, and an end on an outer side of the ground wheel shaft is fixedly connected to the ground wheel; the ground wheel drives the ground wheel shaft to rotate synchronously when rolling on the ground; an outer surface of the ground wheel is provided with a first anti-slip mechanism;
the second rotation speed sensor configured to detect a rotation speed of the ground wheel shaft is mounted at one end on an inner side of the rear shaft sleeve; the fixed plate is arranged horizontally, and one end on an inner side of the fixed plate is fixedly mounted on the main body frame of the fully-automatic transplanting combined machine; the suspension arm is arranged below the fixed plate and is connected to the fixed plate by the adjusting rod; a middle of the suspension arm is provided with a horizontal shaft hole; an upper surface of the suspension arm is provided with an opening connected to the horizontal shaft hole; the adjusting rod is inverted T-shaped, and comprises a vertical shaft and a bottom horizontal shaft; the bottom horizontal shaft is mounted in the horizontal shaft hole; the fixed plate is provided with a limit mounting hole; an upper portion of the vertical shaft passes through the limit mounting hole, and a bottom end of the vertical shaft passes through the opening and is connected to the bottom horizontal shaft; the opening is a long hole extended in front and rear directions, and the bottom horizontal shaft rotates in the suspension arm when the suspension arm swings up and down; and
a spring is sleeved at a position of the vertical shaft of the adjusting rod, wherein the position of the vertical shaft of the adjusting rod is located between the fixed plate and the suspension arm; an upper end and a lower end of the spring abut against the fixed plate and the suspension arm, respectively; and the ground wheel is pressed on the ground by the suspension arm.

14. The fully-automatic transplanting combined machine according to claim 13, wherein, an electro-hydraulic proportional valve and a reversing valve are arranged at a liquid inlet pipeline of the hydraulic motor; a control signal input terminal of the electro-hydraulic proportional valve and a control signal input terminal of the reversing valve are connected to the control system;
the control system regulates an opening degree of the electro-hydraulic proportional valve to limit a hydraulic flow entering the hydraulic motor, so as to adjust the rotation speed output by the hydraulic motor; and
the control system controls an on-off of the liquid inlet pipeline of the hydraulic motor through the reversing valve; when the second rotation speed sensor detects that the ground wheel is stationary or rotates reversely, the liquid inlet pipeline is cut off by the reversing valve; when the ground wheel rotates forwards, the reversing valve turns on the liquid inlet pipeline.

15. The fully-automatic transplanting combined machine according to claim 2, wherein,
a surface of the soil compacting roller body is covered with a rubber layer; and a hardness of the rubber layer ranges from 60 HA to 70 HA.

16. The fully-automatic transplanting combined machine according to claim 1, wherein, the rotary tillage furrowing system is provided with a ditch cleaning shovel, a soil retaining cover and a soil throwing cover;
the ditch cleaning shovel is arranged behind the middle furrowing cutter disc; a bottom of the ditch cleaning shovel is inclined towards the traveling direction of the fully-automatic transplanting combined machine;
the soil throwing cover is arranged above the ditch cleaning shovel and is coupled with a top of the ditch cleaning shovel; the soil throwing cover is provided with an arc-shaped baffle, and the arc-shaped baffle arches upwards; the arc-shaped baffle extends in the traveling direction of the fully-automatic transplanting combined machine to guide soil shoveled by the ditch cleaning shovel; and
the soil retaining cover is arranged between the rotary tillage blade set and the soil breaking roller, and comprises two covers; the two covers are respectively located on a left side and a right side of the soil throwing cover, and are configured to block and level soil turned over by the rotary tillage blade set; a bottom of each of the two covers is saw-toothed.

17. The fully-automatic transplanting combined machine according to claim 1, wherein, the plurality of planting units comprise a seedling box, a seedling feeding mechanism and a planting arm;
the seedling box is arranged obliquely, and is provided with a plurality of parallel seedling channels; a hollow portion is arranged at a lower portion of each of the plurality of parallel seedling channels;
the seedling feeding mechanism comprises an endless conveyor belt; a section of the endless conveyor belt is embedded in the hollow portion and contacts seedlings in the plurality of parallel seedling channels, so as to control the seedlings to descend; a surface of the endless conveyor belt is provided with a second anti-slip mechanism; and
the planting arm picks the seedlings from a seedling gate located below the seedling box, and plants the seedlings into a respective furrow of the narrow furrows formed by the plurality of circular cutter discs.

18. The fully-automatic transplanting combined machine according to claim 17, wherein, the seedling feeding mechanism further comprises a ratchet transmission mechanism configured to drive the endless conveyor belt; the ratchet transmission mechanism comprises a shift tooth rotating shaft, a ratchet shaft, and a pawl;
the ratchet shaft and the pawl are mounted on a frame structure of the seedling box; the ratchet shaft is a gear shaft and is arranged horizontally; a surface of the ratchet shaft is provided with a plurality of racks and a plurality of tooth spaces, wherein the plurality of racks and the plurality of tooth spaces are extended horizontally; the pawl is mounted beside the ratchet shaft through a shaft pin, and is configured to push the ratchet shaft to rotate; the endless conveyor belt is winded around the ratchet shaft;
a protrusion array is arranged on a contact surface between the endless conveyor belt and the ratchet shaft; the protrusion array is formed by a plurality of protrusions, and the plurality of protrusions are engaged with the plurality of tooth spaces of the ratchet shaft, and the ratchet shaft rotates to drive the endless conveyor belt to move;
the protrusion array is formed by a plurality of rivets, and the plurality of rivets are regularly mounted on the endless conveyor belt; a head of each of the plurality of rivets forms each of the plurality of protrusions, and a tip of each of the plurality of rivets passes through the endless conveyor belt and contacts the seedlings to form the second anti-slip mechanism, so as to increase a contact friction between the endless conveyor belt and the seedlings; and
the shift tooth rotating shaft is driven by the drive device to rotate, and a first shift tooth is respectively mounted on a left side and a right side of the shift tooth rotating shaft; when the seedling box laterally moves to a left limit position or a right limit position of the seedling box, the first shift tooth on the left side or the right side of the shift tooth rotating shaft shifts to the pawl to allow the pawl to push the ratchet shaft to rotate by an angle; and the endless conveyor belt is driven to rotate, control the seedlings to move downwards, and prevent the seedlings from falling.

19. The fully-automatic transplanting combined machine according to claim 1, wherein,
a surface of the soil compacting roller body is covered with a rubber layer; and a hardness of the rubber layer ranges from 60 HA to 70 HA.

20. The fully-automatic transplanting combined machine according to claim 1, wherein,
the left roller body and the right roller body are both provided with a central shaft hole penetrating from left to right; the left roller body and the right roller body are sleeved on the soil breaking roller shaft through the central shaft hole and fixed to the soil breaking roller shaft by a locking device;
the locking device comprises two sets of auxiliary plates, and the two sets of auxiliary plates are configured to fix the left roller body and the right roller body, respectively; each of the two sets of auxiliary plates comprises a regular polygonal outer auxiliary plate and a circular inner auxiliary plate; the regular polygonal outer auxiliary plate is fixed at an end portion of the soil breaking roller shaft; the circular inner auxiliary plate of the two sets of auxiliary plates is fixed in a middle of the soil breaking roller shaft;
the central shaft hole of the left roller body and the right roller body is formed by an inner shaft hole and an outer shaft hole, wherein the inner shaft hole and the outer shaft hole are coupled with one another; the inner shaft hole is a circular hole, and a size of the inner shaft hole is greater than a size of the outer shaft hole; the outer shaft hole is in a shape of a regular polygon, and the shape of the outer shaft hole is consistent with the shape of the regular polygonal outer auxiliary plate, and the regular polygonal outer auxiliary plate passes through the central shaft hole; and
a diameter of the circular inner auxiliary plate is greater than a diameter of the inner shaft hole, and an edge of the circular inner auxiliary plate is fixed to an inner end surface of the left roller body or the right roller body by a plurality of first bolts; a sharp corner of the regular polygonal outer auxiliary plate is provided with a screw hole; after the regular polygonal outer auxiliary plate and the outer shaft hole are arranged alternately, the sharp corner of the regular polygonal outer auxiliary plate is fixed to an outer end surface of the left roller body or the right roller body by a plurality of second bolts.

* * * * *